(12) United States Patent
Wakai et al.

(10) Patent No.: US 6,747,813 B2
(45) Date of Patent: Jun. 8, 2004

(54) OPTICAL SYSTEM AND IMAGING DEVICE

(75) Inventors: Hiroshi Wakai, Hamura (JP);
Takayuki Ide, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/242,350

(22) Filed: Sep. 13, 2002

(65) Prior Publication Data

US 2003/0117719 A1 Jun. 26, 2003

(30) Foreign Application Priority Data

| Sep. 17, 2001 | (JP) | 2001-281789 |
| Sep. 17, 2001 | (JP) | 2001-281790 |
| Jun. 11, 2002 | (JP) | 2002-170550 |
| Aug. 8, 2002 | (JP) | 2002-232037 |

(51) Int. Cl.$^7$ .......................... G02B 17/00; G03B 13/00
(52) U.S. Cl. .......................... 359/726; 348/347
(58) Field of Search .......................... 359/726, 676; 348/240.3, 347

(56) References Cited

U.S. PATENT DOCUMENTS

| 5,111,291 A | * | 5/1992 | Erickson et al. ............. 348/152 |
| 6,275,252 B1 | * | 8/2001 | Bessel ..................... 348/14.12 |
| 6,449,081 B1 | * | 9/2002 | Onuki et al. ................ 359/245 |

OTHER PUBLICATIONS

Rai–Choudhury, "Handbook of Microlithography, Micromachining and Microfabrication, vol. 2: Micromachining and Microfabrication," Pie Press ©1997, pp. 484–497.
Vdovin, G., "Quick Focusing of Imagining Optics Using Micromachined Adaptive Mirrors," Optics Communication, vol. 140, Aug. 1, 1997, pp 187–190.
Wilson, et al., "Transmission Variation Using Scattering/Transparent Switching Films," Solar Energy Materials and Solar Cells, vol. 31, 1993 Eleesvier Sciene Publishers B.V., pp. 197–214.
Mukai et al., "Iwanami Science Library 8, Asteroids are coming," 1994, Iwanami Shoten, pp 58–59.

* cited by examiner

Primary Examiner—Scott J. Sugarman
Assistant Examiner—M. Hasan
(74) Attorney, Agent, or Firm—Pillsbury Winthrop LLP

(57) ABSTRACT

An optical apparatus has a look-up table provided with control information for controlling an optimum variable optical-property optical element in accordance with a distance to an object, a zoom state, or a combination of the distance to the object with the zoom state. A drive of the variable optical-property optical element is controlled on the control information obtained from the look-up table or a predetermined calculation process is executed on the control information obtained from the look-up table, and information obtained from the calculation process is used to control the drive of the variable optical-property optical element.

20 Claims, 49 Drawing Sheets

① : $V=a_1X_1^2+b_1X_1+C_1$   ② : $V=a_1X_2^2+b_1X_2+C_1$

③ : $V=a_2X_1^2+b_2X_1+C_2$   ④ : $V=a_2X_2^2+b_2X_2+C_2$

⑤ : $V=a_3X_1^2+b_3X_1+C_3$   ⑥ : $V=a_3X_2^2+b_3X_2+C_3$

VOLTAGE APPLICATION

TRANS-TYPE                    CIS-TYPE

OPTICAL SYSTEM AND IMAGING DEVICE

BACKGROUND OF THE INVENTION

1. Field of the Invention

This invention relates to a variable optical-property optical element such as a variable focal-length lens, a variable focal-length diffraction optical element, a variable deflection-angle prism, or a deformable mirror, and to an optical apparatus such as spectacles, a video projector, a digital camera, a TV camera, an endoscope, a telescope, or a camera finder, having an optical system including such a variable optical-property optical element.

2. Description of Related Art

Conventional lenses have been manufactured by polishing glass. Since the lens it-self cannot vary a focal length, a mechanical structure is complicated because a lens unit must be moved along the optical axis for focusing or zooming of a camera, or changing magnification.

Because a motor or the like is used for moving a part of the lens unit, this conventional practice has disadvantages that power consumption is large, noise is produced, response time is long, and much time is required for moving lenses.

For shake prevention as well, mechanical movement of the lenses by a motor or a solenoid causes defects such as a large power consumption and a complicate mechanical structure, resulting in a higher cost.

SUMMARY OF THE INVENTION

It is, therefore, an object of the present invention to provide a variable optical-property optical element such as a variable focal-length lens, a deformable mirror, or a variable deflection-angle prism, which is low in power consumption, quiet, short in response time, and simple in mechanical structure and contributes to cost reduction, and an optical system and an imaging device or an optical apparatus, including such variable optical-property optical elements.

In order to achieve this object, the optical system, for example, according to the present invention is provided with a deformable mirror, which bends the optical axis to form an image of an object on an imaging plane. In this case, the optical system has a two-dimensional look-up table (LUT), with a zoom state and a distance to an object as input information, storing the value of a voltage applied or a current supplied to the deformable mirror, as output information, which corresponds to the zoom state and the distance to the object. The two-dimensional LUT is scanned in turn in image formation and the value of the voltage applied or the current supplied to the deformable mirror is changed in accordance with acquired output information to determine the sharpness of a formed image so that the output information of the two-dimensional LUT where the sharpness of the formed imaged is optimized is decided as the value of the voltage applied or the current supplied to the deformable mirror.

The optical system, for example, according to the present invention is such that when one of the zoom state and the distance to the object is detectable in image formation, the zoom state or the distance to the object, having been detected, is fixed. The two-dimensional LUT is scanned in turn in image formation and the value of the voltage applied or the current supplied to the deformable mirror is changed in accordance with acquired output information to determine the sharpness of a formed image so that the output information of the two-dimensional LUT where the sharpness of the formed imaged is optimized is decided as the value of the voltage applied or the current supplied to the deformable mirror.

The optical system, for example, according to the present invention is provided with a deformable mirror, which bends the optical axis to form an image of an object on an imaging plane. In this case, the optical system has a two-dimensional look-up table (LUT), with a zoom state and a distance to an object as input information, storing the value of a voltage applied or a current supplied to the deformable mirror, as output information, which corresponds to the zoom state and the distance to the object. When one of the zoom state and the distance to the object is detectable in image formation, the zoom state and the distance to the object are fixed to input the two-dimensional LUT so that acquired output information is decided as the value of the voltage applied or the current supplied to the deformable mirror.

The imaging device, for example, according to the present invention is mounted with a zoom lens. In this case the imaging device has a variable mirror.

Further, the imaging device, for example, according to the present invention has at least two variable mirrors.

Still further, the imaging device, for example, according to the present invention uses the variable mirror as a focusing means.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
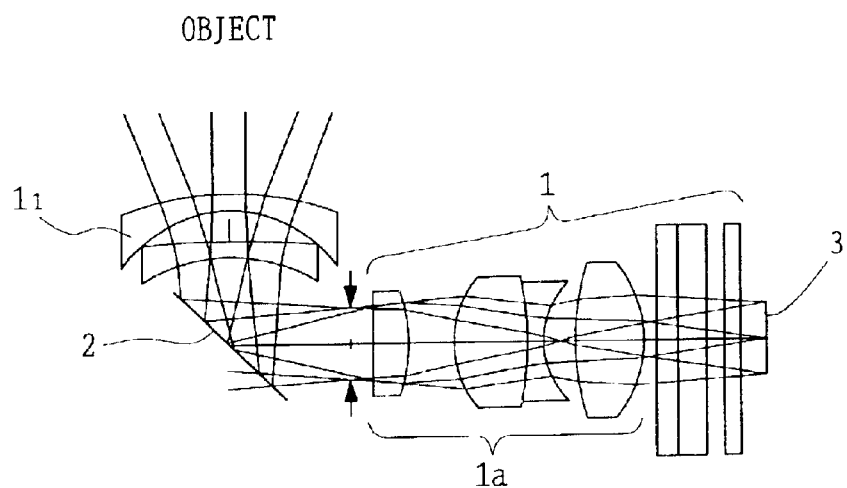
FIG. 1 is a view showing schematically an example of a fundamental arrangement of an optical system in the present invention.

In accordance with the drawings, the embodiments of the present invention will be described below. FIG. 1 shows an example of a fundamental arrangement of an optical system in the present invention. The optical system of the present invention has an optical element 1 and a deformable mirror 2 and is constructed so that the optical axis of light from an object is bent by the deformable mirror 2 and an image is formed on an image sensor 3. In the optical element 1, a lens unit 1a is arranged so that a predetermined lens constituting the lens unit 1a can be moved along the optical axis. The lens unit 1a has a variator function for changing the magnification of the optical system. In FIG. 1, the deformable mirror 2 is conveniently shown by only its reflecting surface.

In this optical system, the settings of zoom states at wide-angle, standard and telephoto positions and a focus adjustment are made by the movement of the predetermined lens constituting the lens unit 1a and a change of the profile (a change in curvature) of the reflecting surface of the deformable mirror 2. When the change of the profile of the reflecting surface of the deformable mirror 2 is slight, it is recommended that the zoom state is determined by the movement of the predetermined lens constituting the lens unit 1a and the focus adjustment is made by the change of the profile of the reflecting surface of the deformable mirror 2. Also, moving lenses may be constructed with a plurality of lens units.

Figure 2:
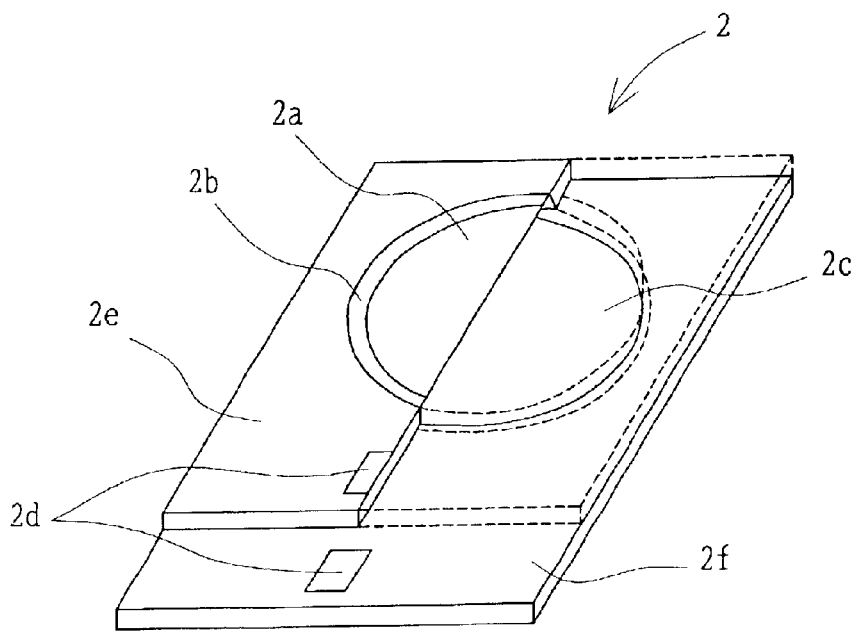
FIG. 2 is a view showing an example of the structure of a deformable mirror used in the optical system of FIG. 1.
Figure 3A:
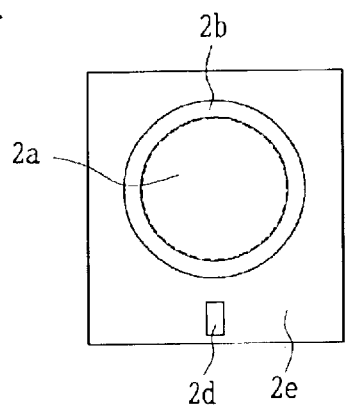
FIGS. 3A and 3B are plan views showing the structures of a frame member and a lower substrate, respectively, in accordance with individual substrates of the deformable mirror of FIG. 2.
Figure 3B:
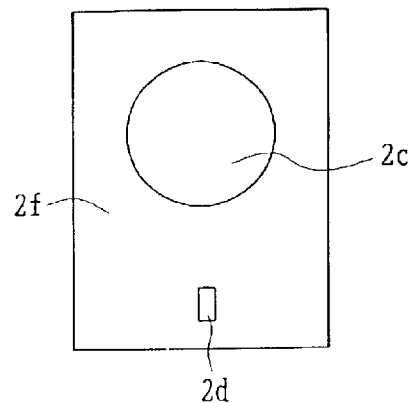

FIG. 2 shows an example of the structure of the deformable mirror 2 used in the optical system of FIG. 1. FIG. 3A shows the structure of a frame member of the deformable mirror in FIG. 1, and FIG. 3B shows the structure of a lower substrate thereof. In FIG. 3A, the reflecting surface is indicated by a solid line and a conductive portion by a broken line.

The deformable mirror 2 includes a reflecting surface and conductive portion 2a and a flexible thin film 2b in a frame member 2e, and an electrode 2c for deforming the reflecting surface, provided opposite to the flexible thin film 2b in a lower substrate 2f. In the deformable mirror shown in FIG. 2 and FIGS. 3A and 3B, the reflecting surface is combined with the conductive portion by using a metallic thin film with high reflectance such as aluminum. Between the conductive portion 2a and the electrode 2c, a voltage is applied, or a current is supplied, from external lead electrodes 2d, and thereby the reflecting surface is deformed by an electrostatic force exerted between them so that its curvature is changed. Also, in FIG. 2 and FIGS. 3A and 3B, the connection of the conductive portion 2a and the electrode 2c with the external lead electrodes 2d is omitted.

The deformable mirror 2 may be constructed as shown in FIGS. 4A and 4B and FIGS. 5A and 5B. In the deformable mirror of FIGS. 4A and 4B, each of the electrode 2c for deformation and the external lead electrode 2d provided on the lower substrate 2f is divided into a plurality of segments so that different voltages can be applied, or different currents can be supplied, to individual electrodes. Whereby, it becomes possible to impart the distribution with the place to the electrostatic force exerted between the reflecting surface and the electrode 2c divided into the plurality of segments, and a deformed profile of the reflecting surface can be optimized more strictly.

Figure 4A:
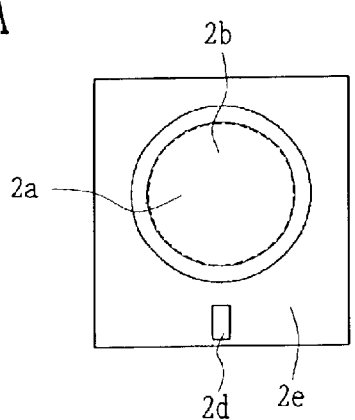
FIGS. 4A and 4B are views showing another example of the deformable mirror used in the optical system of FIG. 1.
Figure 4B:
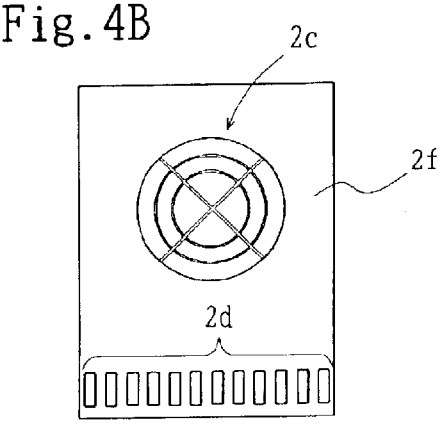
Figure 5A:
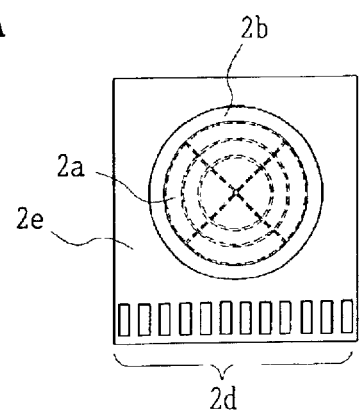
FIGS. 5A and 5B are views showing still another example of the deformable mirror used in the optical system of FIG. 1.
Figure 5B:
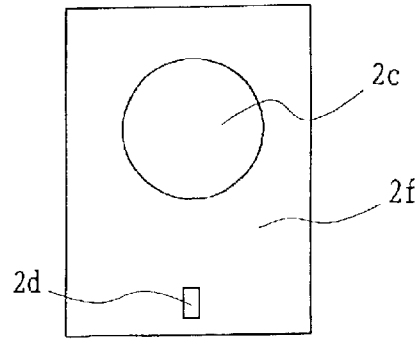

In the deformable mirror shown in FIGS. 5A and 5B, the conductive portion is divided and its effect is the same as that shown in FIGS. 4A and 4B.

In the optical system shown in FIG. 1, the profile of the reflecting surface of the deformable mirror 2 most suitable for the focus adjustment and correction for aberration varies according to the zoom state and a distance from the surface of a first lens $1_1$ to the object. It is thus necessary to optimize the voltage applied or the current supplied to the deformable mirror 2 in accordance with the zoom state and the distance from the surface of the first lens $1_1$ to the object and to change the profile of the reflecting surface of the deformable mirror 2 so as to suit to a corresponding state.

Thus, in the optical system of the present invention, when the voltage applied or the current supplied to the deformable mirror 2 is optimized in accordance with the zoom state and the distance from the surface of the first lens to the object and the profile of the reflecting surface of the deformable mirror 2 is changed so as to suit to a corresponding state, a memory, not shown, is provided with a two-dimensional look-up table (LUT) storing the zoom state and the distance from the surface of the first lens to the object as input information, and the voltage applied or the current supplied to the deformable mirror 2 corresponding to the input information as output information.

Also, in the description of the present invention to be given below, it is assumed that the distance from the surface of the first lens to the object is simply referred to as the distance to the object.

Here, examples of the LUT used in the present invention are shown.

Table 1 shows an example of the two-dimensional LUT where the deformable mirror has a single electrode.

TABLE 1

|  |  | Zoom state | | |
|---|---|---|---|---|
|  |  | Wide-angle | Standard | Telephoto |
| Distance | 10 cm | $a_{11}$ | $a_{12}$ | $a_{13}$ |
| to | 1 m | $a_{21}$ | $a_{22}$ | $a_{23}$ |
| object | ∞ | $a_{31}$ | $a_{32}$ | $a_{33}$ |

If it is assumed that the zoom states are at wide-angle, standard, and telephoto positions and the distances to the object are 10 cm, 1 cm, and infinity, the two-dimensional LUT storing information such as that shown in Table 1 is used. In the LUT, each component $a_{mn}$ (m: the distance to the object=1–3, and n: the zoom state=1–3) stands for optimum applied voltage information in each state.

Table 2 shows another example of the two-dimensional LUT where the deformable mirror has a plurality of electrodes.

TABLE 2

|  |  | Zoom state | | | | | | | | |
|---|---|---|---|---|---|---|---|---|---|---|
|  |  | Wide-angle | | | Standard | | | Telephoto | | |
| Distance | 10 cm | $a_{111}$ | $a_{112}$ | $a_{113}$ | $a_{121}$ | $a_{122}$ | $a_{123}$ | $a_{131}$ | $a_{132}$ | $a_{133}$ |
| to | 1 m | $a_{211}$ | $a_{212}$ | $a_{213}$ | $a_{221}$ | $a_{222}$ | $a_{223}$ | $a_{231}$ | $a_{232}$ | $a_{233}$ |
| object | ∞ | $a_{311}$ | $a_{312}$ | $a_{313}$ | $a_{321}$ | $a_{322}$ | $a_{323}$ | $a_{331}$ | $a_{332}$ | $a_{333}$ |

If it is assumed that the zoom states are at wide-angle, standard, and telephoto positions, the distances to the object are 10 cm, 1 cm, and infinity, and the number of electrodes is 3, the two-dimensional LUT storing information such as that shown in Table 2 is used. In the LUT, each component $a_{mno}$ (m: the distance to the object=1–3, n: the zoom state=1–3, and o: the electrode=1–3) stands for optimum applied voltage information in each state.

Such two-dimensional LUTs are made, for example, by one of the following methods.

The first method is that the deformed profile of the reflecting surface where the voltage is applied or the current is supplied to the deformable mirror is measured by a contactless measuring device, and is compared with the design value of the optimum profile of the deformable mirror corresponding to the zoom state and the distance to the object.

Specifically, the deformed profile of the reflecting surface where the voltage is applied or the current is supplied to the deformable mirror 2 is measured by the contactless measuring device such as a three-dimensional profile measuring device using an optical probe, an interferometer, or a Shack-Hartmann measuring device, and as the measured value of the deformed profile is compared with the design value of the optimum profile of the deformable mirror 2 corresponding to the zoom state and the distance to the object, the value of the voltage applied or the current supplied to the deformable mirror 2 is adjusted so that it coincides with the optical design value of the optimum profile. The value of the voltage applied or the current supplied to the deformable mirror 2 where the measured value of the deformed profile is coincides with the optical design value of the optimum profile is stored in an output information area of the LUT as the value of an optimum voltage to be applied, or an optimum current to be supplied, to the deformable mirror 2.

According to the first method, the deformed profile of the deformable mirror itself is measured before the deformable mirror is incorporated in the optical system, and the voltage applied or the current supplied to the deformable mirror itself is adjusted so that the deformed profile of the reflecting surface coincides with the optimum profile of the reflecting surface conducted by the optical design. Consequently, an optical system provided with other optical elements, such as lenses, is not required.

The deformed profile of the deformable mirror itself is measured, and thus when the deformable mirror is constructed with divided electrodes, the change of the profile relative to the electrodes is easily carried out and the voltage to be applied, or the current to be supplied, to each of the electrodes can be determined by intuition (with comparative ease).

Since the deformed profile of the deformable mirror is measured before the deformable mirror is incorporated in the optical system to determine the value of the applied voltage, or the supplied current, adjusted so that it coincides with the optimum profile of the optical design in accordance with the deformable mirror, variation in the deformed profile due to an error caused by the fabrication of the deformable mirror can be eliminated.

The tolerances of the profile of an optical surface may be $\pm\frac{1}{8}\lambda$–$\pm 10\lambda$, where $\lambda$ is the average value of wavelengths of light used, with respect to an ordinary design value, depending on the application. The profile of the optical surface may be measured by a three-dimensional measuring device. Alternatively, a variable optical-property optical element may be incorporated in the optical system to measure the optical properties such as aberration and MTF so that the profile of the optical surface is assumed from acquired optical properties.

The second method is that the sharpness of an image formed by the optical system after the deformable mirror is incorporated is evaluated to find a voltage that the sharpness of the formed image is optimized in accordance with the zoom state and the distance to the object.

Specifically, the voltage is applied or the current is supplied to the deformable mirror 2 after being incorporated in the optical system, and as the sharpness of the formed image by the optical system is evaluated in accordance with the zoom state and the distance to the object, the value of the voltage applied on the current supplied to the deform able mirror 2 is adjusted. The value of the voltage applied or the current supplied to the deformable mirror 2 where the sharpness is optimized is stored in the output information area of the LUT as the value of an optimum voltage to be applied, or an optimum current to be supplied, to the deformable mirror 2.

Figure 6:
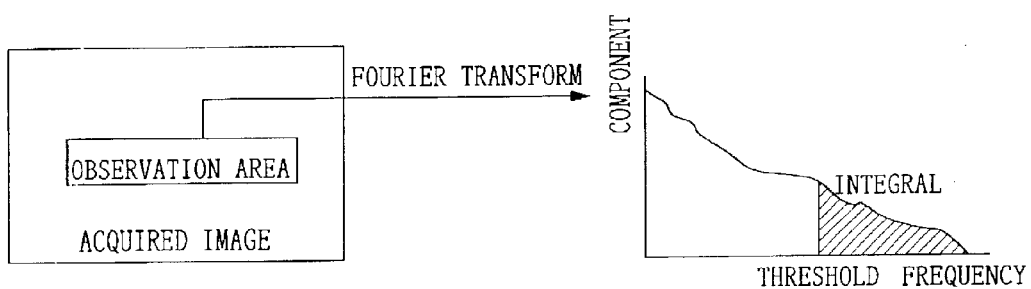
FIG. 6 is a diagram showing an example of the evaluation of sharpness, used in the optical system of the present invention.

Here, an example of the evaluation of the sharpness is explained with reference to FIG. 6. In this figure, the left-hand diagram shows the acquired image, and the right-hand graph shows the spatial frequency component where image information in the observation area of the acquired image is Fourier-transformed.

For example, the spatial frequency component of the acquired image is evaluated. The observation area of the acquired image (it is here assumed to be a central portion) is Fourier-transformed, and the integral value of the frequency component over a threshold (indicated by a hatching portion) is evaluated. This integral value of the frequency component over the threshold is evaluated in accordance with a change of the voltage applied or the current supplied, and an image of the largest integral value is thought of as an image with the best sharpness.

In this case, it is only necessary that a mark, such as a three-bar resolution test chart, a bright spot, or a cross line, is used as an object corresponding to the acquired image and when such marks are located at several places in an imaging area and are properly imaged, this image is thought of as the best one.

Since the second method is that after the entire optical system is assembled, the sharpness of an image finally acquired is evaluated, variation in assembly errors of individual optical components constituting the optical system can be eliminated. In addition, the LUT can be made so that the formed image is optimized. Hence, it is desirable that the LUT is finally made by the second method.

From the above description, it is ideal that the LUT used in the optical system of the present invention is made in such a way that before the optical components are incorporated in the optical system, the data of the output information (the applied voltage or the supplied current) corresponding to rough input information (the zoom state and the distance to the object) are secured by the first method, and after assembly, the data of final fine input and output information are furnished by the second method.

Also, "the tolerances of the sharpness of the image" in the present invention refer to at least ⅕–⅗ the value of the MTF of the design value at a frequency by the MTF of the optical system, for instance.

Thus, the constructions in which the LUT made by the above methods is used to determine the value of the optimum voltage applied or the optimum current supplied to the deformable mirror will be described below as the embodiments of the present invention. Also, in each of the embodiments, it is assumed that the reflecting surface of the deformable mirror is conveniently deformed by the application of the voltage.

First Embodiment

Figure 7:
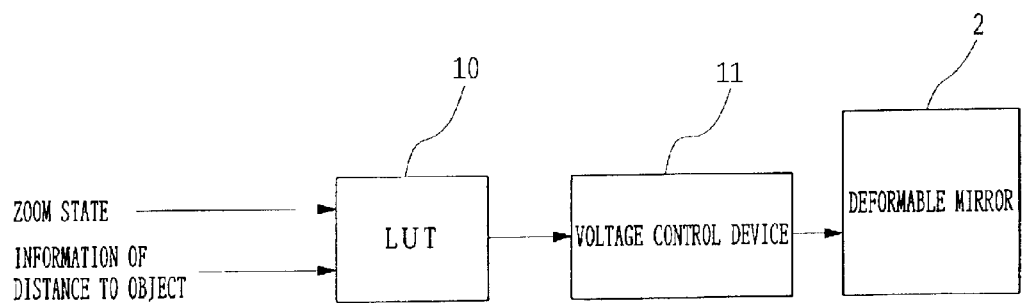
FIG. 7 is a block diagram for determining a voltage applied to the deformable mirror in the optical system of a first embodiment of the present invention.

FIG. 7 is a block diagram for determining the voltage applied to the deformable mirror, with reference to the two-dimensional LUT made by the above methods, in the optical system of the first embodiment of the present invention. As shown in FIG. 7, the zoom state and the information of the distance to the object are input into a two-dimensional LUT 10, and voltage information corresponding to these is input into a voltage control device 11. The voltage control device 11 is such that the voltage corresponding to the input is applied to the deformable mirror 2. In FIG. 7, arrows located on the right side of the LUT 10 are drawn by thicker lines. This means that when the electrode provided on the deformable mirror 2 is divided, voltages to be applied to individual electrodes are different, and thus a plurality of pieces of information are secured. Also, the voltage control device 11 is provided in the optical system of the present invention.

When the zoom state and the distance to the object are found by a sensor on image formation, the input into the LOUT 10 can be determined unambiguously by the output information of the sensor. However, when the information of one of the zoom state and the distance to the object is unclear, the input into the LUT 10 is fixed with respect to known information, and for unclear information, the input into the LUT 10 must be determined in some way.

Thus, in such a case, the input into the LUT 10 is changed in turn to alter the voltage applied to the deformable mirror 2, and the sharpness of the formed image is evaluated in accordance with this alteration so that information at a measuring point where the sharpness of the formed image becomes best in input into the LUT 10. By doing so, the voltage applied to the deformable mirror 2 can be determined.

When both the zoom state and the distance to the object are unclear, the LUT 10 is input in turn to find full output information stored in the LUT 10, and the voltage applied to the deformable mirror 2 is changed in turn on the basis of acquired output information to evaluate the sharpness of the formed image in accordance with this change so that information at a measuring point where the sharpness of the formed image becomes best is set as the input value of the LUT. By doing so, the voltage applied to the deformable mirror 2 can be determined.

Also, although reference has been made to the case where the variable mirror is used, the present invention is not limited to this and, for example, a variable focal-length lens may be used instead of the variable mirror.

When the applied voltage is determined in accordance with the LUT as mentioned above, input information is discrete and thus acquired output information also becomes discrete. When it is assumed that there are n ways for the zoom state and m ways for the distance to the object, the output information of n×m ways is secured. Since the zoom state and the distance to the object are discrete here, they must be subdivided for more accurate control. This requires a tedious examination process and causes a great working cost. Moreover, when the number of divided electrodes is k, a wide memory space of n×m×k is required.

Thus, in the present invention, one of the zoom state and the distance to the object is discretely examined, and for the other, an approximate curve is found in accordance with this discrete information to falsely give information in succession. Consequently, accurate control can be made and the memory space can be reduced.

Here, a description will be given of how to find the approximate curve in reference with FIG. 8. It is assumed that measuring results shown in the figure are obtained with respect to the zoom states (wide-angle, standard, and telephoto positions) and the distances to the object (infinity, 1 m, and 10 cm) at a optimum profile (measuring points are indicated by marks □, Δ, and ○). The approximate equation of a continuous curve passing through the measuring points is found.

Figure 8:
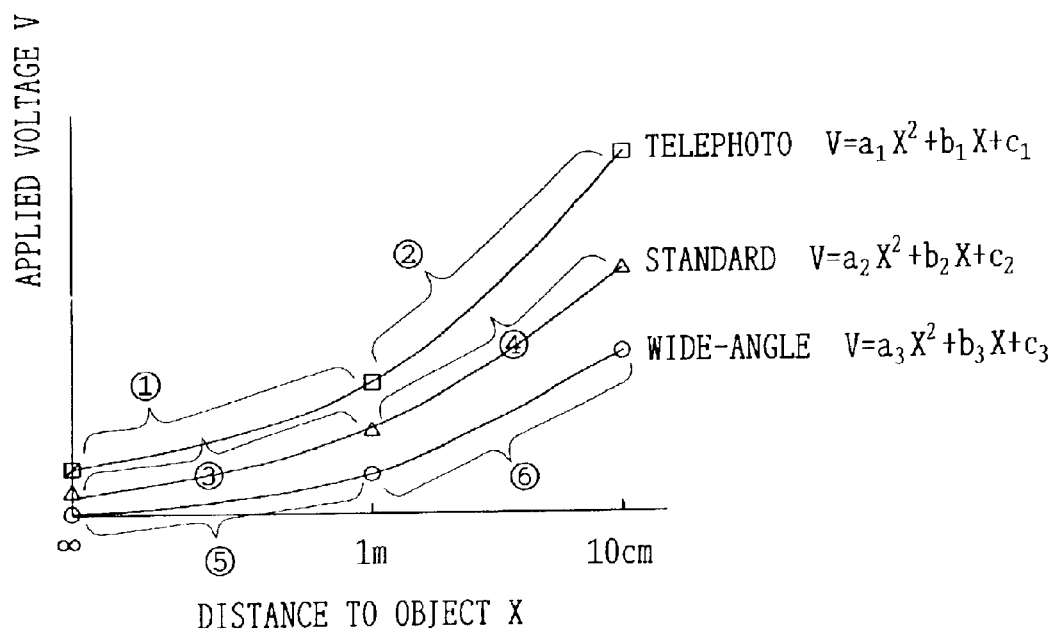
FIG. 8 is a graph showing approximate curves relative to the applied voltage versus the distance to the object that is one example where discrete data used in the optical system of the present invention are converted into approximate curves.

It is assumed that the measuring points are approximated by the approximate equation of a secondary curve shown in FIG. 8. Coefficients $a_1$, $b_1$, and $c_1$ (at the telephoto position), $a_2$, $b_2$, and $c_2$ (at the standard position), and $a_3$, $b_3$, and $c_3$ (at the wide-angle position) of individual curves are prestored in an approximate curve memory 12, to be described later, shown in FIG. 9. Also, this approximate curve memory 12 is provided in the optical system of the present invention.

Now, reference is made to the case where the approximate curve memory storing the coefficients of individual curves is used for actual image formation. In accordance with the information of the zoom state, a corresponding coefficient is first selected through the approximate curve memory. For example, when the zoom state is wide-angle, the coefficients $a_3$, $b_3$, and $c_3$ stored in the approximate curve memory are selected. Subsequently, a variable X ($X_1$ or $X_2$ in the figure) is determined in accordance with the distance to the object. Such information is calculated by an arithmetical unit 13 shown in FIG. 9, and an applied voltage V is finally determined. In this case, although each zoom state is discrete, the distance to the object can be continuously processed. Also, the arithmetical unit 13 is provided in the optical system of the present invention.

When the distance to the object is unclear, the variable X is changed and the sharpness of the formed image is evaluated in accordance with this change to find the variable X where the sharpness is highest. The variable X is calculated, together with the variable corresponding to the zoom state, by the arithmetical unit, and thereby the optimum applied voltage can be determined.

Figure 9:
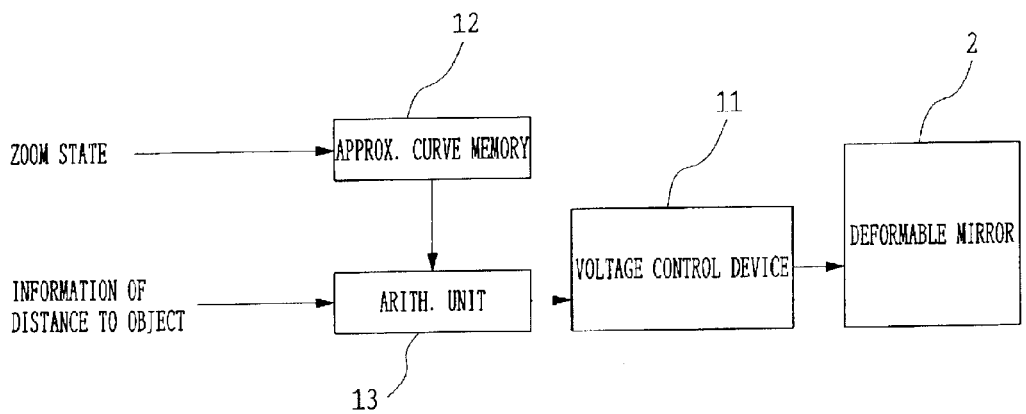
FIG. 9 is a block diagram for determining a voltage applied to the deformable mirror in the optical system of a second embodiment of the present invention.
Figure 10:
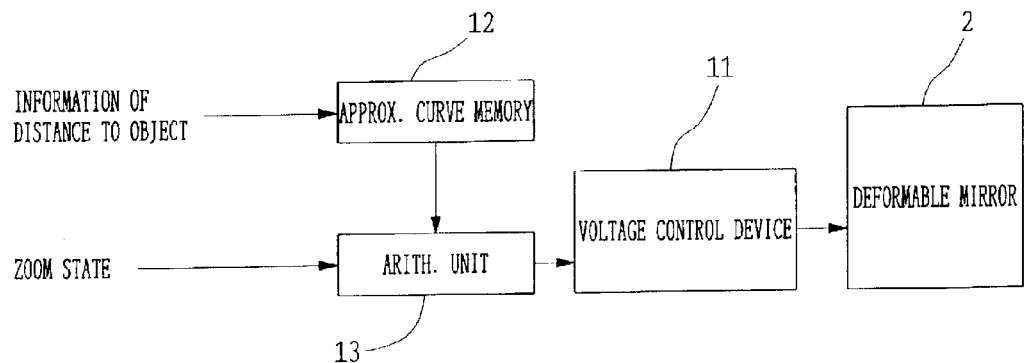
FIG. 10 is a block diagram for determining a voltage applied to the deformable mirror in the optical system of a third embodiment of the present invention.

The constructions where the approximate curve is used to find the optimum applied voltage are shown in FIGS. 9 and 10 as block diagrams for determining the voltage applied to the deformable mirror in the second and third embodiments of the optical system of the present invention.

Second Embodiment

The approximate curve information of the zoom state is stored in the approximate curve memory 12 shown in FIG. 9, and by inputting the zoom state, one approximate curve, with the distance to the object as a variable, is selected. Furthermore, by inputting the distance to the object and the approximate curve information into the arithmetical unit 13, the information of the optimum applied voltage is determined unambiguously. According to the second embodiment, therefore, the zoom state is discrete, but the distance to the object can be continuously processed.

Third Embodiment

The approximate curve information of the distance to the object is stored in the approximate curve memory 12 shown in FIG. 10, and by inputting the distance to the object, one approximate curve, with the zoom state as a variable, is selected. Furthermore, by inputting the zoom state and the approximate curve information into the arithmetical unit 13, the information of the optimum applied voltage is determined unambiguously. According to the third embodiment, therefore, the distance to the object is discrete, but the zoom state can be continuously processed.

Figure 11:
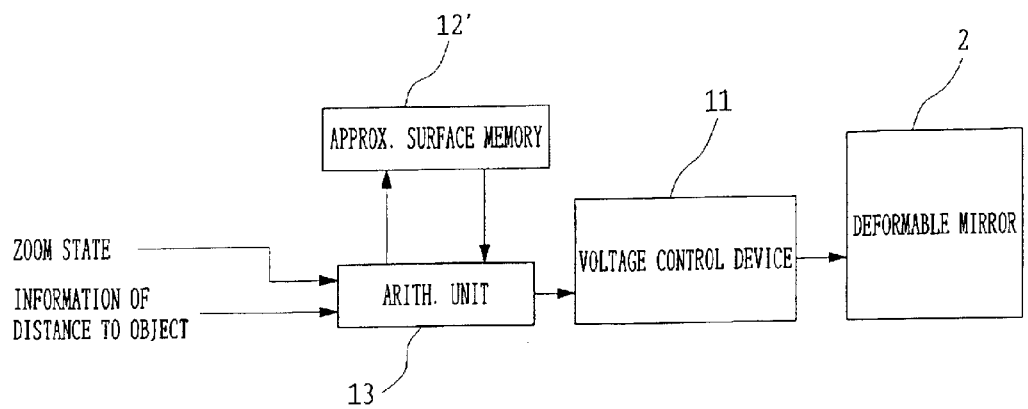
FIG. 11 is a block diagram for determining a voltage applied to the deformable mirror in the optical system of a fourth embodiment of the present invention.

As the application of this, the construction where both the zoom state and the distance to the object are expressed by an approximate surface is shown in FIG. 11 as a block diagram for determining the voltage applied to the deformable mirror in the fourth embodiment of the optical system of the present invention.

Fourth Embodiment

Approximate surface information including the approximate curve information of the distance to the object and the approximate curve information of the zoom state is stored in an approximate surface memory 12' shown in FIG. 11, and a piece of approximate surface information, with the zoom state and the distance to the object as variables, is selected. Furthermore, by inputting the approximate surface information into the arithmetical unit 13, the information of the optimum applied voltage can be determined unambiguously. According to the fourth embodiment, therefore, both the zoom state and the distance to the object can be continuously processed.

Also, in the above embodiments, a zoom optical system has been described. However, in a single focus optical system as well, the construction for determining the applied voltage that drives the deformable mirror in the present invention is applicable.

In this case, the input information is the distance to the object and the output information is the applied voltage, or the supplied current, corresponding to the input information. The LUT, as shown in Table 3 (a single electrode) or 4 (a plurality of electrodes), lists one-dimensional data. In the present invention, the LUT in this case is referred to as a one-dimensional LUT.

TABLE 3

| | | Optimum applied voltage |
|---|---|---|
| Distance | 10 cm | $a_1$ |
| to | 1 m | $a_2$ |
| object | ∞ | $a_3$ |

TABLE 4

| | | Optimum applied voltage | | |
|---|---|---|---|---|
| Distance | 10 cm | $a_{11}$ | $a_{12}$ | $a_{13}$ |
| to | 1 mm | $a_{21}$ | $a_{22}$ | $a_{23}$ |
| object | ∞ | $a_{31}$ | $a_{32}$ | $a_{33}$ |

Figure 12:
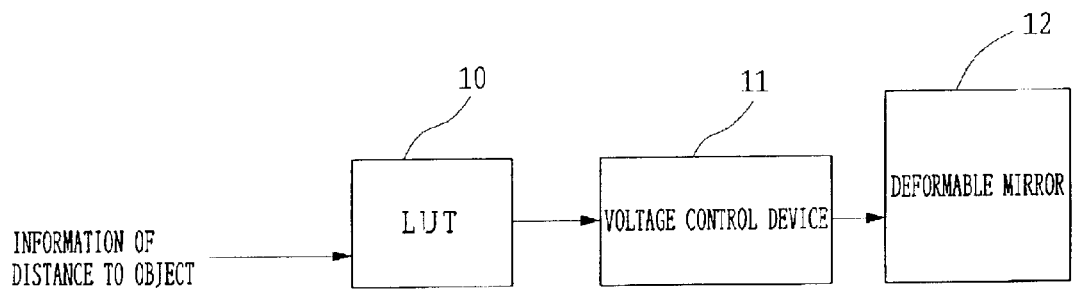
FIG. 12 is a block diagram showing one example where the voltage is applied to the deformable mirror in the optical system in which an optical element of the present invention is not zoom-driven.

When the voltage is applied to the deformable mirror in reference to the one-dimensional LUT, as shown in FIG. 12, the information of the distance to the object is input into the one-dimensional LUT, and the voltage information corresponding to this is input into the voltage control device 11. The voltage control device is such that the voltage corresponding to the input is applied to the deformable mirror 2.

Figure 13:
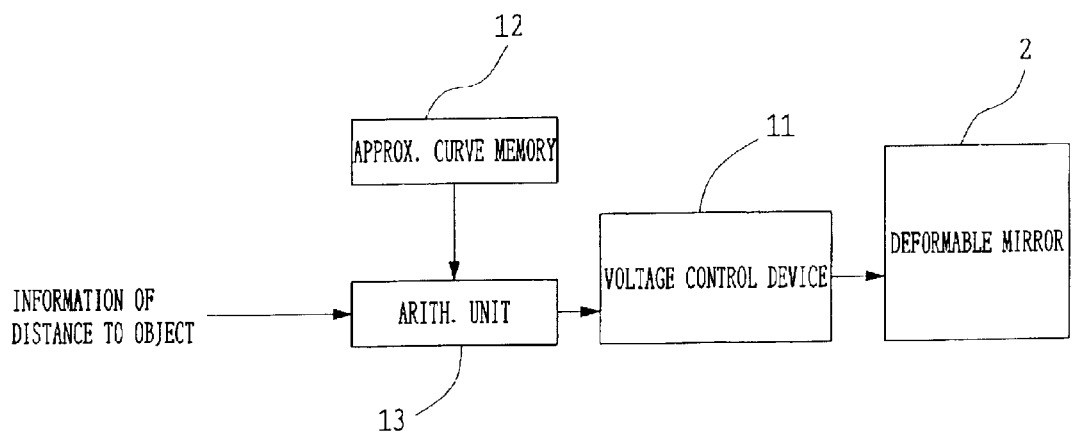
FIG. 13 is a block diagram showing another example where the voltage is applied to the deformable mirror in the optical system in which an optical element of the present invention is not zoom-driven.

When the approximate curve is used to find the optimum applied voltage, as shown in FIG. 13, one approximate curve, with the distance to the object as a variable, is selected for the approximate curve memory 12. Moreover, by inputting the information of the distance to the object and the approximate curve into the arithmetical unit 13, the information of the optimum applied voltage is determined unambiguously.

The one-dimensional LUT includes the amount of shift of a focus position caused by a change of the distance to the object or zooming as a key. The one-dimensional LUT of such a key, in contrast with the two-dimensional LUT including the distance to the object and the zoom state as a key, has the merits that a memory can be saved and the deformable mirror can be controlled with a high speed.

In the above embodiments, reference has been made to the optical system using the deformable mirror driven by applying the voltage. Similarly, in an optical system using the deformable mirror driven by supplying the current, the information of the optimum supplied current can be determined unambiguously through the LUT, through the approximate curve memory 12 and the arithmetical unit 13, or through the approximate surface memory 12' and the arithmetical unit 13.

Further, in the above embodiments, reference has been made to the optical system chiefly using a single deformable mirror. However, an optical system including a plurality of deformable mirrors is also applicable to the present invention. It is only necessary to control each of the deformable mirrors by using a corresponding LUT. A variable mirror whose profile is not changed is also applicable to the present invention. In the present invention, it is assumed that the variable mirror whose profile is not changed comes into the category of the deformable mirror.

Still further, in the above embodiments, reference has been made to the optical system having the deformable mirror. However, in an optical system having a variable focal-length lens as well, the construction for determining the applied voltage or the supplied current that drives the deformable mirror in the present invention is applicable to a construction for determining the applied voltage or the supplied current that drives the variable focal-length lens.

Fifth Embodiment

Figure 14:
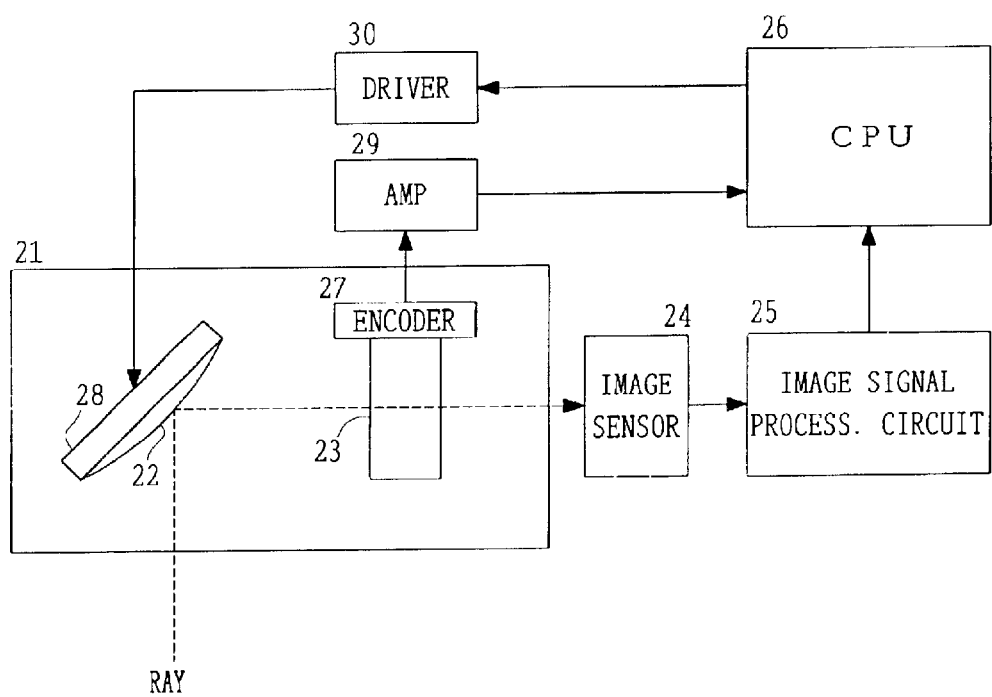
FIG. 14 is a view showing schematically the imaging device of a fifth embodiment of the present invention.

FIG. 14 shows the imaging device of the fifth embodiment in the present invention. The imaging device of this embodiment includes an optical system 21 having a variable mirror 22, a control electrode 28, a moving lens unit 23, and an encoder 27; an image sensor 24; an image signal processing circuit 25; a CPU 26; an amplifier 29; and a driver 30.

Figure 15A:
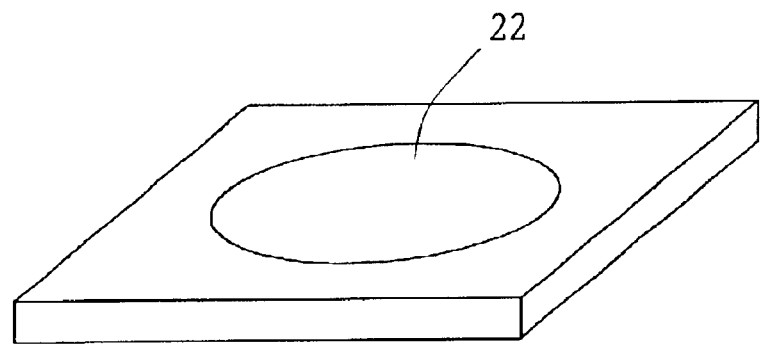
FIGS. 15A and 15B are perspective and sectional views, respectively, showing the shape of the deformable mirror used in the present invention.
Figure 15B:
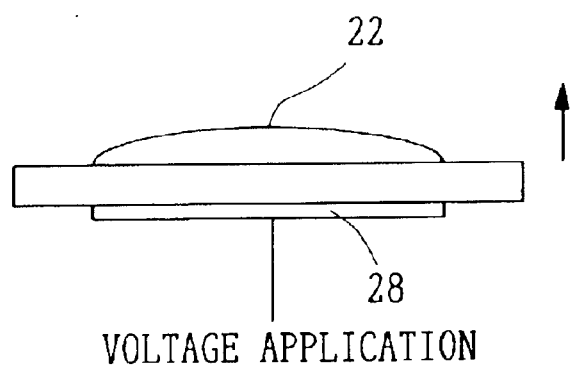

The variable mirror 22 and the control electrode 28 have shapes such as those shown in FIGS. 15A and 15B, and the variable mirror 22 is such that, for example, the profile of a mirror surface is changed in accordance with the amount of voltage applied to the control electrode 28. A detailed structure of the variable mirror will be described later.

Figure 16A:
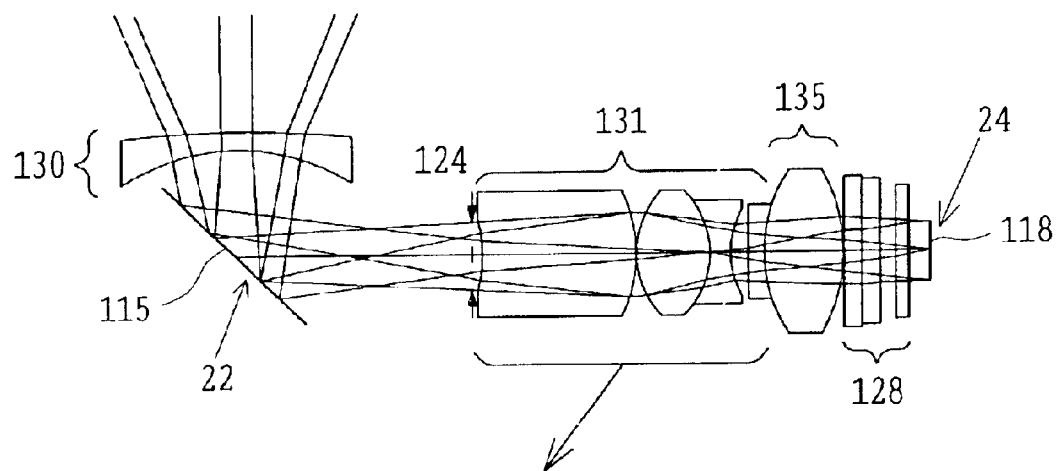
FIGS. 16A and 16B are sectional views showing schematically arrangements, developed along the optical axis, at wide-angle and telephoto positions, respectively, of the optical system of the fifth embodiment.
Figure 16B:
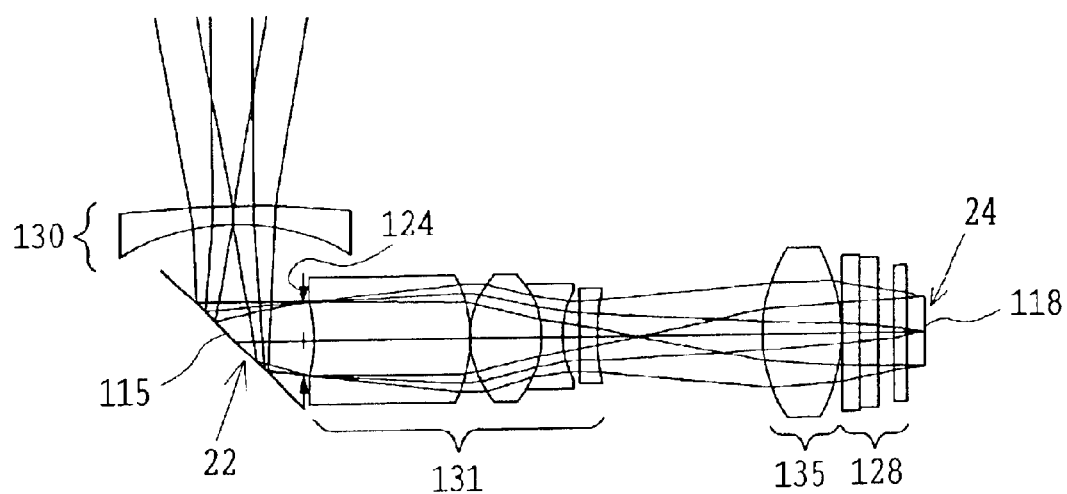

FIGS. 16A and 16B show schematically arrangements of the optical system 21 in the fifth embodiment. In these figures, the control electrode 28 and encoder 27 are omitted for convenience.

The optical system 21, as shown in FIGS. 16A and 16B, has a reflecting surface 115 interposed between a first negative lens unit 130 and a second positive lens unit 131, arranged in this order from the object side. The profile of the reflecting surface 115 is changed, and thereby the reflecting surface of the variable mirror 22 changing the focal length is constructed. The optical system is designed so that the second positive lens unit 131 is moved along the optical axis and thereby a variable magnification function is exercised. It is assumed that the function of such a zoom optical system is referred to as one-lens-unit zoom.

The variable mirror 22 also has a focus function by changing the focal length of the reflecting surface 115. Consequently, there is no need to shift the position of a lens for focusing, and a driving mechanism can be eliminated, thereby affording the merits of compactness and cost reduction. Moreover, the variable mirror 22 has the function of a compensator compensating focus movement for zooming.

When an infinite object point is brought to a focus, the reflecting surface 115 of the variable mirror 22 is changed to a nearly flat shape, while when the nearest object point is focused, the reflecting surface 115 of the variable mirror 22 assumes the concave shape of a free-formed surface.

In this zoom optical system, the first lens unit 130 is constructed with a single negative lens; the second lens unit 131 with three lens components composed of four lens elements of a positive lens, a cemented lens of a positive lens element and a negative lens element, and a negative lens; and a third lens unit 135 with a single positive lens. A plane-parallel plate unit 128 interposed between the third lens unit 135 and an imaging plane 118 includes filters and glass covers.

The image sensor 24 disposed at the imaging plane 118 has a rectangular light-receiving surface, a short side of which is parallel with the plane of the paper. This placement causes an asymmetrical direction of the reflecting surface 115 of the variable mirror 22 to coincide with the short side. This is advantageous for correction for aberration. However, if an advantage is offered to the design of a digital camera, the image sensor may be placed so that its long side is parallel with the plane of the paper.

The reflecting surface 115 of the variable mirror 22 can also be shaped into such a profile as to compensate the degradation of imaging performance due to a manufacturing error. Further, the reflecting surface 115 of the variable mirror 22 can assume such a profile as to compensate the shift of the focus position due to the manufacturing error.

Still further, the reflecting surface 115 of the variable mirror 22 can be shaped into such a profile as to compensate the shift of the focus position caused by the movement of the second lens unit 131.

As mentioned above, in the variable mirror 22, when the distance to the object is changed, its ray reflecting function is altered so that the shift of the focus position or the fluctuation of aberration is compensated. For example, the variable mirror 22 is deformed so that when the distance to the object is changed, the shift of the focus position or the fluctuation of aberration are compensated.

The magnification of the optical system is changed by introducing, removing, or decentering a part of a lens system, and the shift of the focus position or the fluctuation of aberration caused thereby may be compensated by the variable mirror 22.

The optical system 21 is designed so that an image height is 2.82 mm, the F-number is 2.77–4.05, the focal length is 4.58–8.94 mm, and the field angle is 72.8–34.6°.

It is said throughout the whole of the present invention that, in general, the zoom optical system comes into the category of a variable magnification optical system. However, the term "zoom optical system" is sometimes used in the same sense as the variable magnification optical system.

Subsequently, a description is given of the fundamental operation of the imaging device of the fifth embodiment constructed as mentioned above. A zoom operation is first explained. The zoom operation is performed on a manual zoom system by an operator. A signal expressing the position of the moving lens unit 23 is detected by the encoder 27, amplified by the amplifier 29, introduced into the CPU 26 after the A/D conversion, and calculated. In this way, the position of the moving lens unit 23 is found.

A focus operation is then described. In order to bring about the best state of focusing on the basis of the position of the moving lens unit 23 and the distance to the object, the surface of the variable mirror 22 is deformed. A necessary amount of drive of the variable mirror 22 is calculated, in the CPU, from the information of the position of the moving lens unit 23 and the distance to the object. A voltage required to deform the variable mirror 22 by the necessary amount of drive is found, and a signal such that the voltage is applied to the control electrode 28 is output to the driver 30. Whereby, the variable mirror 22 is deformed and focusing is performed. The focus operation is thus completed.

Here, a photographing operation is explained. A ray of light from the object is incident on the optical system 21, is reflected by the variable mirror 22, emerges from the optical system 21 through the moving lens unit 23, and is incident on the image sensor 24 (such as a CCD or CMOS). (Also, in the fifth embodiment, it is assumed that a digital camera is used). An incident ray is converted into photoelectricity through the image sensor 24 and is changed to an electric signal. The electric signal is converted into image signal data through the image signal processing circuit 25. This image signal is variously calculated by the instructions of the CPU 26. The image signal, after being compression-processed, is output for record processing (for example, Smart Media or Compact Flash (the trademark of SanDisk Corporation), not shown), or a thinning process (a process of reducing the number of pixels) is executed for finder indication. The image signal may be used for exposure control, focus control, or white balance control.

Here, reference is made to a common autofocus system with respect to the focus control used in the imaging device.

In a silver halide film camera, the autofocus (AF) system is available in a technique that an object is irradiated with infrared rays and its reflected light is received to calculate the distance and set a lens position (an infrared active technique); a technique that, by utilizing the characteristic that a high-frequency component contained in an image signal in which an optical image formed on the line sensor of a one-dimensional charge coupled device is converted into electricity increases according to a focusing state, the high-frequency component of the image signal is extracted and a photographic lens is shifted in the direction in which its level increases (a contrast technique); or a technique that, by utilizing the characteristic that the optical image passing through the photographic lens is further passed through a separation optical lens (a separator lens), an acquired optical image is further passed through the separation optical lens (the separator lens), and a mutual distance between acquired optical images changes according to the amount of shift from the focusing state, the distance between the images is detected and thereby the focus position of the photographic lens is calculated to shift the photographic lens (a phase contrast technique). In a single-lens reflex camera for silver halide films, the latter (the phase contrast technique) is chiefly used.

Most of video cameras and digital cameras use the technique that the same image sensor for the purpose of recording is used, a detection area is set at about the middle of an image plane to detect the image signal in the detection area, the high-frequency component of the image signal is extracted, and a photographic lens is shifted in the direction in which its level increases (a contrast technique with the image sensor).

Also, the imaging device of the fifth embodiment, not shown in a figure, uses an infrared active AF system as a focus control system (AF).

The imaging device of the fifth embodiment is provided with the look-up table (LUT) that the amount of voltage (deformable mirror driving voltage) required to deform the variable mirror 22 by the necessary amount of drive is stored in a memory, not shown.

Table 5 shows the data of the look-up table used in the fifth embodiment.

TABLE 5

| | Zoom state | | |
|---|---|---|---|
| Distance | Telephoto | Standard | Wide-angle |
| 10 cm | T1 | S1 | W1 |
| 1 m | T2 | S2 | W2 |
| ∞ | T3 | S3 | W3 |

In the LUT, the deformable mirror driving voltage is stored in accordance with the distance to the object and the zoom state. The LUT is retrieved through the CPU 26, with both the distance to the object and the zoom state as a key, and thereby one deformable mirror driving voltage value can be found. The LUT is retrieved, with one of the distance to the object and the zoom state as a key, and thereby a plurality of deformable mirror driving voltage values at a corresponding distance to the object or in a coresponding zoom state can be found.

Each of the data values of the LUT listed in Table 5 is that at a predetermined representative point, and a value between the representative points is interpolated by approximating preset relational expression. It is assumed that the relation of this inter-polation is known here. Also, for convenience of explanation, the LUT is constructed, with the number of control electrodes for driving the deformable mirror as 1.

Figure 17:
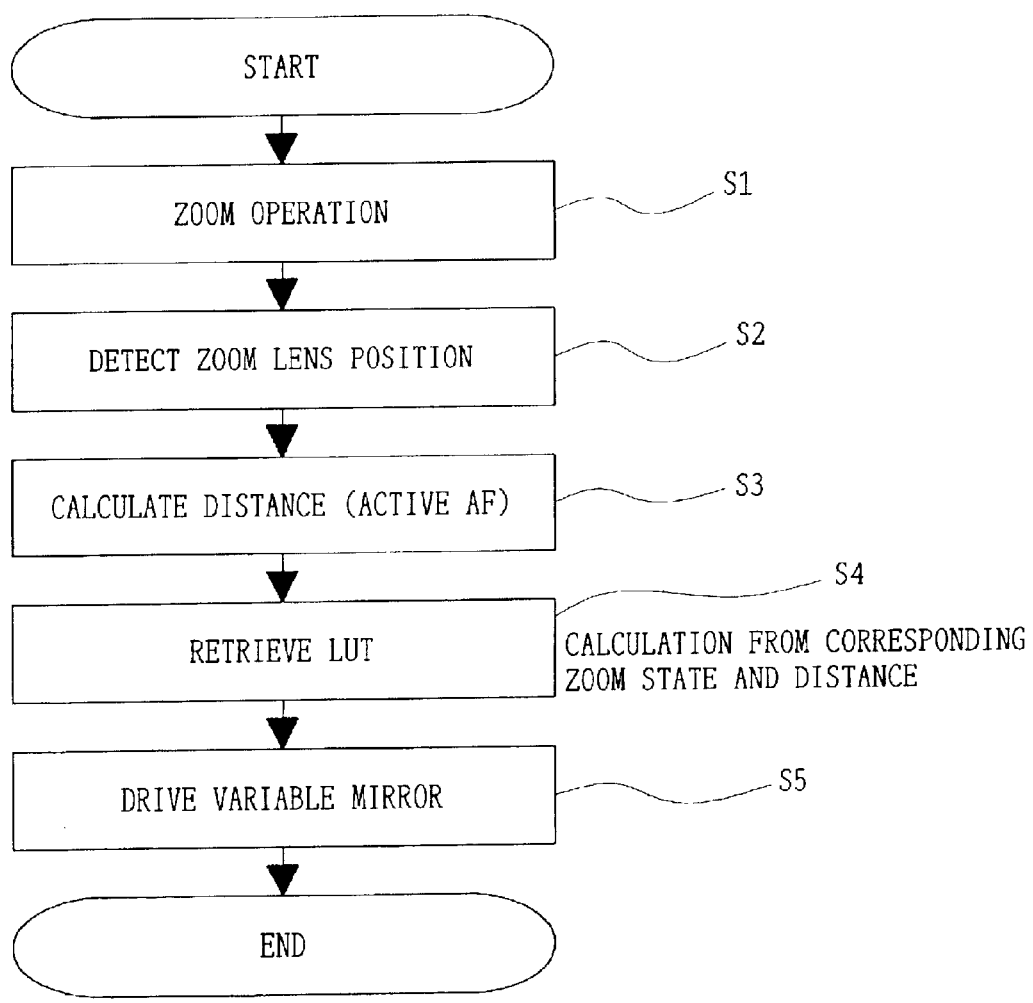
FIG. 17 is a flowchart showing a control process in the imaging device of the fifth embodiment.

Subsequently, a control process from the operation of the moving lens unit 23 to the drive of the variable mirror 22 in the imaging device of the fifth embodiment constructed as mentioned above is described in reference to the flowchart of FIG. 17. When the moving lens unit 23 is operated (Step S1), its position, that is, the zoom state, is detected through the encoder 27 (Step S2). In the imaging device of the fifth embodiment, the AF is of the infrared active system, and thus the distance to the object can be calculated (Step S3).

In the imaging device of the fifth embodiment, since both the zoom state and the distance to the object can be held, the LUT is retrieved, with the zoom state and the distance to the object as a key, to find a voltage value for driving variable mirror 22 by a necessary amount (Step S4). For example, as shown in Table 5, when the zoom state is telephoto and the distance to the object is infinite, it is only necessary to apply the voltage of T3 to the variable mirror 22. By applying this voltage to the control electrode 28, the variable mirror 22 is driven (Step S5) and a series of operations are completed.

Sixth Embodiment

Figure 18:
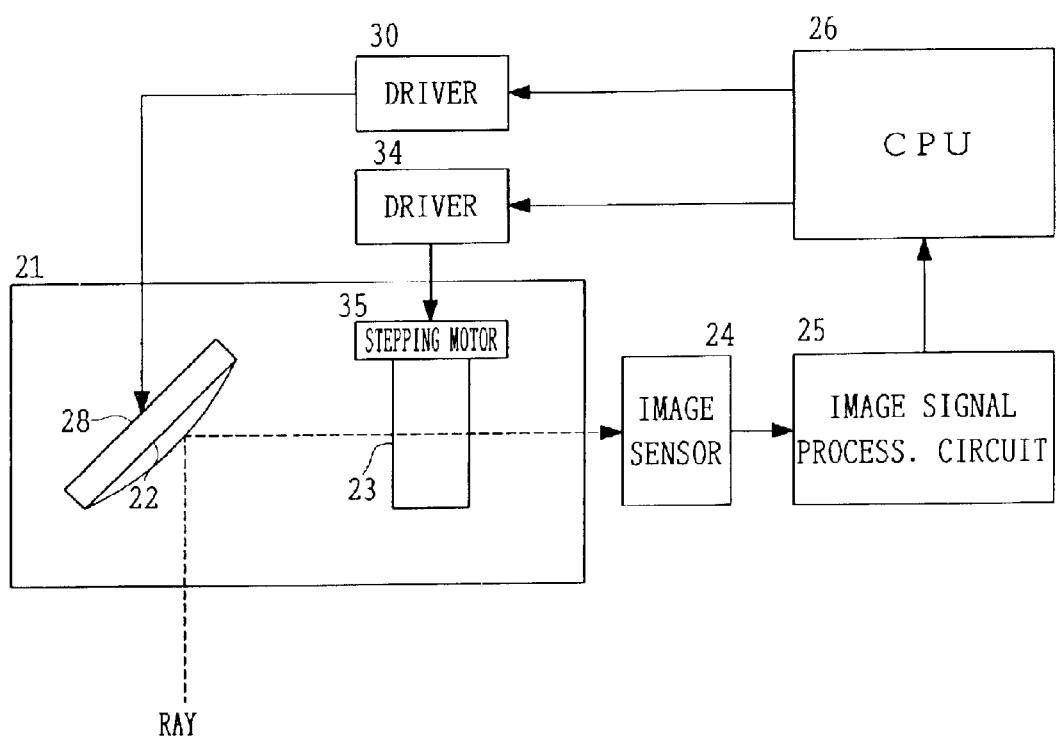
FIG. 18 is a view showing schematically the imaging device of a sixth embodiment of the present invention.

FIG. 18 shows the imaging device of the sixth embodiment in the present invention.

The imaging device of the sixth embodiment, which is a modified example of the fifth embodiment, includes the optical system 21 having the variable mirror 22, the control electrode 28, the moving lens unit 23, and a stepping motor 35; the image sensor 24; the image signal processing circuit 25; the CPU 26; an amplifier 29; a driver 34; and a driver 30. The zoom operation differs from that of the imaging device of the fifth embodiment in FIG. 14.

The zoom operation is performed on an electric zoom system, and when the operator actuates a zoom lever (not shown), the signal is introduce into the CPU and is calculated in the CPU so that a signal for driving the moving lens unit 23 is transmitted to the driver 34. Whereby, the stepping motor 35 is driven. Here, the signal sent to the stepping motor 35 is a pulse signal, and therefore the number of sent pulses and the amount of drive of the moving lens unit 23 are processed at a 1:1 ratio. Hence, in the imaging device of the sixth embodiment, the position of the moving lens unit 23 can be recognized without using the encoder 27 shown in FIG. 14. Other constructions, functions, and effects are the same as those of the fifth embodiment.

Seventh Embodiment

The imaging device of this embodiment has fundamentally the same construction as that of the fifth embodiment of FIG. 14 or the sixth embodiment of FIG. 18. However, the imaging device of the seventh embodiment is different from that of the fifth or sixth embodiment and does not use the infrared active AF system as the focus control system (AF). Thus, the distance to the object cannot be immediately held. Alternatively, in the imaging device of the seventh embodiment, a contrast AF system is used as the focus control system (AF).

Figure 19:
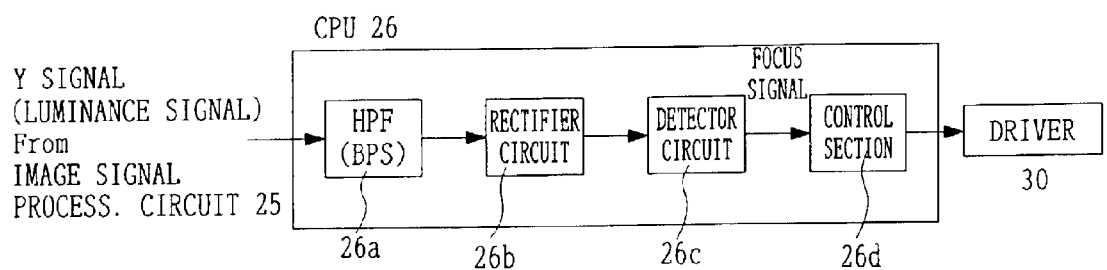
FIG. 19 is a block diagram showing the process of a contrast AF system in a CPU.
Figure 20:
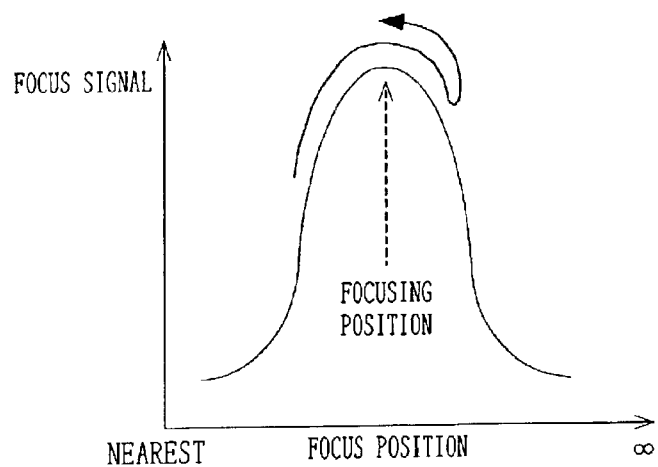
FIG. 20 is a graph showing a focus signal derived from the process of the contrast AF system of FIG. 19 versus the focus position of the optical system of the imaging device of a seventh embodiment according to the present invention.

Here, the contrast AF system used in the present invention is explained with reference to FIGS. 19 and 20. In the contrast AF system of the present invention, as depicted in FIG. 19, an output signal from the image sensor (a CCD or CMOS) 24 of FIG. 14 or 18 is converted, in the image signal processing circuit 25, into a Y signal (a luminance signal), which is input into the CPU 26. In the CPU 26, after the Y signal is passed through a HPF (a high band-pass filter) 26a and is rectified by a rectifier circuit 26b, a high-frequency component is detected in a detector circuit 26c. This high-frequency component is used to perform a control calculation in an arithmetical section 26d.

In the imaging device of the seventh embodiment, when the variable mirror is driven a little in accordance with a predetermined control voltage derived from the LUT, a signal such that the variable mirror 22 is shifted in the direction in which the high-frequency component increases is sent from the CPU 26 to the driver 30 to drive the variable mirror 22.

This process is continuously repeated, and the high-frequency component, as mentioned above, is detected for calculation with respect to the output signal from the image sensor so that a resulting calculated value is compared with a calculated value obtained immediately before. Consequently, the high-frequency component in the present process is maximized, and when the variable mirror 22 is further driven, feedback control is made so that the variable mirror is stopped at the position of the variable mirror where the high-frequency component is maximized when the high-frequency component in the next process reaches the position where it is reduced (see FIG. 20). The point where the high-frequency component is maximized is a focusing position.

Figure 21:
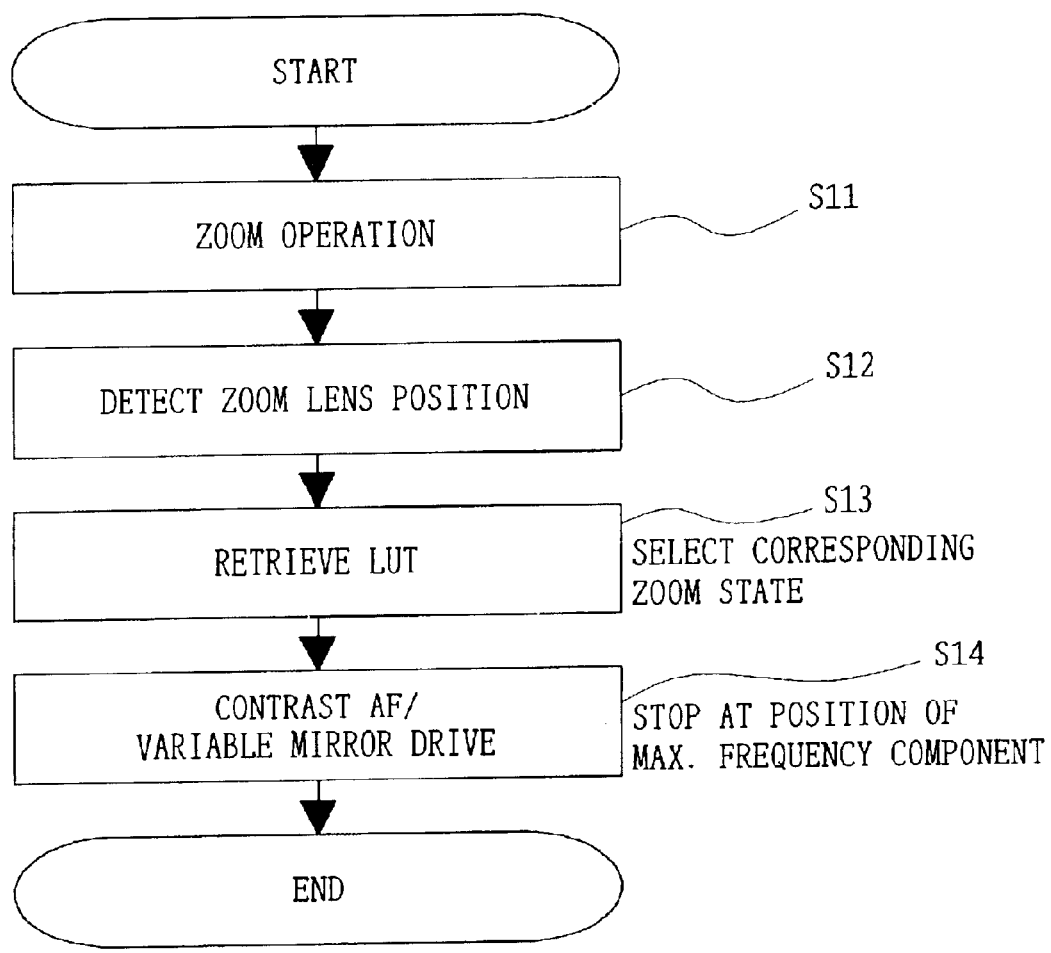
FIG. 21 is a flowchart showing the control process in the imaging device of the seventh embodiment.

Subsequently, a control process from the operation of the moving lens unit 23 to the drive of the variable mirror 22 in the imaging device of the seventh embodiment constructed as mentioned above is described in reference to the flowchart FIG. 21. When the moving lens unit 23 is operated (Step S11), its position, that is, the zoom state, is detected through the encoder 27 (Step S12). In the imaging device of the seventh embodiment, the AF does not use the active system, and thus the distance to the object cannot be directly found. Hence, in the imaging device of the seventh embodiment, the LUT is retrieved, with the zoom state as a key (Step S13), and in accordance with a plurality of voltage values for driving the variable mirror 22 which are column data corresponding to the zoom state in this case (for example, voltage values of T1, T2, and T3 where the zoom state is telephoto in Table 5), the operation of the contrast AF system is performed (Step S14). At the position where the high-frequency component is maximized, the drive of the variable mirror 22 is completed.

Eighth Embodiment

Figure 22:
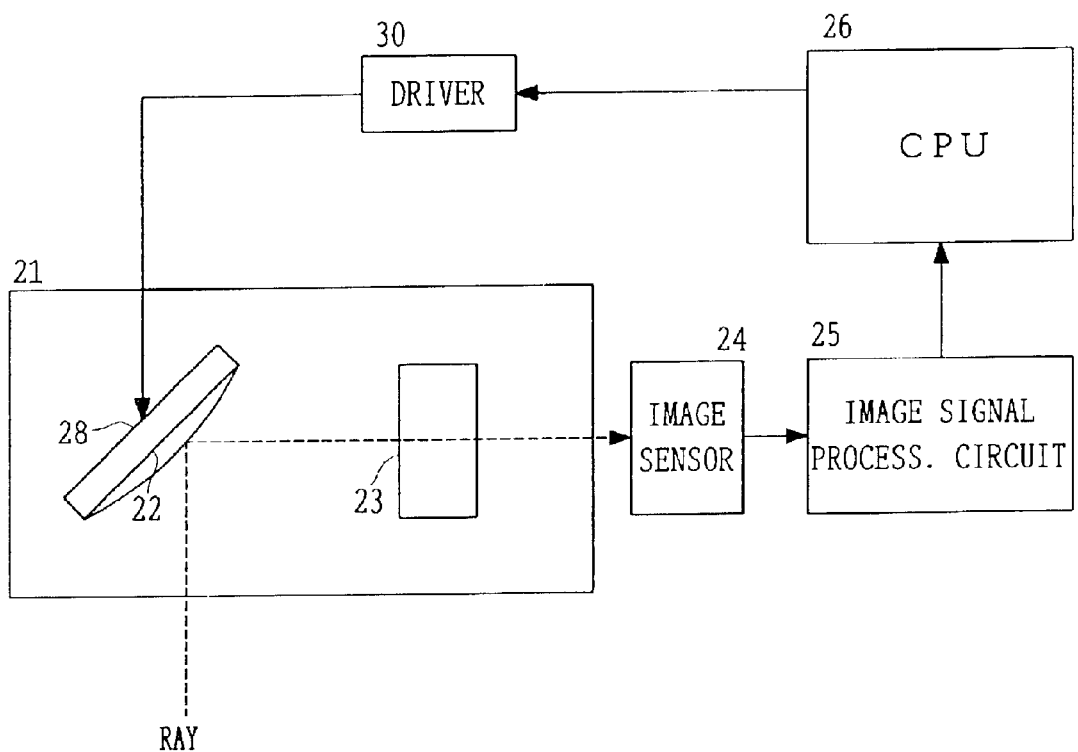
FIG. 22 is a view showing schematically the imaging device of an eighth embodiment of the present invention.

FIG. 22 shows the imaging device of the eighth embodiment in the present invention. The imaging device of this embodiment has a fundamental construction in which the encoder 27 and the amplifier 29 are excluded from the construction of the fifth embodiment of FIG. 14. Specifically, the encoder or the stepping motor is not mounted to the moving lens unit 23. The infrared active AF system is not used as the focus control system (AF). Alternatively, in the imaging device of the eighth embodiment, like the seventh embodiment, the contrast AF system is used as the focus control system (AF).

Figure 23:
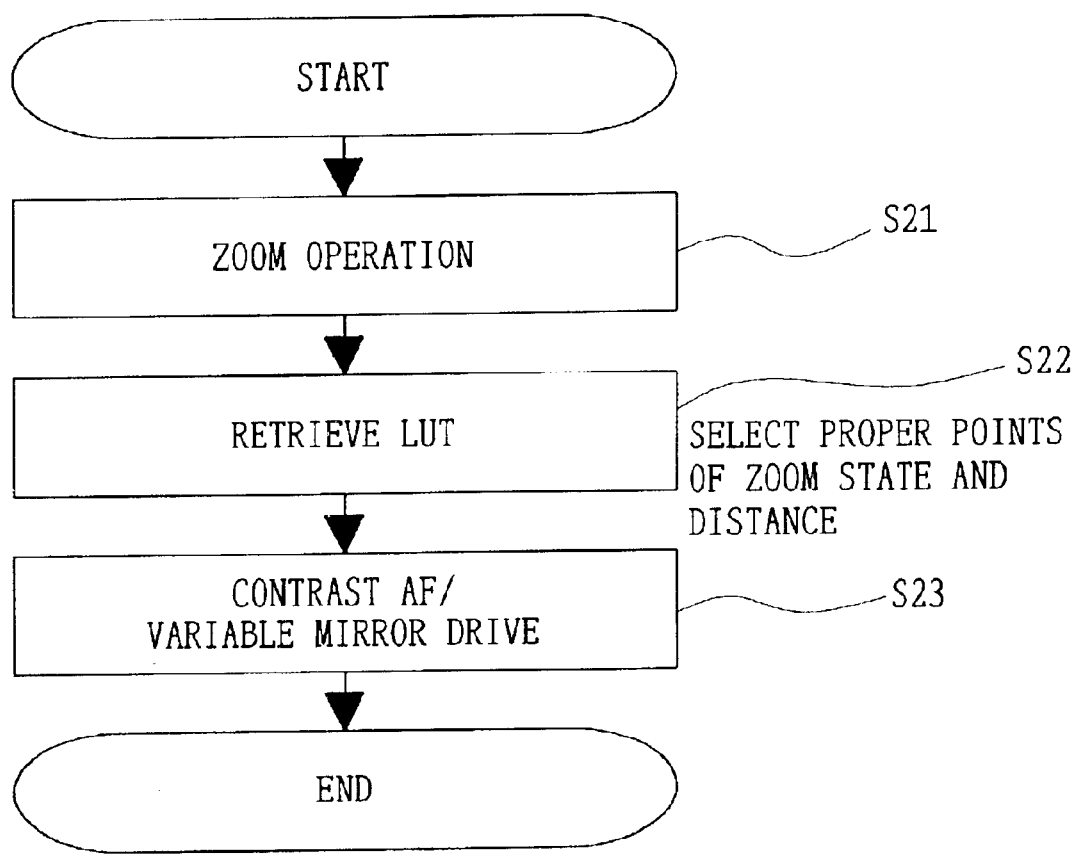
FIG. 23 is a flowchart showing the control process in the imaging device of the eighth embodiment.

Subsequently, a control process from the operation of the moving lens unit 23 to the drive of the variable mirror 22 in the imaging device of the eighth embodiment constructed as mentioned above is described in reference to the flowchart of FIG. 23 The zoom operation is first operated (Step S21). However, the moving lens unit 23 is not provided with the encoder, and thus the zoom state is not detected.

Since the AF of the eighth embodiment does not use the active system, the distance to the object cannot be directly found. Consequently, both the zoom state and the distance cannot be calculated. Thus, in the imaging device of the eighth embodiment, the LUT is retrieved, with a proper zoom state and distance to the object as a key (Step S22), and data of its periphery (for example, in order of T1→T2→T3→S1→S2→S3→W1→W2→W3 in Table 5) are input in succession to perform the operation of the contrast AF (Step S23). At the position where the high-frequency component is maximized, the drive of the variable mirror is completed.

Ninth Embodiment

The imaging device of this embodiment has fundamentally the same construction as that of the eighth embodiment of FIG. 22. However, the imaging device of the ninth embodiment, unlike that of the eighth embodiment, the infrared active AF system is used as the focus control system (AF). As such, the distance to the object can be held immediately.

Figure 24:
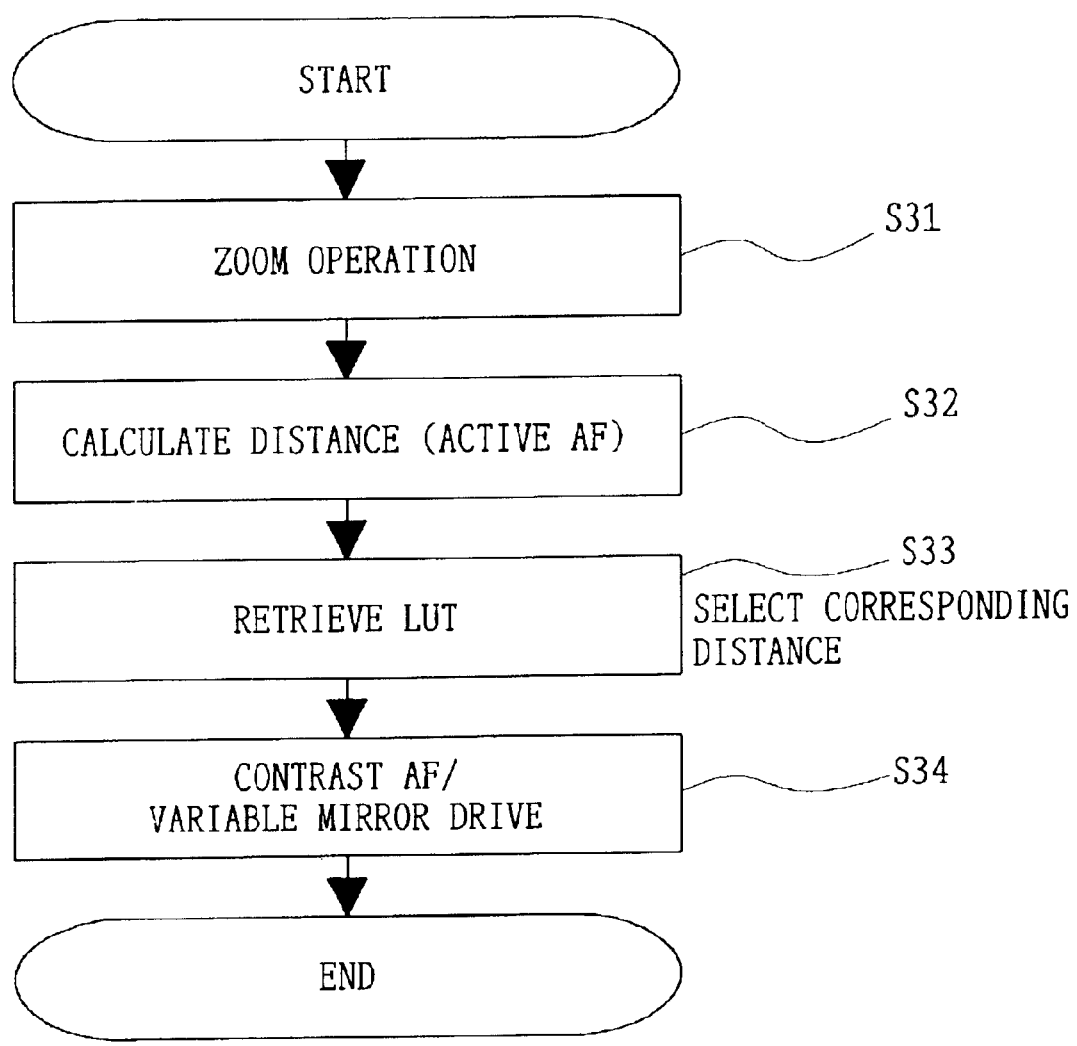
FIG. 24 is a flowchart showing the control process in the imaging device of a ninth embodiment according to the present invention.

Subsequently, a control process from the operation of the moving lens unit 23 to the drive of the variable mirror 22 in the imaging device of the ninth embodiment constructed as mentioned above is described in reference to the flowchart of FIG. 24. The zoom operation is first operated (Step S31). However, the moving lens unit 23 is not provided with the encoder, and thus the zoom state is not detected.

Since the AF of the eighth embodiment uses the infrared active system, the distance to the object can be calculated (Step S32). Thus, in the imaging device of the ninth embodiment, the LUT is retrieved, with the distance to the object as a key (Step S33), and in accordance with a plurality of voltage values for driving the variable mirror 22 which are row data corresponding to the distance to the object in this case (for example, voltage values of T3, S3, and W3 where the distance to the object is infinite in Table 5), the operation of the contrast AF system is performed (Step S34). At the position where the high-frequency component is maximized, the drive of the variable mirror 22 is completed.

Tenth Embodiment

Figure 25:
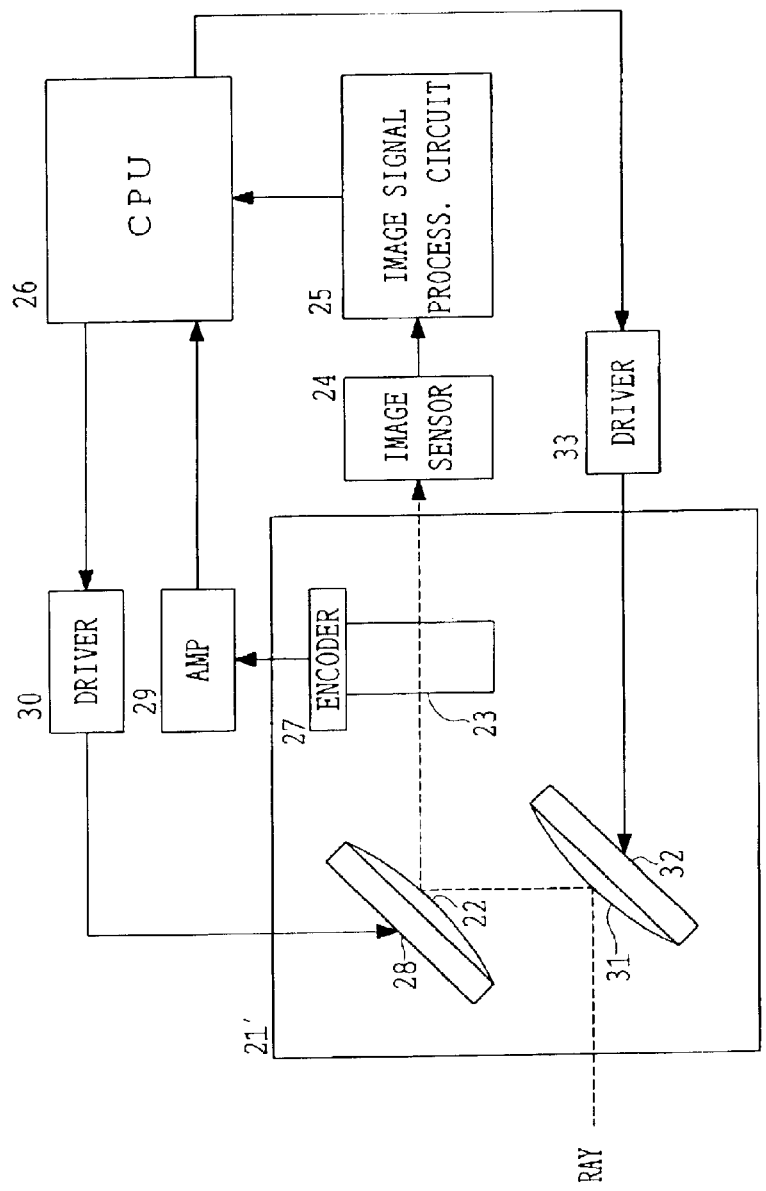
FIG. 25 is a view showing schematically the imaging device of a tenth embodiment of the present invention.

FIG. 25 shows the imaging device of the tenth embodiment in the present invention. The imaging device of the tenth embodiment, as shown in FIG. 25, has the construction that a variable mirror 31, a control electrode 32, and a driver 33 are added to the construction of the fifth embodiment in FIG. 14, and is different from the imaging device of the fifth embodiment in that two variable mirrors 22 and 31 are used and driven in the variable magnification and focus operations.

Figure 26A:
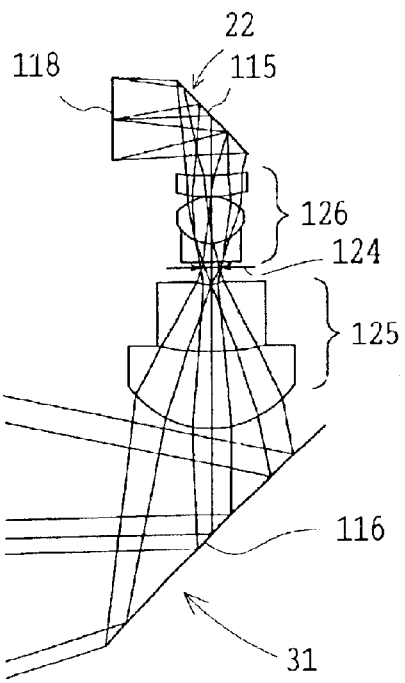
FIGS. 26A and 26B are sectional views showing schematically arrangements, developed along the optical axis, at wide-angle and telephoto positions, respectively, of the optical system of the tenth embodiment.
Figure 26B:
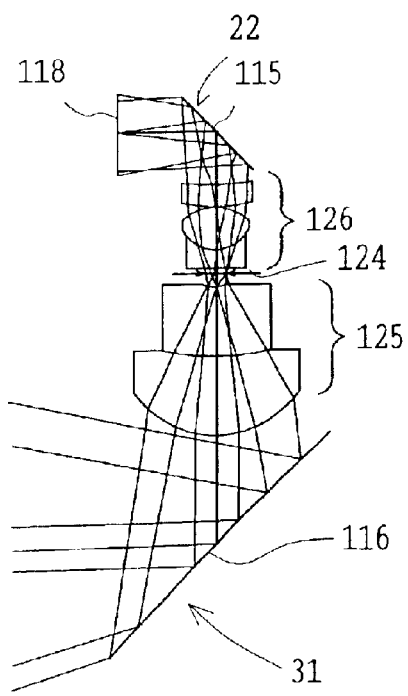

FIGS. 26A and 26B show schematically arrangements of an optical system 21' in the tenth embodiment. In these figures, the control electrodes 28 and 32 and encoder 27 are omitted for convenience.

The optical system 21, as shown in FIGS. 16A and 16B, has the first variable mirror 31 placed on the object side of an rotationally symmetrical lens system including a front lens unit 125 with negative power composed of a cemented doublet and a rear lens unit 126 composed of a double cemented lens and a single lens, with a stop 124 between them, and the second variable mirror 22 interposed between the imaging plane 118 and the lens system so that the aspherical profiles of reflecting surfaces 116 and 115 of the two variable mirrors are changed in association with each other and thereby zooming can be performed together with the movement of the lens units 125 and 126. The optical system may be constructed so that at least one of the variable mirrors contributes to the magnification change of the optical system. There are the merits that, by using the two variable mirrors as in this example, correction for aberration is facilitated and the amount of deformation of one variable mirror can be reduced.

By chiefly using the spherical surface for each lens, without using the free-formed surface, and using a rotationally symmetrical aspherical surface for each of the reflecting surfaces 116 and 115 of the variable mirrors 31 and 22, a variable focal-length objective optical system for digital cameras is constructed. However, each of the reflecting surfaces 116 and 115 may be configured as the free-formed surface or a rotationally asymmetrical aspherical surface. This is advantageous for correction for aberration.

The optical system 21' is designed so that the image height is 2 mm, the F-number is 3.1–3.5, and the focal length is 6.76–8.73 mm. FIGS. 26A and 26B are an example of the one-lens-unit zoom in which a plurality of variable mirrors are used.

Subsequently, a description is given of the fundamental operation of the imaging device of the tenth embodiment constructed as mentioned above. A zoom operation is first explained. The zoom operation is performed on a manual zoom system by an operator. A signal expressing the position of the moving lens unit 23 is detected by the encoder 27, amplified by the amplifier 29, introduced into the CPU 26 after the A/D conversion, and calculated. In this way, the position of the moving lens unit 23 is found. The moving lens unit 23 corresponds to the lens units 125 and 126 of FIGS. 26A and 26B, and the lens units 125 and 126 in this case are integrally moved when the magnification is changed.

The focus operation is then described. In order to bring about the best state of focusing on the basis of the position of the moving lens unit 23 and the distance to the object, the surfaces of the variable mirrors 31 and 22 are deformed. Necessary amounts of drive of the variable mirrors 31 and 22 are calculated, in the CPU, from the information of the position of the moving lens unit 23 and the distance to the object. Voltages required to deform the variable mirrors 31 and 22 by the necessary amounts of drive are found, and signals such that the voltages are applied to the control electrodes 32 and 28 are output to the drivers 33 and 30. Whereby, the variable mirrors 31 and 22 are deformed and focusing is performed. The focus operation is thus completed.

Here, the photographing operation is explained. A ray of light from the object is incident on the optical system 21', is reflected by the variable mirrors 31 and 22, emerges from the optical system 21' through the moving lens unit 23, and is incident on the image sensor 24 (such as a CCD or CMOS). (Also, in the tenth embodiment, it is assumed that a digital camera is used). An incident ray is converted into photoelectricity through the image sensor 24 and is changed to an electric signal. The electric signal is converted into image signal data through the image signal processing circuit 25. This image signal is variously calculated by the instructions of the CPU 26. The image signal, after being compression-processed, is output for record processing (for example, Smart Media or Compact Flash (the trademark of SanDisk Corporation), not shown), or a thinning process (a process of reducing the number of pixels) is executed for finder indication. The image signal may be used for exposure control, focus control, or white balance control.

The imaging device of the tenth embodiment is designed so that the infrared active AF system, not shown, is used as the focus control system (AF). The contrast AF system may be used.

The imaging device of the tenth embodiment is provided with the look-up table (LUT) that the amounts of voltages (deformable mirror driving voltages) required to deform the variable mirrors 22 and 31 by the necessary amounts of drive are stored in a memory, not shown.

Table 6 shows the data of the look-up table used in the tenth embodiment.

TABLE 6

| | Zoom state | | | | | |
|---|---|---|---|---|---|---|
| | Telephoto | | Standard | | Wide-angle | |
| Distance | 1st mirror | 2nd mirror | 1st mirror | 2nd mirror | 1st mirror | 2nd mirror |
| 10 cm | T11 | T21 | S11 | S21 | W11 | W21 |
| 1 m | T12 | T22 | S12 | S22 | W12 | W22 |
| ∞ | T13 | T23 | S13 | S23 | W13 | W23 |

In the LUT, the deformable mirror driving voltages of the first and second variable mirrors 31 and 22 are stored in accordance with the distance to the object and the zoom state. The LUT is retrieved through the CPU 26, with both the distance to the object and the zoom state as a key, and thereby one deformable mirror driving voltage value can be found with respect to each of the first and second variable mirrors 31 and 22. The LUT is retrieved, with one of the distance to the object and the zoom state as a key, and thereby a plurality of deformable mirror driving voltage values at a corresponding distance to the object or in a coresponding zoom state can be found with respect to each of the first and second variable mirrors 31 and 22.

Each of the data values of the LUT listed in Table 6 is that at a predetermined representative point, and a value between the representative points is interpolated by approximating a preset relational expression. It is assumed that the relation of this interpolation is known here. Also, for convenience of explanation, the LUT is constructed, with the number of control electrodes for driving each deformable mirror as 1.

Subsequently, a control process from the operation of the moving lens unit 23 to the drive of the variable mirrors 31 and 22 in the imaging device of the tenth embodiment constructed as mentioned above is described in reference to the flowchart of FIG. 17 as in the fifth embodiment. When the moving lens unit 23 is operated (Step S1), its position, that is, the zoom state, is detected through the encoder 27 (Step S2). In the imaging device of the tenth embodiment, the AF is of the infrared active system, and thus the distance to the object can be calculated (Step S3).

In the imaging device of the tenth embodiment, since both the zoom state and the distance to the object can be held, the LUT is retrieved, with the zoom state and the distance to the object as a key, to find voltage values for driving the variable mirrors 31 and 22 by necessary amounts (Step S4). For example, as shown in Table 6, when the zoom state is telephoto and the distance to the object is infinite, it is only necessary to apply the voltage of T13 to the variable mirror 31 and the voltage of T23 to the variable mirror 22. By applying these voltages to the control electrodes 32 and 28, the variable mirrors 31 and 22 are driven (Step S5) and a series of operations are completed.

In the embodiment of FIG. 25, the long side of the image sensor may be parallel with the plane of the paper. That is, the long side of the image sensor may be parallel with the plane of incidence of an axial ray on the variable mirror. It is for this reason that the ability to correct aberration is excellent because of the two variable mirrors. That the orientation of the image sensor is chosen at will is advantageous for the design of the digital camera.

Eleventh Embodiment

Figure 27:
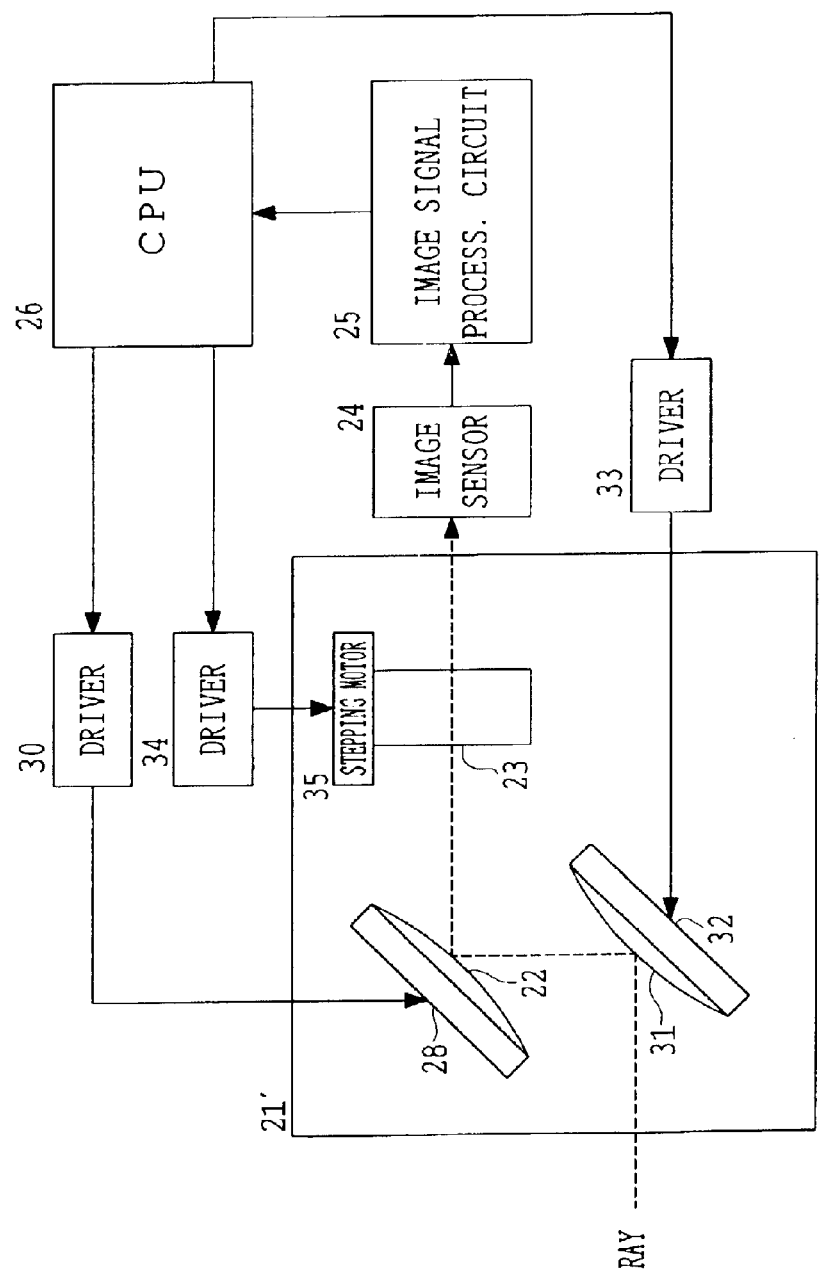
FIG. 27 is a view showing schematically the imaging device of an eleventh embodiment of the present invention.

FIG. 27 shows the imaging device of the eleventh embodiment in the present invention. The imaging device of this embodiment, which is a modified example of the tenth embodiment, includes the optical system 21' having the first and second variable mirrors 31 and 22, the control electrodes 32 and 28, the moving lens unit 23, and the stepping motor 35; the image sensor 24; the image signal processing circuit 25; the CPU 26; the driver 34; and drivers 33 and 30. The zoom operation differs from that of the imaging device of the tenth embodiment in FIG. 25.

The zoom operation is performed on an electric zoom system, and when the operator actuates a zoom lever (not shown), the signal is introduced into the CPU 26 and is calculated in the CPU so that a signal for driving the moving lens unit 23 is transmitted to the driver 34. Whereby, the stepping motor 35 is driven. Here, the signal sent to the stepping motor 35 is a pulse signal, and therefore the number of sent pulses and the amount of drive of the moving lens unit 23 are processed at a 1:1 ratio. Hence, in the imaging device of the eleventh embodiment, the position of the moving lens unit 23 can be recognized without using the encoder 27 shown in FIG. 25. Other constructions, functions, and effects are the same as those of the tenth embodiment.

Each of the tenth and eleventh embodiments may be designed so that the moving lens unit 23 is fixed and the magnification change and focusing, the focus shift involved in the magnification change, and the fluctuation of aberration are compensated by only deforming the two variable mirrors. In this case, the position detecting means of the moving lens unit is not required, and it is only necessary to study the LUT corresponding to the zoom state indicated by the operator and drive the two variable mirrors into optimum shapes. Such a variable mirror control technique can be utilized for other embodiments and is also applicable to the embodiment using the variable focal-length lens instead of the variable mirror.

Twelfth Embodiment

The imaging device of this embodiment has fundamentally the same construction as that of the tenth embodiment of FIG. 25 or the eleventh embodiment of FIG. 27. However, the imaging device of the twelfth embodiment is different from that of the tenth or eleventh embodiment and does not use the infrared active AF system as the focus control system (AF). Thus, the distance to the object cannot be immediately held. Alternatively, in the imaging device of the twelfth embodiment, the contrast AF system is used as the focus control system (AF).

Subsequently, a control process from the operation of the moving lens unit 23 to the drive of the variable mirrors 31 and 22 in the imaging device of the twelfth embodiment constructed as mentioned above is described in reference to FIG. 21 as in the seventh embodiment. When the moving lens unit 23 is operated (Step S11), its position, that is, the zoom state, is detected through the encoder 27 (Step S12). In the imaging device of the twelfth embodiment, the AF does not use the active system, and thus the distance to the object cannot be directly found. Hence, in the imaging device of the twelfth embodiment, the LUT is retrieved, with the zoom state as a key (Step S13), and in accordance with a plurality of voltage values for driving the variable mirrors 31 and 22 which are row data corresponding to the zoom state in this case (for example, voltage values of T11 and T21; T12 and T22; and T13 and T23 where the zoom state is telephoto in Table 6), the operation of the contrast AF system is performed (Step S14). At the position where the high-frequency component is maximized, the drive of the variable mirrors 31 and 22 is completed.

Thirteenth Embodiment

Figure 28:
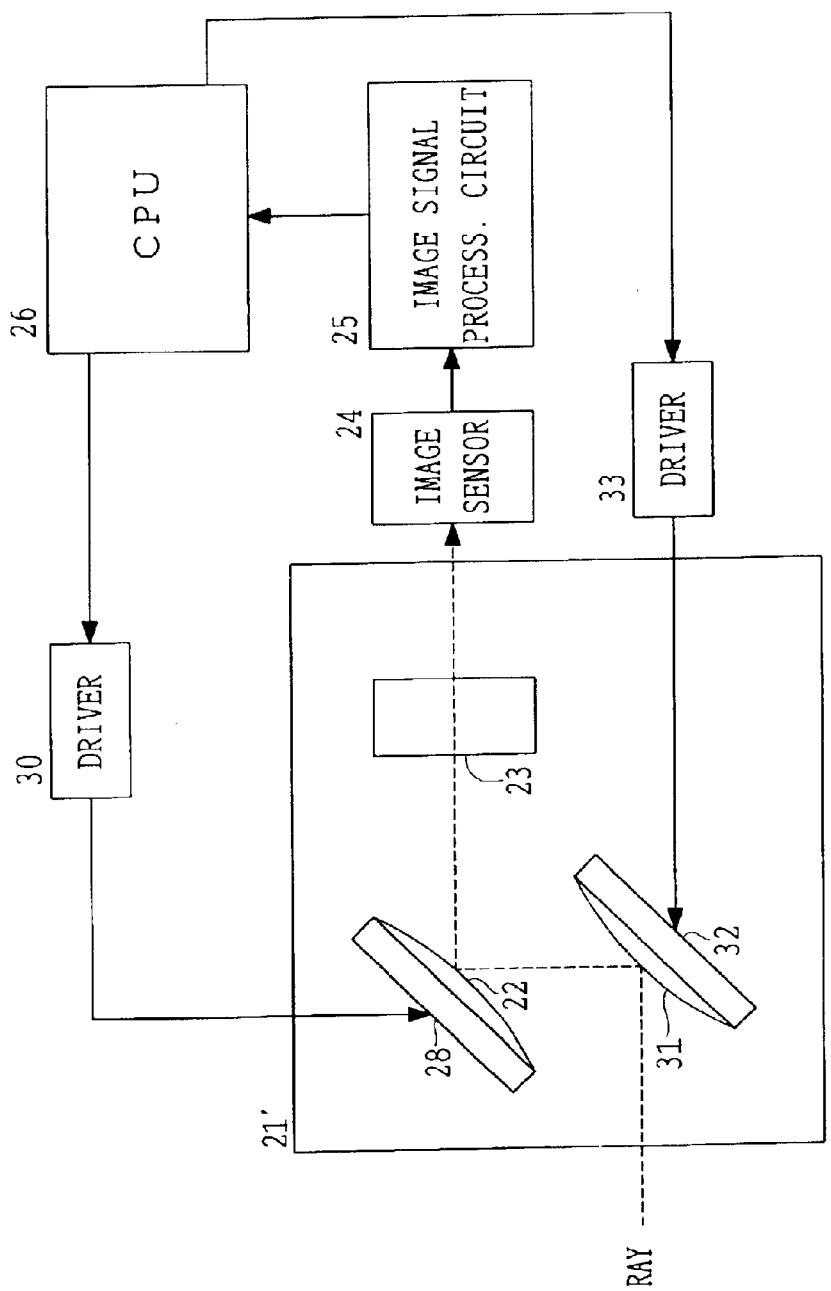
FIG. 28 is a view showing schematically the imaging device of a thirteenth embodiment of the present invention.

FIG. 28 shows the imaging device of the thirteenth embodiment in the present invention. The imaging device of this embodiment has a fundamental construction in which the encoder 27 and the amplifier 29 are excluded from the construction of the tenth embodiment of FIG. 25. Specifically, the encoder or the stepping motor is not mounted to the moving lens unit 23. The infrared active AF system is not used as the focus control system (AF). Alternatively, in the imaging device of the thirteenth embodiment, like the twelfth embodiment, the contrast AF system is used as the focus control system (AF).

Subsequently, a control process from the operation of the moving lens unit 23 to the drive of the variable mirrors 31 and 22 in the imaging device of the thirteenth embodiment constructed as mentioned above is described in reference to FIG. 23 as in the eighth embodiment. The zoom operation is first operated (Step S21). However, the moving lens unit 23 is not provided with the encoder, and thus the zoom state is not detected.

Since the AF of the thirteenth embodiment does not use the active system, the distance to the object cannot be directly found. Consequently, both the zoom state and the distance cannot be calculated. Thus, in the imaging device of the thirteenth embodiment, the LUT is retrieved, with a proper zoom state and distance to the object as a key (Step S22), and data of its periphery (for example, in order of T11 and T21→T12 and T22→T13 and T23→S11 and S21→S12 and S22→S13 and S23→W11 and W21→W12 and W22→W13 and W23 in Table 6) are input in succession to perform the operation of the contrast AF (Step S23). At the position where the high-frequency component is maximized, the drive of the variable mirrors is completed.

Fourteenth Embodiment

The imaging device of this embodiment has fundamentally the same construction as that of the thirteenth embodiment of FIG. 28. However, the imaging device of the fourteenth embodiment, unlike that of the thirteenth embodiment, the infrared active AF system is used as the focus control system (AF). As such, the distance to the object can be held immediately.

Subsequently, a control process from the operation of the moving lens unit 23 to the drive of the variable mirrors 31 and 22 in the imaging device of the ninth embodiment constructed as mentioned above is described in reference to FIG. 24 as in the ninth embodiment. The zoom operation is first operated (Step S31) However, the moving lens unit 23 is not provided with the encoder, and thus the zoom state is not detected. Since the AF of the fourteenth embodiment uses the infrared active system, the distance to the object can be calculated (Step S32).

Thus, in the imaging device of the fourteenth embodiment, the LUT is retrieved, with the distance to the object as a key (Step S33), and in accordance with a plurality of voltage values for driving the first and second variable mirrors 31 and 22 which are row data corresponding to the distance to the object in this case (for example, voltage values of T13 and T23, S13 and S23, and W13 and W23 where the distance to the object is infinite in Table 6), the operation of the contrast AF system is performed (Step S34).

At the position where the high-frequency component is maximized, the drive of the variable mirrors 31 and 22 is completed.

In the above description, each of the reflecting surfaces of the variable mirrors shown in FIGS. 14–28 is shaped into a convex form, but it may, of course, be concave. Also, although each of the variable mirrors is driven on the voltage, it may be driven on the current, and this case also falls within the scope of the present invention.

Figure 29:
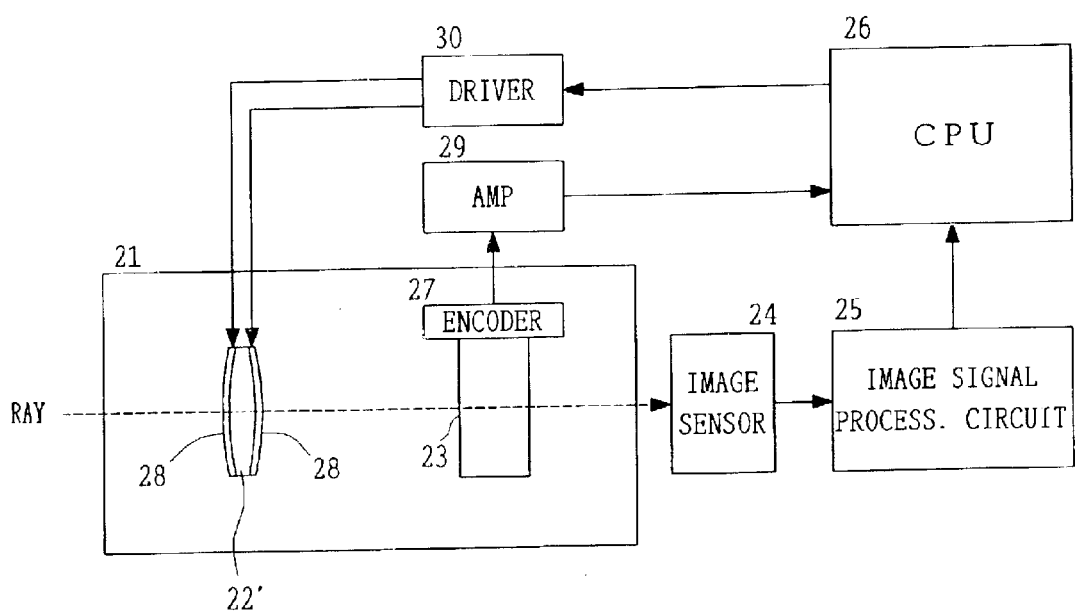
FIG. 29 is a view showing schematically the imaging device of a fourteenth embodiment of the present invention, using a variable focal-length lens.
Figure 30:
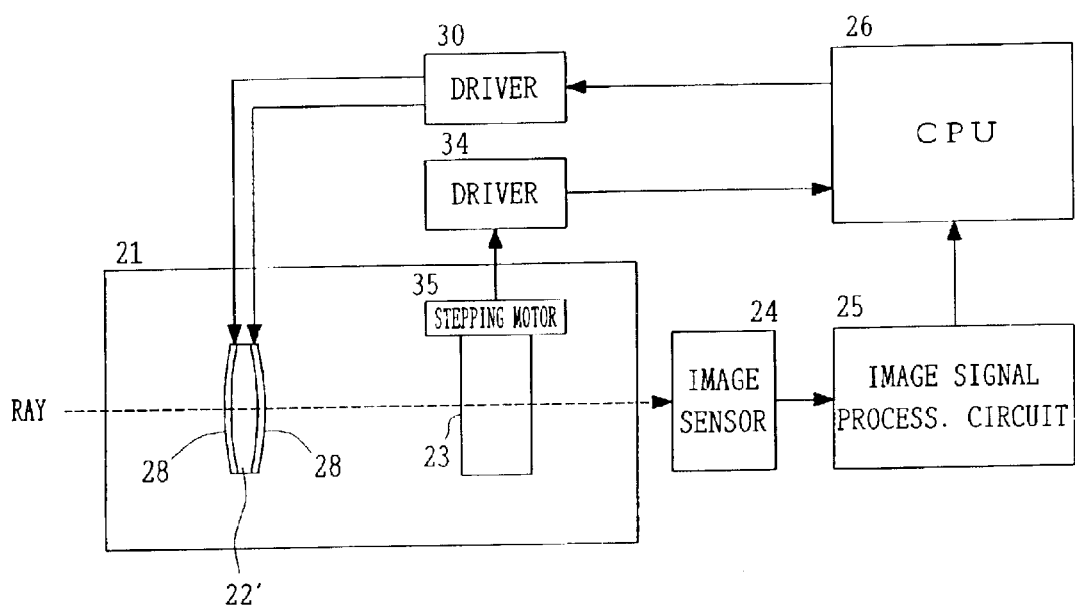
FIGS. 30 and 31 are views showing other examples of the imaging device of the fourteenth embodiment, using variable focal-length lenses.
Figure 31:
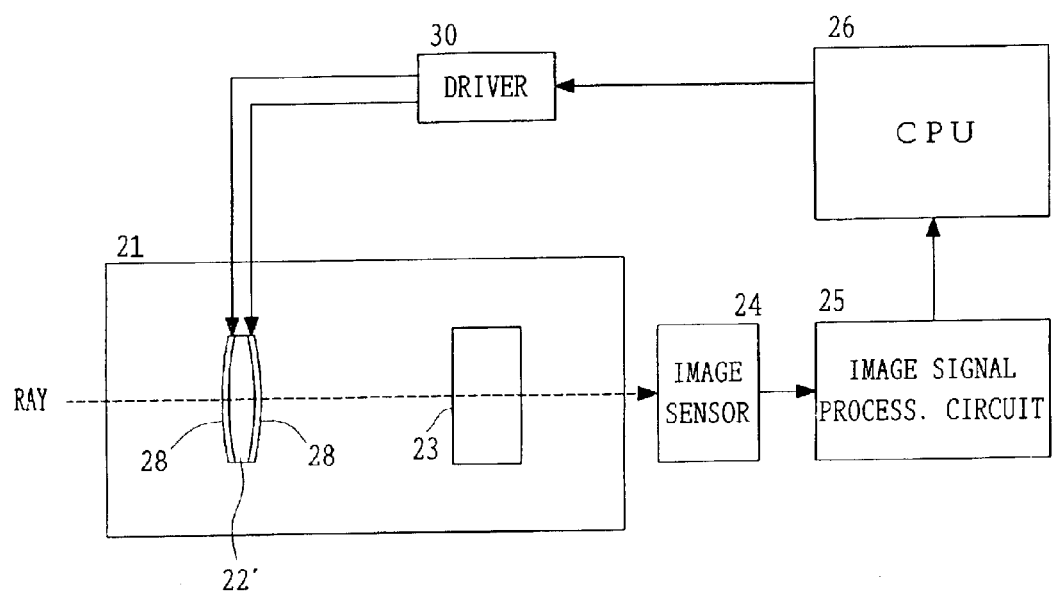

In the above embodiments, reference has been made to the case where the variable mirror is used, but, for example, even when a variable focal-length lens 22', as shown in FIGS. 29–31, is used instead of the variable mirror, the same effect can be obtained.

In the disclosure so far, reference has been made to examples where the look-up table is chiefly used to control the variable optical-property optical element. However, the look-up table need not necessarily be used. It is only necessary to provide some control information controlling the variable optical-property optical element in the optical apparatus, and such a case also falls within the scope of the present invention.

Subsequently, a description will be given of the examples of structures of the variable mirror, the variable focal-length lens, and the like which are applicable to the present invention.

A deformable mirror whose reflecting surface is deformed and a variable focal-length mirror whose reflecting surface is not deformed, such as that of FIG. 57 to be described later, fall under the class of the variable mirror.

Figure 32:
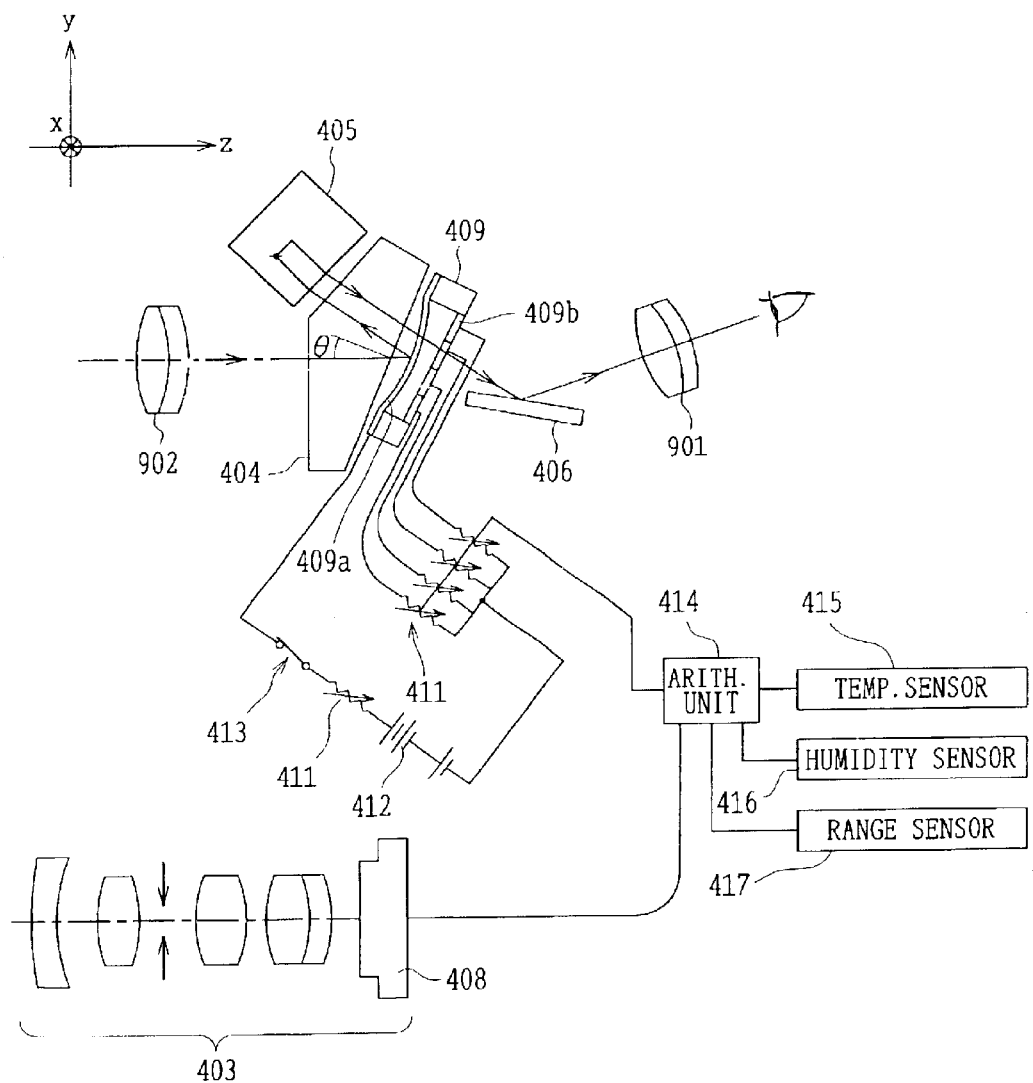
FIG. 32 is a view showing schematically a Keplerian finder for a digital camera using a variable optical-property mirror as the deformable mirror used in the imaging device of the present invention.

FIG. 32 shows a Keplerian finder for a digital camera using a variable optical-property mirror as the variable mirror used in the imaging device of the present invention. It can, of course, be used for a silver halide film camera. Reference is first made to a variable optical-property mirror 409.

The variable optical-property mirror 409 refers to an optical-property deformable mirror (which is hereinafter simply called the deformable mirror) comprised of a thin film (reflecting surface) 409a coated with aluminum and a plurality of electrodes 409b. Reference numeral 411 denotes a plurality of variable resistors connected to the electrodes 409b; 412 denotes a power supply connected between the thin film 409a and the electrodes 409b through the variable resistors 411 and a power switch 413; 414 denotes an arithmetical unit for controlling the resistance values of the variable resistors 411; and 415, 416, and 417 denote a temperature sensor, a humidity sensor, and a range sensor, respectively, connected to the arithmetical unit 414, which are arranged as shown in the figure to constitute one optical apparatus.

Each of the surfaces of an objective lens 902, an eyepiece 901, a prism 404, an isosceles rectangular prism 405, a mirror 406, and the deformable mirror 409 need not necessarily be planar, and may have any shape such as a spherical or rotationally symmetrical aspherical surface; a spherical, planar, or rotationally symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In general, such a surface is hereinafter referred as to an extended surface.

The thin film 409a, like a membrane mirror set forth, for example, in "Handbook of Microlithography, Micromachining and Microfabrication", by P. Rai-Choudhury, Volume 2: Micromachining and Microfabrication, p. 495, FIG. 8.58, SPIE PRESS, or Optics Communication, Vol. 140, pp. 187–190, 1997, is such that when the voltage is applied across the plurality of electrodes 409b, the thin film 409a is deformed by the electrostatic force and its surface profile is changed. Whereby, not only can focusing be adjusted to the diopter of an observer, but also it is possible to suppress deformations and changes of refractive indices, caused by temperature and humidity changes of the lenses 902 and 901 and/or the prism 404, the isosceles rectangular prism 405, and the mirror 406, or the degradation of imaging performance by the expansion and deformation of a lens frame and assembly errors of parts, such as optical elements and frames. In this way, a focusing adjustment and correction for aberration produced by the focusing adjustment can be always properly made.

Figure 34:
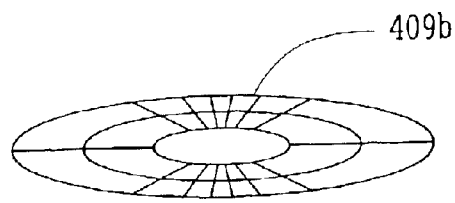
FIG. 34 is an explanatory view showing one aspect of electrodes used in the deformable mirror of the embodiment of FIG. 33.
Figure 35:
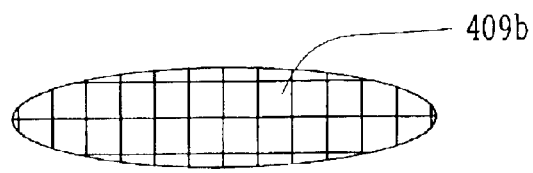
FIG. 35 is an explanatory view showing another aspect of electrodes used in the deformable mirror of the embodiment of FIG. 33.

Also it is only necessary that the shape of the electrodes 409b, for example, as shown in FIGS. 34 and 35, is selected in accordance with the deformation of the thin film 409a.

According to the embodiment, light from an object is refracted by the entrance and exit surfaces of the objective lens 902 and the prism 404, and after being reflected by the deformable mirror 409, is transmitted through the prism 404. The light is further reflected by the isosceles rectangular prism 405 (in FIG. 32, a mark + on the optical path indicates that a ray of light travels toward the back side of the plane of the page), and is reflected by the mirror 406 to enter the eye through the eyepiece 901. As mentioned above, the lenses 902 and 901, the prisms 404 and 405, and the deformable mirror 409 constitute the observing optical system of the optical apparatus in the embodiment. The surface profile and thickness of each of these optical elements is optimized and thereby aberration can be minimized. When lithography is used to fabricate the deformable mirror 409, the deformable mirror 409 with a high degree of accuracy is obtained.

Specifically, the configuration of the thin film 409a, as the reflecting surface, is controlled in such a way that the resistance values of the variable resistors 411 are changed by signals from the arithmetical unit 414 to optimize imaging performance. Signals corresponding to ambient temperature and humidity and the distance to the object are input into the arithmetical unit 414 from the temperature sensor 415, the humidity sensor 416, and the range sensor 417. In order to compensate for the degradation of imaging performance due to the ambient temperature and humidity and the distance to the object in accordance with these input signals, the arithmetical unit 414 outputs signals for determining the resistance values of the variable resistors 411 so that voltages by which the configuration of the thin film 409a is determined are applied to the electrodes 409b. Thus, since the thin film 409a is deformed with the voltages applied to the electrodes 409b, that is, the electrostatic force it assumes various shapes including an aspherical surface, according to circumstances. The range sensor 417 need not necessarily be used, and in this case, it is only necessary that an imaging lens 403 of the digital camera is moved so that a high-frequency component of an image signal from a solid-state image sensor 408 is roughly maximized, and the object distance is calculated from this position so that an observer's eye is able to focus upon the object image by deforming the deformable mirror.

When the thin film 409a is made of synthetic resin, such as polyimide, it can be considerably deformed even at a low voltage, which is advantageous. Also, the prism 404 and the deformable mirror 409 can be integrally configured into a unit. Although not shown in the figure, the solid-state image sensor 408 may be constructed integrally with the substrate of the deformable mirror 409 by a lithography process.

When each of the lenses 901 and 902, the prisms 404 and 405, and the mirror 406 is configured by a plastic mold, an arbitrary curved surface of a desired configuration can be easily obtained and its fabrication is simple. In the imaging device of the embodiment, the lenses 902 and 901 are arranged separately from the prism 404. However, if the prisms 404 and 405, the mirror 406, and the deformable mirror 409 are designed so that aberration can be eliminated without providing the lenses 902 and 901, the prisms 404 and 405 and the deformable mirror 409 will be configured as one optical block, and the assembly is facilitated. Parts or all of the lenses 902 and 901, the prisms 404 and 405, and the mirror 406 may be made of glass. By doing so, an imaging device with a higher degree of accuracy is obtained.

Also, although in FIG. 32 the arithmetical unit 414, the temperature sensor 415, the humidity sensor 416, and the range sensor 417 are provided so that the deformable mirror 409 compensates for the changes of the temperature, the humidity, and the object distance, the present invention is not limited to this construction. That is, the arithmetical unit 414, the temperature sensor 415, the humidity sensor 416, and the range sensor 417 may be eliminated so that the deformable mirror 409 compensates for only a change of an observer's diopter.

Figure 33:
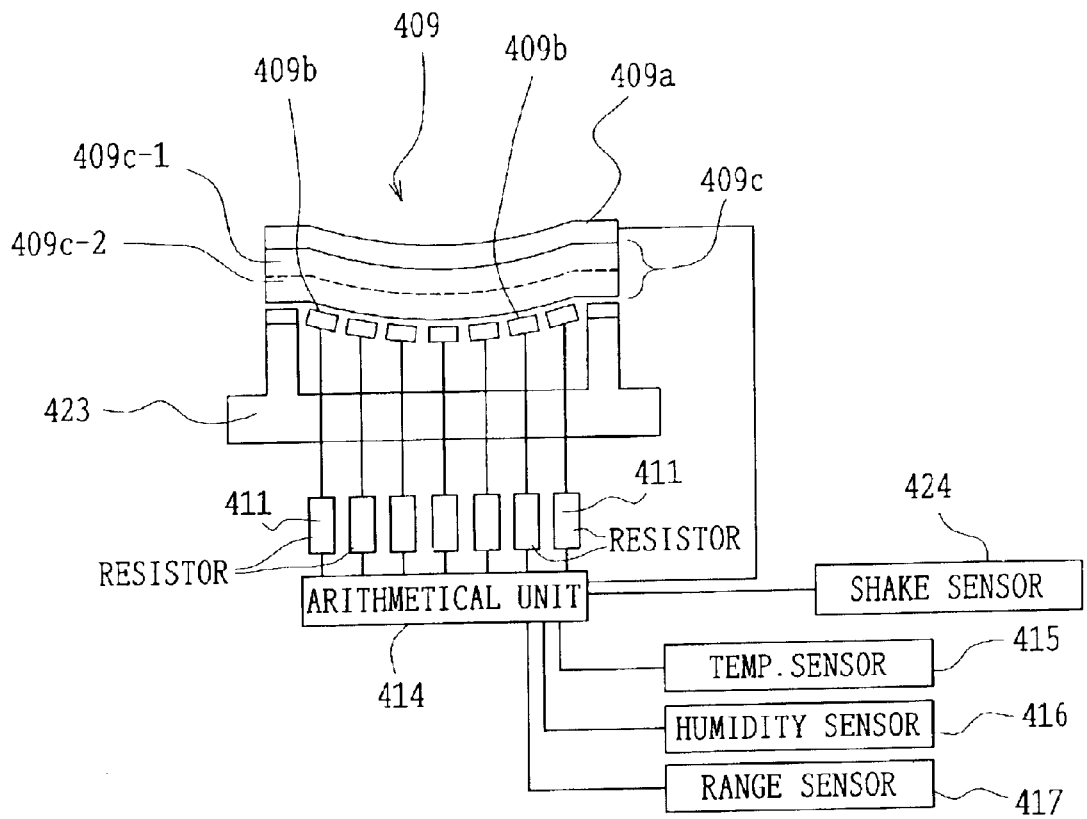
FIG. 33 is a view showing schematically another embodiment of the deformable mirror used as a variable mirror according to the present invention.

FIG. 33 shows another embodiment of the deformable mirror 409 used as the variable mirror in the present invention. In this embodiment, a piezoelectric element 409c a support 423. A voltage applied to the piezoelectric element 409c is changed in accordance with the individual electrodes 409b, and thereby the piezoelectric element 409c causes expansion or contraction which is partially different so that the shape of the thin film 409a can be changed. The configuration of the electrodes 409b may be selected in accordance with the deformation of the thin film 409a. For example, as illustrated in FIG. 34, it may have a concentric division pattern, or as in FIG. 35, it may be a rectangular division pattern. As other patterns, proper configurations can be chosen. In FIG. 33, reference numeral 424 represents a shake sensor connected to the arithmetical unit 414. The shake sensor 424, for example, detects the shake of a digital camera and changes the voltages applied to the electrodes 409b through the arithmetical unit 414 and the variable resistors 411 in order to deform the thin film 409a to compensate for the blurring of an image caused by the shake. At this time, the signals from the temperature sensor 415, the humidity sensor 416, and range sensor 417 are taken into account simultaneously, and focusing and compensation for temperature and humidity are performed. In this case, stress is applied to the thin film 409a by the deformation of the piezoelectric element 409c, and hence it is good practice to design the thin film 409a so that it has a moderate thickness and a proper strength.

Figure 36:
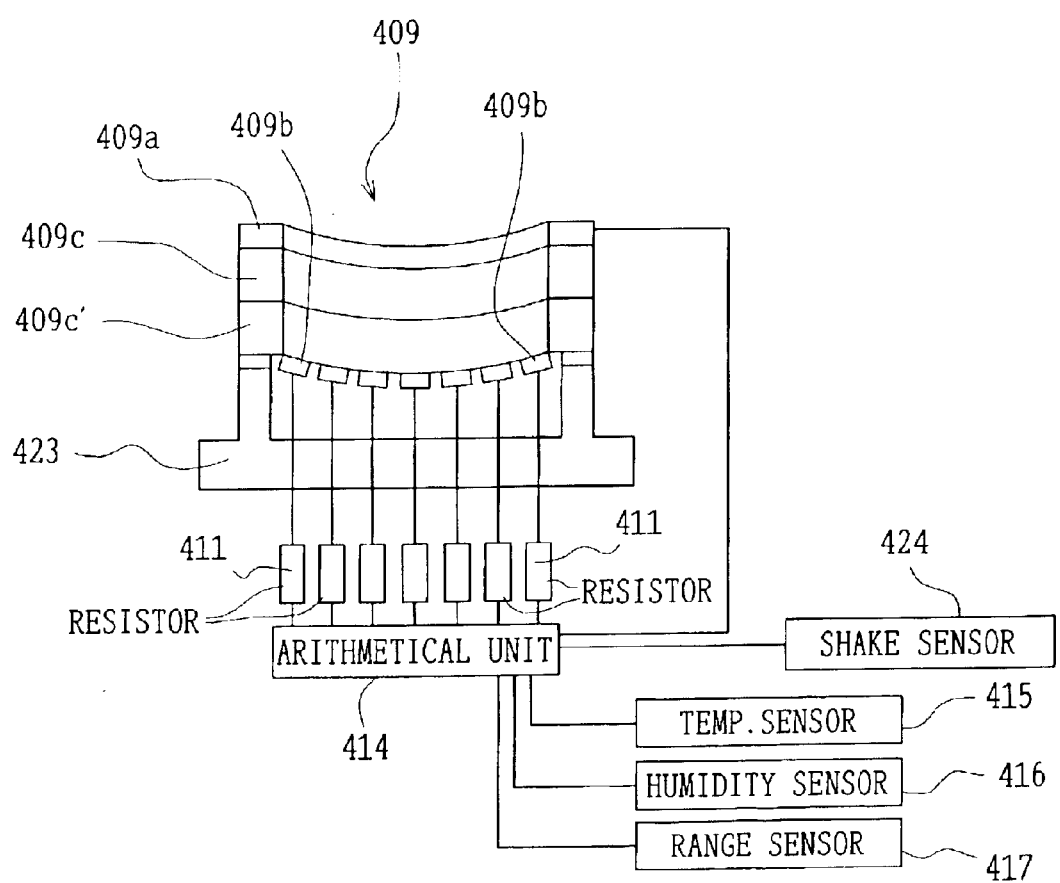
FIG. 36 is a view showing schematically another embodiment of the deformable mirror used as the variable mirror of the present invention.

FIG. 36 shows still another embodiment of the deformable mirror 409 used as the variable mirror in the present invention. This embodiment has the same construction as the embodiment of FIG. 33 with the exception that two piezoelectric elements 409c and 409c' are interposed between the thin film 409a and the electrodes 409b and are made with substances having piezoelectric characteristics which are reversed in direction. Specifically, when the piezoelectric elements 409c and 409c' are made with ferroelectric crystals, they are arranged so that their crystal axes are reversed in direction with respect to each other. In this case, the piezoelectric elements 409c and 409c' expand or contract in a reverse direction when voltages are applied, and thus there is the advantage that a force for deforming the thin film 409a becomes stronger than in the embodiment of FIG. 33 and as a result, the shape of the mirror surface can be considerably changed.

For substances used for the piezoelectric elements 409c and 409c', for example, there are piezoelectric substances such as barium titanate Rochelle salt, quartz crystal, tourmaline, KDP, ADP, and lithium niobate; polycrystals or crystals of the piezoelectric substances; piezoelectric ceramics such as solid solutions of $PbZrO_3$ and $PbTiO_3$; organic piezoelectric substances such as PVDF; and other ferroelectrics. In particular, the organic piezoelectric substance has a small value of Young's modulus and brings about a considerable deformation at a low voltage, which is favorable. When the piezoelectric elements 409c and 409c' are used, it is also possible to properly deform the thin film 409a in the above embodiment if their thicknesses are made uneven.

For materials of the piezoelectric elements 409c and 409c', high-polymer piezoelectrics such as polyurethane, silicon rubber, acrylic elastomer, PZT, PLZT, and PVDF; vinylidene cyanide copolymer; and copolymer of vinylidene fluoride and trifluoroethylene are used.

The use of an organic substance, synthetic resin, or elastomer, having a piezoelectric property, brings about a considerable deformation of the surface of the deformable mirror, which is favorable.

When an electrostrictive substance, for example, acrylic elastomer or silicon rubber, is used for the piezoelectric element 409c shown in FIGS. 33 and 36, the piezoelectric element 409c, as indicated by a broken line in FIG. 33, may be constructed by cementing another substrate 409c-1 to an electrostrictive substance 409c-2.

Figure 37:
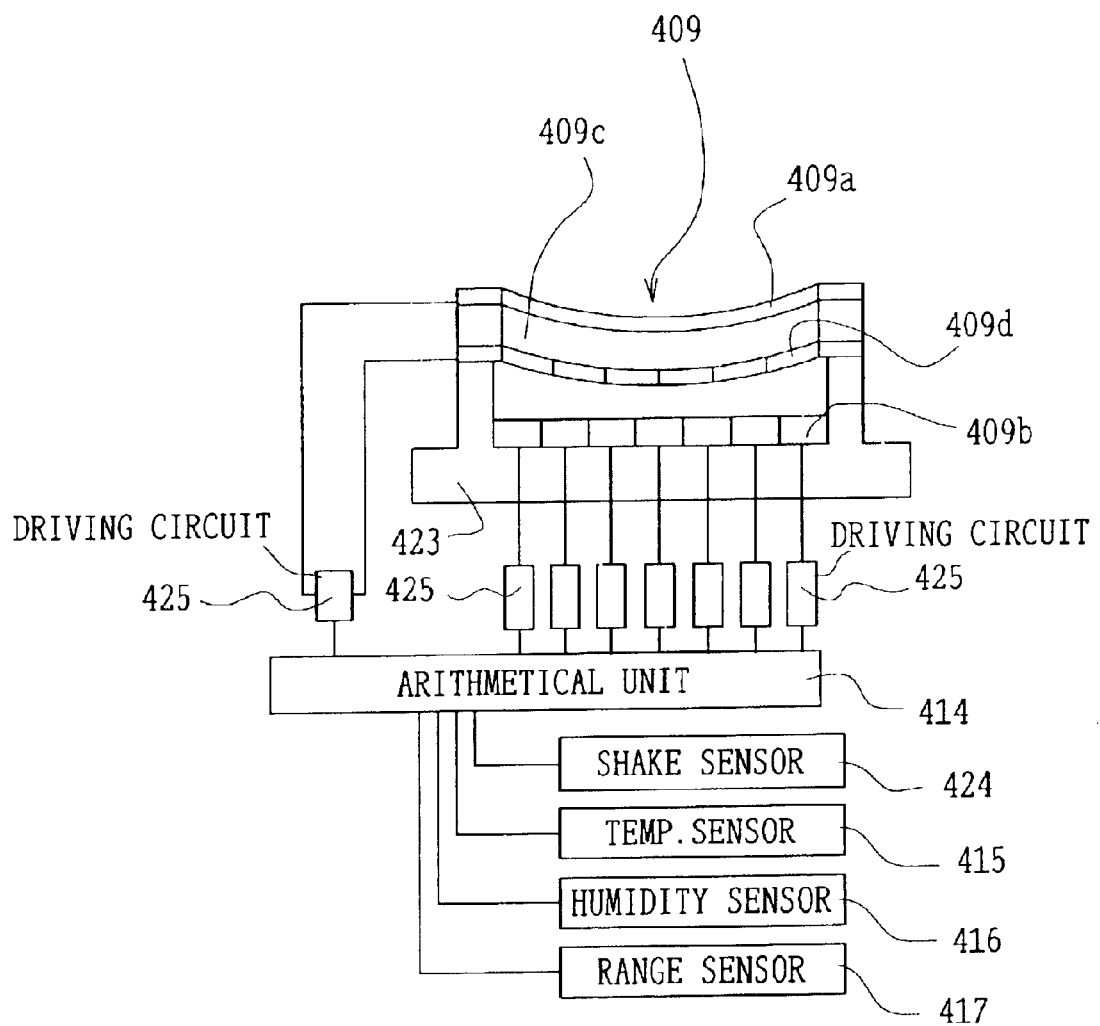
FIG. 37 is a view showing schematically another embodiment of the deformable mirror used as the variable mirror of the present invention.

FIG. 37 shows another embodiment of the deformable mirror 409 used as the variable mirror in the present invention. The deformable mirror 409 used as the vairable designed so that the piezoelectric element 409c is sandwiched between the thin film 409a and an electrode 409d, and voltages are applied between the thin film 409a and the electrode 409d through a driving circuit 425' controlled by the arithmetical unit 414. Furthermore, voltages are also applied to the electrodes 409b provided on the support 423, through driving circuits 425 controlled by the arithmetical unit 414. In this embodiment, therefore, the thin film 409a can be doubly deformed by electrostatic forces due to the voltages applied between the thin film 409a and the electrode 409d and applied to the electrodes 409b. There are advantages that various deformation patterns can be provided and the response is quick, compared with any of the above embodiments.

By changing the signs of the voltages applied between the thin film 409a and the electrode 409d, the deformable mirror can be deformed into a convex or concave surface. In this case, a considerable deformation may be performed by a piezoelectric effect, while a slight shape change may be carried out by the electrostatic force. Alternatively, the piezoelectric effect may be used for the deformation of the convex surface, while the electrostatic force may be used for the deformation of the concave surface. Also, the electrode 409d may be constructed as a plurality of electrodes like the electrodes 409b. This condition is shown in FIG. 37. In the present invention, all of the piezoelectric effect, the electrostrictive effect, and electrostriction are generally called the piezoelectric effect. Thus, it is assumed that the electrostrictive substance comes under the class of the piezoelectric substance.

Figure 38:
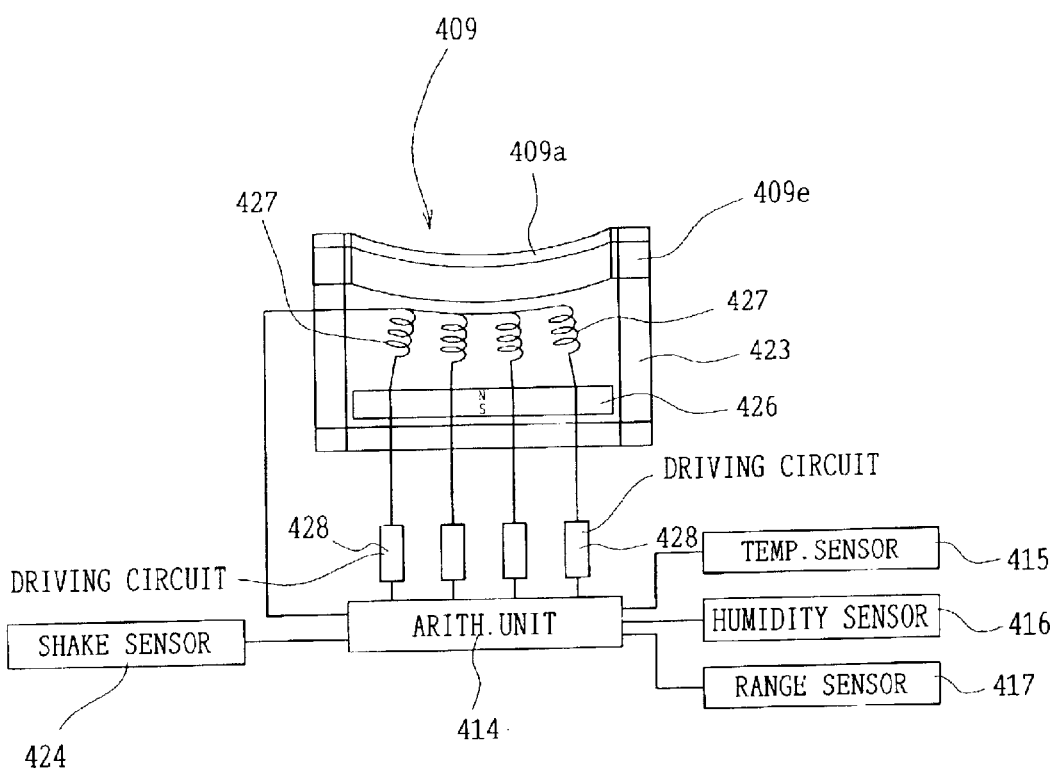
FIG. 38 is a view showing schematically another embodiment of the deformable mirror used as the variable mirror of the present invention.

FIG. 38 shows another embodiment of the deformable mirror 409 used as the variable mirror according to the present invention. The deformable mirror 409 of this embodiment is designed so that the shape of the reflecting surface can be changed by utilizing an electromagnetic force. A permanent magnet 426 mounted and fixed on a bottom surface inside the support 423, and the periphery of a substrate 409e made with silicon nitride or polyimide is mounted on the top surface thereof. The thin film 409a consisting of the coating of metal, such as aluminum, is deposited on the surface of the substrate 409e, thereby constituting the deformable mirror 409. Below the substrate 409e, a plurality of coils 427 are arranged and connected to the arithmetical unit 414 through the driving circuits 428. In accordance with output signals from the arithmetical unit 414 corresponding to changes of the optical system obtained at the arithmetical unit 414 by signals from the sensor 415, 416, 417, and 424, proper electric currents are supplied from the driving circuits 428 to the coils 427. At this time, the coils 427 are repelled or attracted by the electromagnetic force with the permanent magnet 426 to deform the substrate 409e and the thin film 409a.

In this case, a different amount of current can also be caused to flow through each of the coils 427. A single coil 427 may be used, and the permanent magnet 426 may be provided on the substrate 409e so that the coils 427 are arranged on the bottom side in the support 423. It is desirable that the coils 427 are fabricated by a lithography process. A ferromagnetic core (iron core) may be encased in each of the coils 427.

Figure 39:
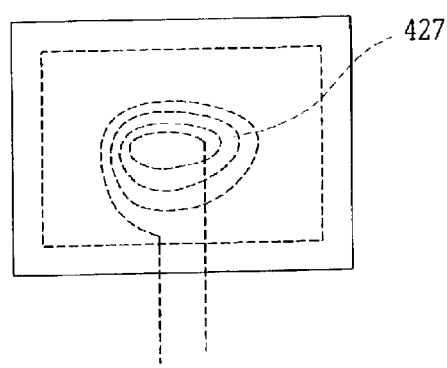
FIG. 39 is an explanatory view showing the winding density of a thin-film coil in the embodiment of FIG. 38.

In this case, each of the coils 427, as illustrated in FIG. 39, can be designed so that a coil density varies with place and thereby a desired deformation is brought to the substrate 409e and the thin film 409a. A single coil 427 may be used, and a ferromagnetic core (iron core) may be encased in each of the coils 427.

Figure 40:
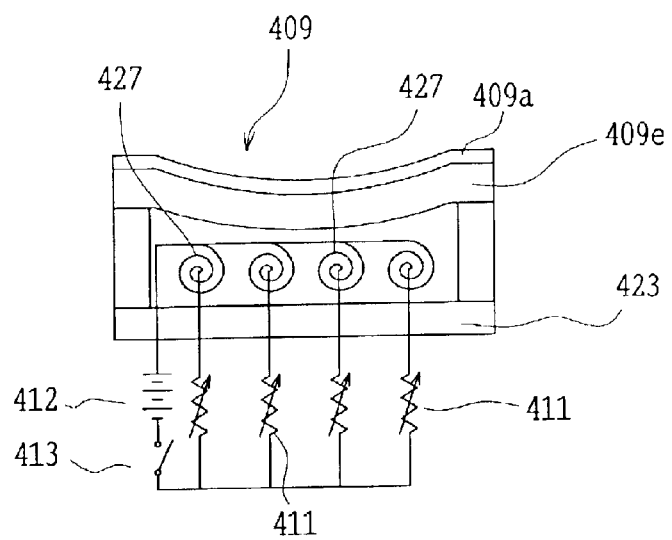
FIG. 40 is a view showing schematically another embodiment of the deformable mirror used as the variable mirror of the present invention.
Figure 41:
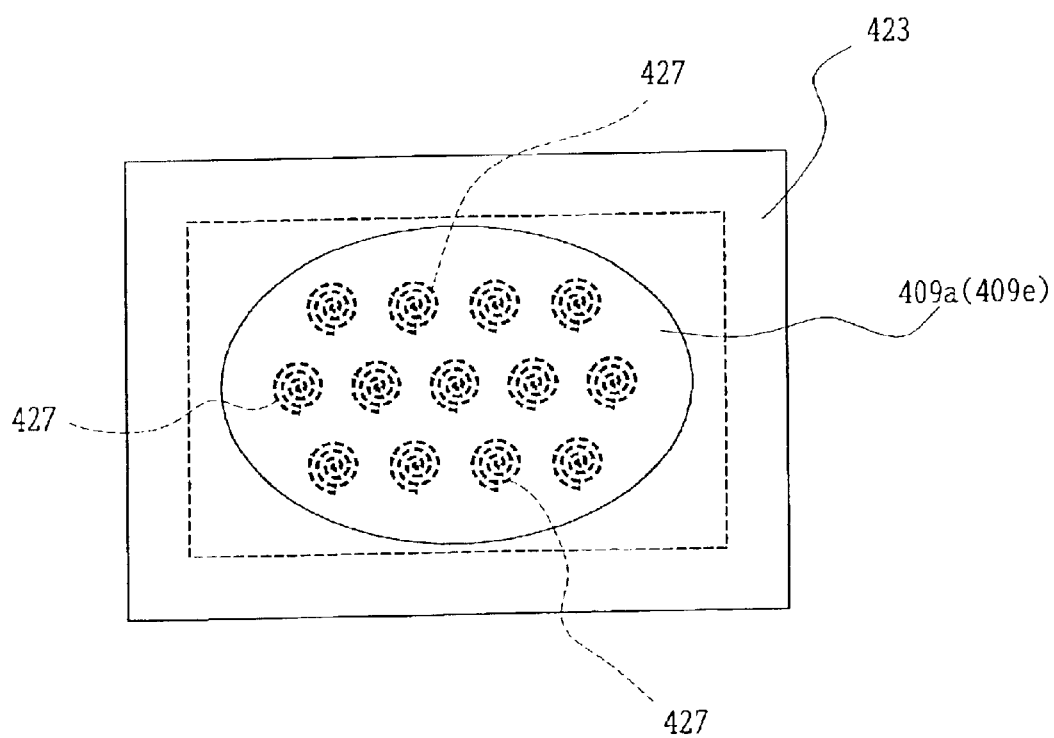
FIG. 41 is an explanatory view showing an example of an array of coils in the embodiment of FIG. 40.
Figure 42:
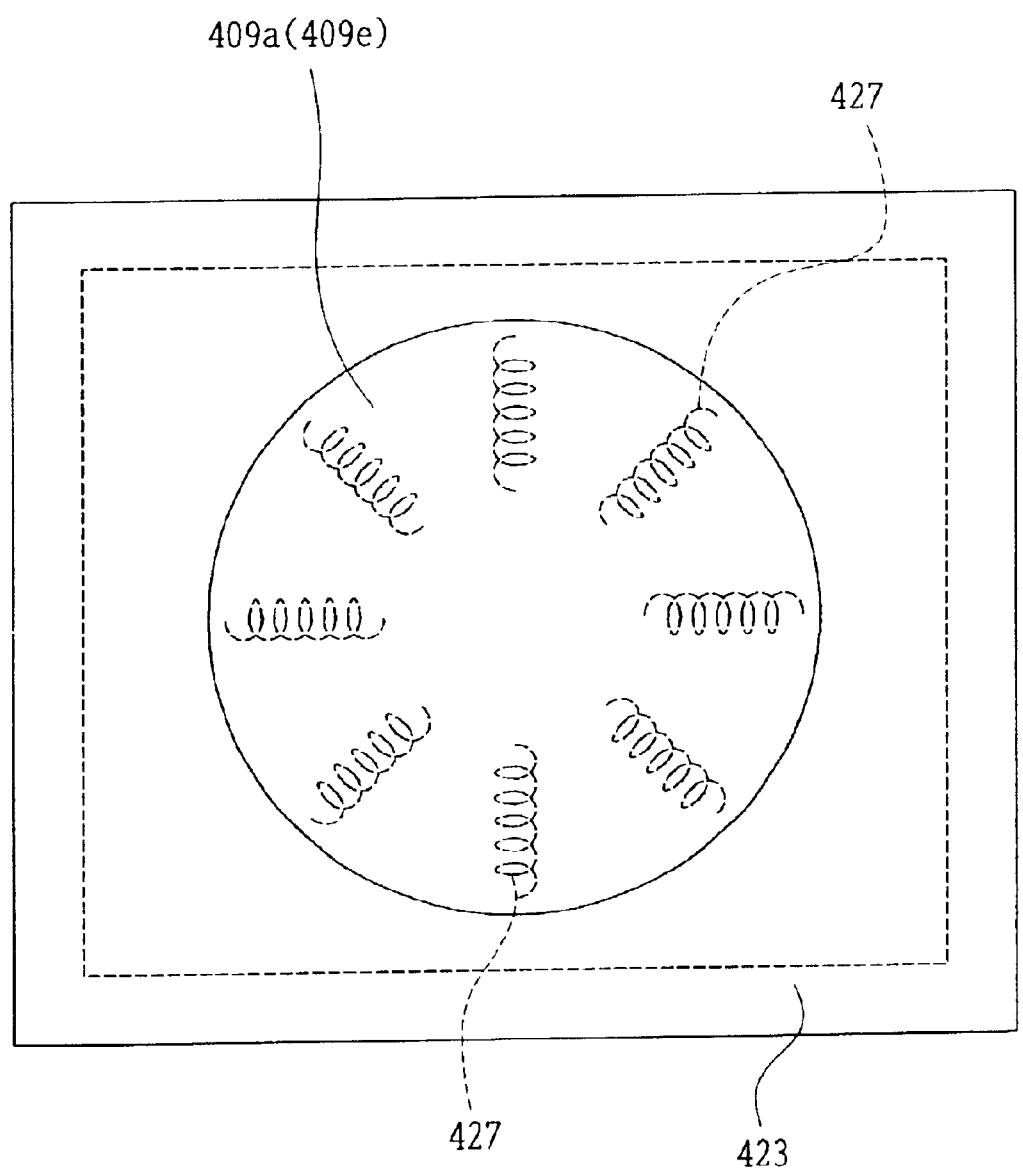
FIG. 42 is an explanatory view showing another example of the array of coils in the embodiment of FIG. 40.
Figure 43:
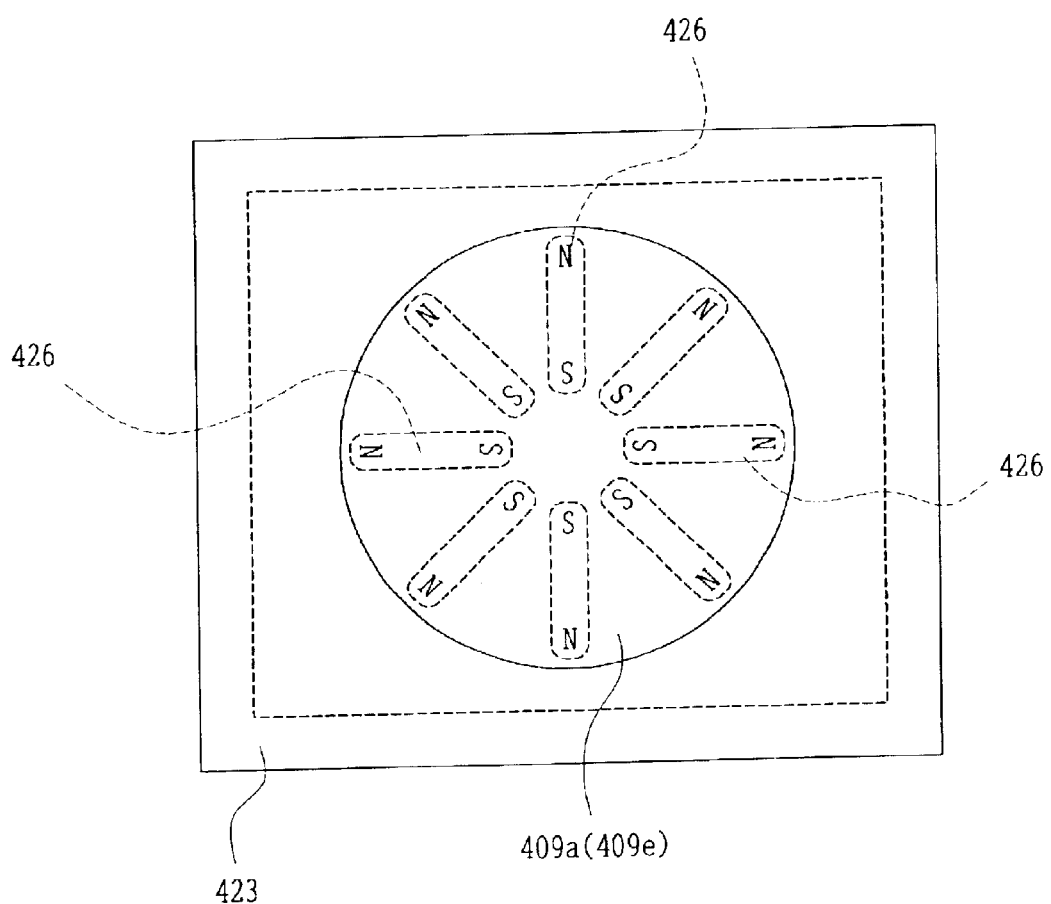
FIG. 43 is an explanatory view showing an array of permanent magnets suitable for the array of coils of FIG. 42 in the embodiment of FIG. 38.

FIG. 40 shows another embodiment of the deformable mirror 409 used as the variable mirror according to the present invention. In the deformable mirror 409 of this embodiment, the substrate 409e is made with a ferromagnetic such as iron, and the thin film 409a as a reflecting film is made with aluminum. In this case, since the thin film coils need not be used, the structure is simple and the manufacturing cost can be reduced. If the power switch 413 is replaced with a changeover and power on-off switch, the directions of currents flowing through the coils 427 can be changed, and the configurations of the substrate 409e and the thin film 409a can be changed at will. FIG. 41 shows an array of the coils 427 in this embodiment, and FIG. 42 shows another array of the coils 427. These arrays are also applicable to the embodiment of FIG. 38. FIG. 43 shows an array of the permanent magnets 426 suitable for the array of the coils of FIG. 42 in the embodiment of FIG. 38. Specifically, when the permanent magnets 426, as shown in FIG. 43, are radially arranged, a delicate deformation can be provided to the substrate 409e and the thin film 409a in contrast with the embodiment of FIG. 38. As mentioned above, when the electromagnetic force is used to deform the substrate 409e and the thin film 409a (in the embodiments of FIGS. 38 and 40), there is the advantage that they can be driven at a lower voltage than in the case where the electrostatic force is used.

Some embodiments of the deformable mirror have been described, but as shown in FIG. 37, at least two kinds of forces may be used in order to change the shape of the deformable mirror. Specifically, at least two of the electrostatic force, electromagnetic force, piezoelectric effect, magnetostriction, pressure of a fluid, electric field, magnetic field, temperature change, and electromagnetic wave, may be used simultaneously to deform the deformable mirror. That is, when at least two different driving techniques are used to make the variable optical-property optical element, a considerable deformation and a slight deformation can be realized simultaneously and a mirror surface with a high degree of accuracy can be obtained.

Figure 44:
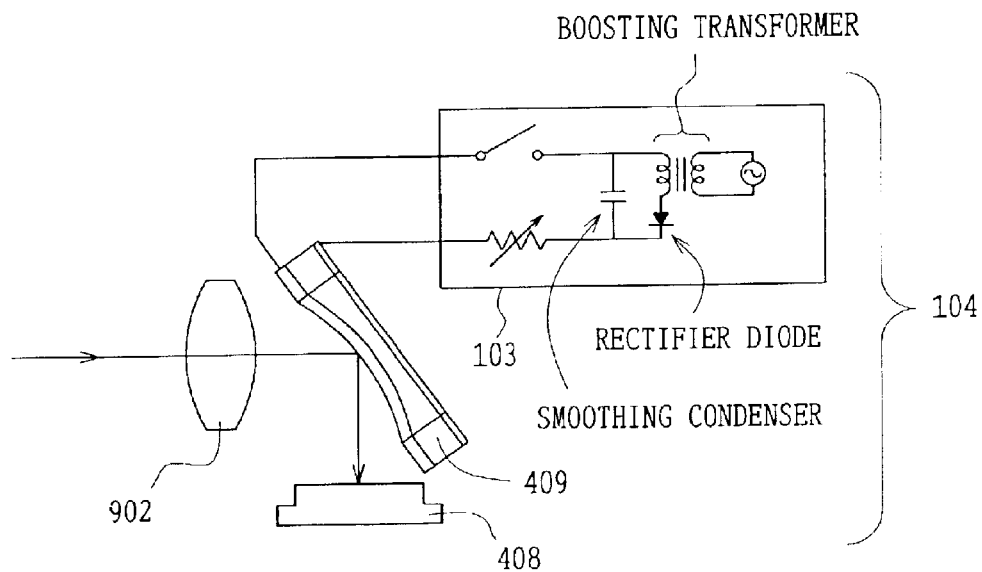
FIG. 44 is a view showing schematically an imaging system using the deformable mirror as the variable mirror applicable to an optical apparatus in another embodiment of the present invention.

FIG. 44 shows an imaging system which uses the deformable mirror 409 as the variable mirror applicable to the optical apparatus, in another embodiment of the present invention, and which is used, for example, in a digital camera of a cellular phone, a capsule endoscope, an electronic endoscope, a digital camera for personal computers, or a digital camera for PDAs.

In the imaging system of this embodiment, one imaging unit 104 is constructed with the deformable mirror 409, the lens 902, the solid-state image sensor 408, and a control system 103. In the imaging unit 104 of the embodiment, light from an object passing through the lens 902 is condensed by the deformable mirror 409 and is imaged on the solid-state image sensor 408. The deformable mirror 409 is a kind of variable optical-property optical element and is also referred to as the variable focal-length mirror.

According to this embodiment, even when the object distance is changed, the deformable mirror 409 is deformed and thereby the object can be brought into a focus. The embodiment need not use the motor to move the lens and excels in compact and lightweight design and low power consumption. The imaging unit 104 can be used in any of the embodiments as the imaging system of the present invention. When a plurality of deformable mirrors 409 are used, a zoom or variable magnification imaging system or optical system can be constructed.

In FIG. 44, an example of a control system which includes the boosting circuit of a transformer using coils in the control system 103 is cited. When a laminated piezoelectric transformer is particularly used, a compact design is achieved. The boosting circuit can be used in the deformable mirror or the variable focal-length lens of the present invention which uses electricity, and is useful in particular for the deformable mirror or the variable focal-length lens which utilizes the electrostatic force or the piezoelectric effect.

Figure 45:
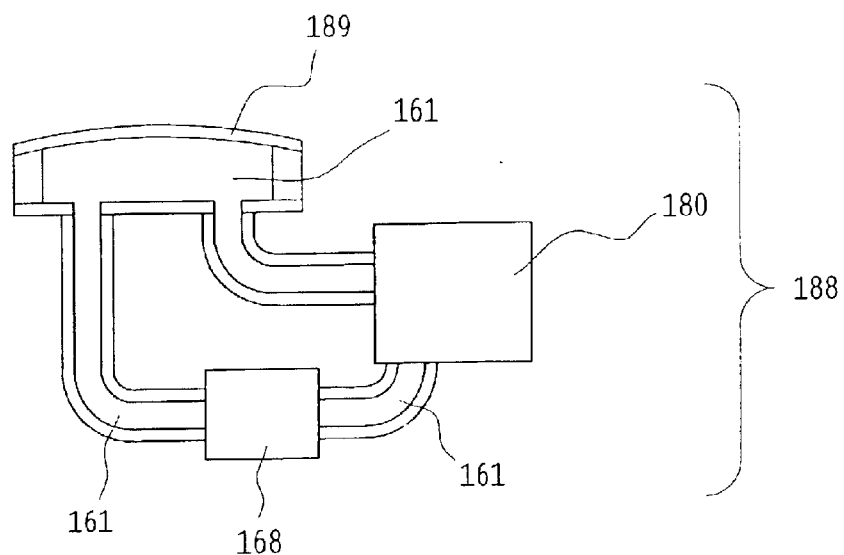
FIG. 45 is a view showing schematically the deformable mirror in another embodiment of the deformable mirror of the present invention.

FIG. 45 shows a deformable mirror 188 in which a fluid 161 is taken in and out by a micropump 180 to deform a mirror surface, in another embodiment of the variable mirror according to the present invention. According to this embodiment, there is the merit that the mirror surface can be considerably deformed.

The micropump 180 is a small-sized pump, for example, made by a micromachining technique and is constructed so that it is operated with an electric power. As examples of pumps made by the micromachining technique, there are those which use thermal deformations, piezoelectric substances, and electrostatic forces.

Figure 46:
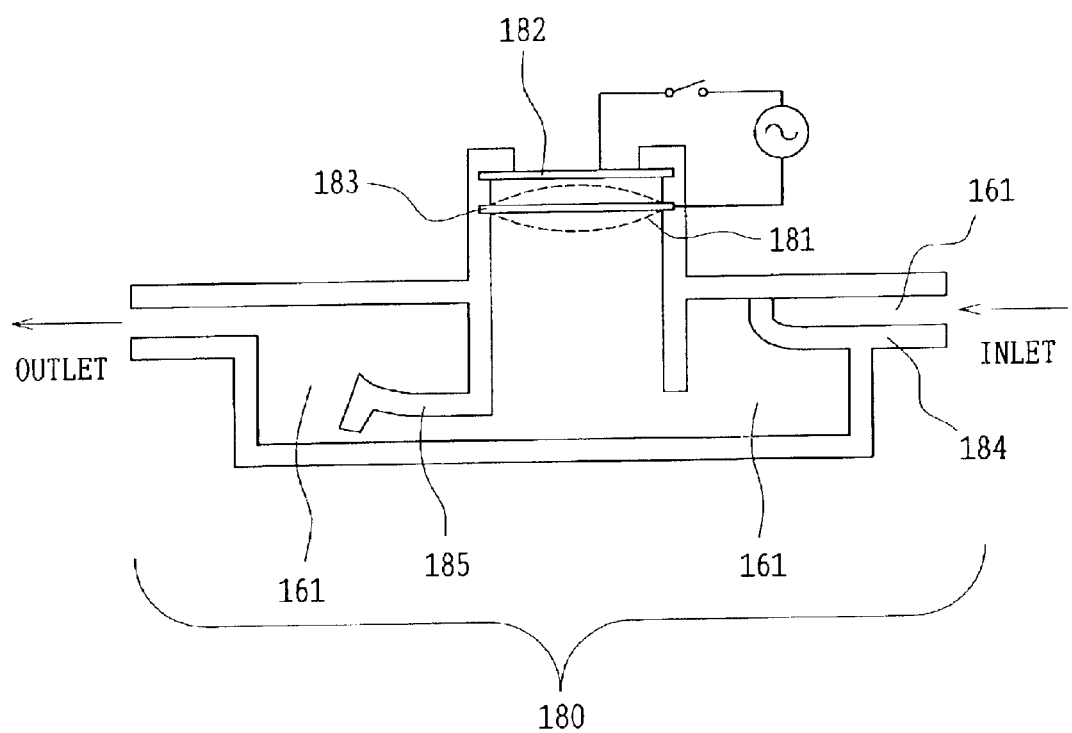
FIG. 46 is a view showing schematically an example of a micropump applicable to the variable mirror used in the imaging device of the present invention.

FIG. 46 shows an example of a micropump applicable to the variable mirror used in the imaging device of the present invention. In the micropump 180 of the embodiment, a vibrating plate 181 is vibrated by the electrostatic force or the electric force of the piezoelectric effect. In this figure, a case where the vibrating plate is vibrated by the electrostatic force is shown and reference numerals 182 and 183 represent electrodes. Dotted lines indicate the vibrating plate 181 where it is deformed. When the vibrating plate 181 is vibrated, two valves 184 and 185 are opened and closed to feed the fluid 161 from the right to the left.

In the deformable mirror 188 of this embodiment, the reflecting film 181 is deformed into a concave or convex surface in accordance with the amount of the fluid 161, and thereby functions as the deformable mirror. The deformable mirror 188 is driven by the fluid 161. An organic or inorganic substance, such as silicon oil, air, water, or jelly, can be used as the fluid.

In the deformable mirror or the variable focal-length lens which uses the electrostatic force or the piezoelectric effect, a high voltage is sometimes required for drive. In this case, for example, as shown in FIG. 44, it is desirable that the boosting transformer or the piezoelectric transformer is used to constitute the control system.

If the thin film 409*a* for reflection is also provided in a portion which is not deformed, it can be used as a reference surface when the profile of the deformable mirror is measured by an interferometer, which is convenient.

Figure 47:
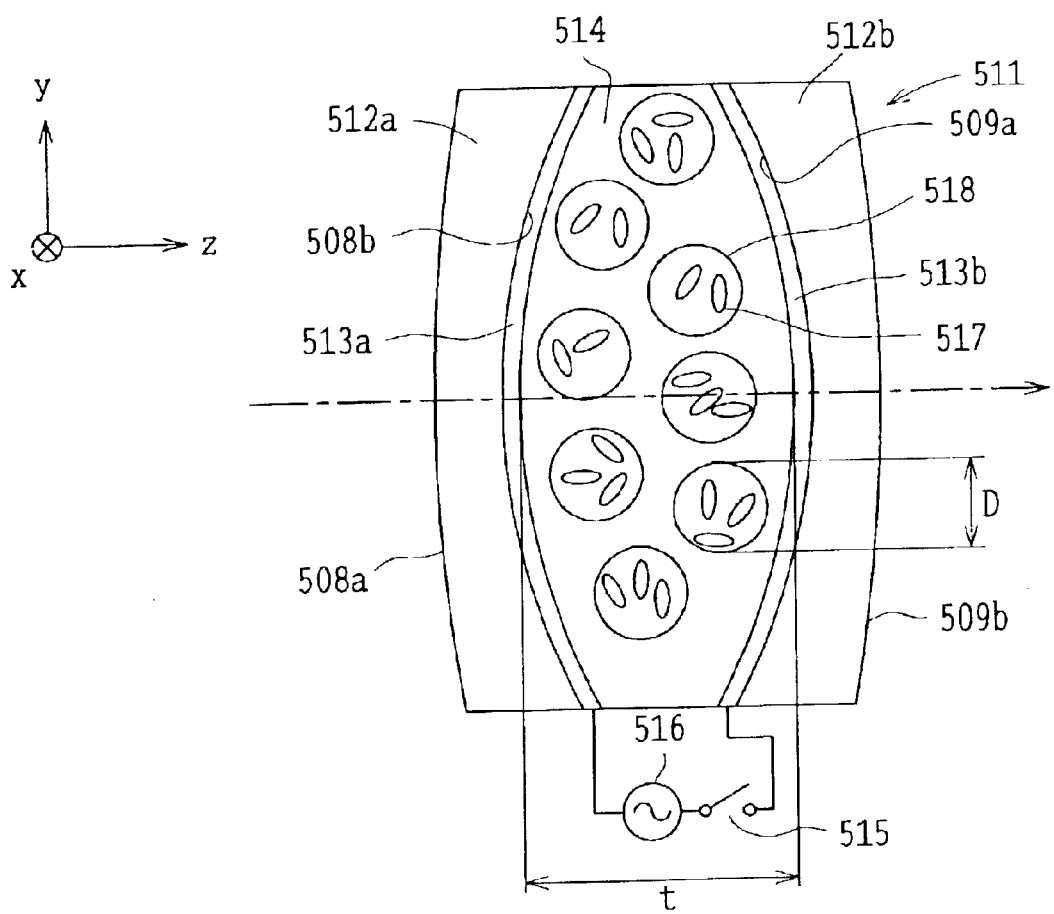
FIG. 47 is a view showing the principle of a variable focal-length lens used in the imaging device of the present invention.

FIG. 47 shows the structure of the variable focal-length lens used in the imaging device according to the present invention. A variable focal-length lens 511 includes a first lens 512*a* having lens surfaces 508*a* and 508*b* as a first surface and a second surface, respectively, a second lens 512*b* having lens surfaces 509*a* and 509*b* as a third surface and a fourth surface, respectively, and a macromolecular dispersed liquid crystal layer 514 sandwiched between these lenses through transparent electrodes 513*a* and 513*b*. Incident light is converged through the first and second lenses 512*a* and 512*b*. The transparent electrodes 513*a* and 513*b* are connected to an alternating-current power supply 516 through a switch 515 so that an alternating-current electric field is selectively applied to the macromolecular dispersed liquid crystal layer 514. The macromolecular dispersed liquid crystal layer 514 is composed of a great number of minute macromolecular cells 518, each having any shape, such as a sphere or polyhedron, and including liquid crystal molecules 517, and its volume is equal to the sum of volumes occupied by macromolecules and the liquid crystal molecules 517 which constitute the macromolecular cells 518.

Here, for the size of each of the macromolecular cells 518, for example, in the case of a sphere, when an average diameter is denoted by D and the wavelength of light used is denoted by λ, the average diameter D is chosen to satisfy the following condition:

$$2 \text{ nm} \leq D \leq \lambda/5 \tag{1}$$

That is, the size of each of the liquid crystal molecules 517 is at least about 2 nm and thus the lower limit of the average diameter D is set to about 2 nm or larger. The upper limit of the diameter D depends on a thickness t of the macromolecular dispersed liquid crystal layer 514 in the direction of the optical axis of the variable focal-length lens 511. However, if the diameter is larger than the wavelength λ, a difference between the refractive indices of the macromolecules and the liquid crystal molecules 517 will cause light to be scattered at the interfaces of the macromolecular cells 518 and will render the liquid crystal layer 514 opaque. Hence, the upper limit of the diameter D should be λ/5 or less. A high degree of accuracy is not necessarily required, depending on an optical product using the variable focal-length lens. In this case, the diameter D below the value of the wavelength λ is satisfactory. Also, the transparency of the macromolecular dispersed liquid crystal layer 514 deteriorates with increasing thickness t.

Figure 48:
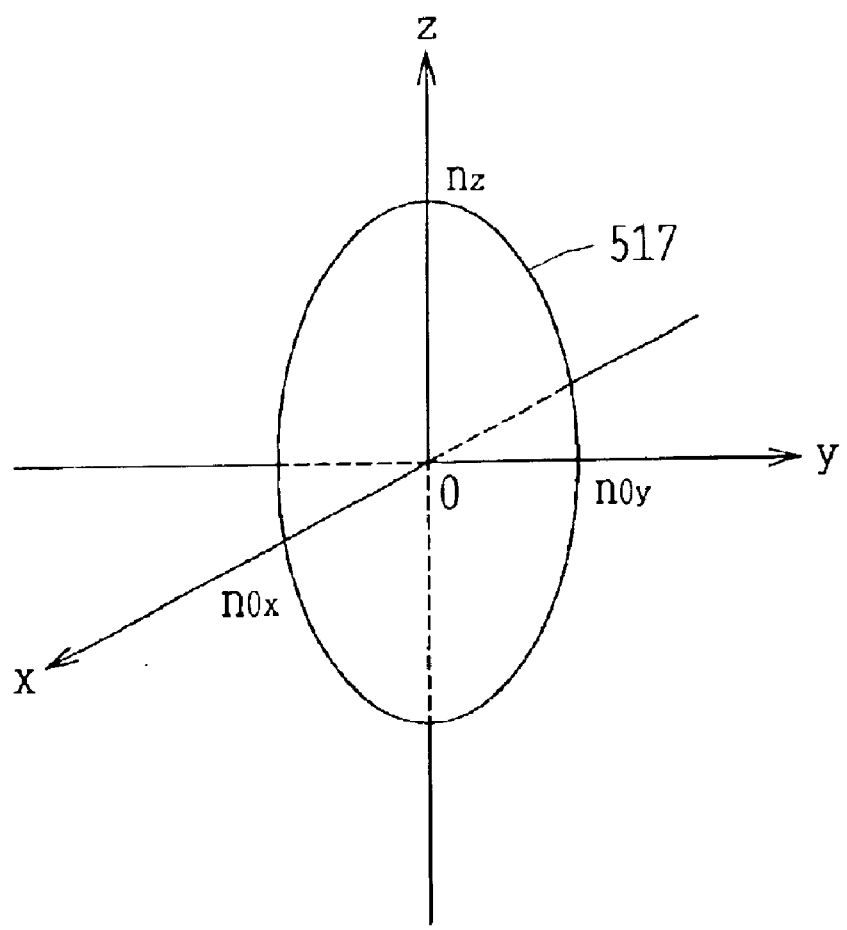
FIG. 48 is a view showing the index ellipsoid of a nematic liquid crystal molecule of uniaxial anisotropy.

In the liquid crystal molecules 517, for example, uniaxial nematic liquid crystal molecules are used. The index ellipsoid of each of the liquid crystal molecules 517 is as shown in FIG. 48. That is, $$n_{ox} = n_{oy} = n_o \tag{2}$$

where $n_o$ is the refractive index of an ordinary ray and $n_{ox}$ and $n_{oy}$ are refractive indices in directions perpendicular to each other in a plane including ordinary rays.

Figure 49:
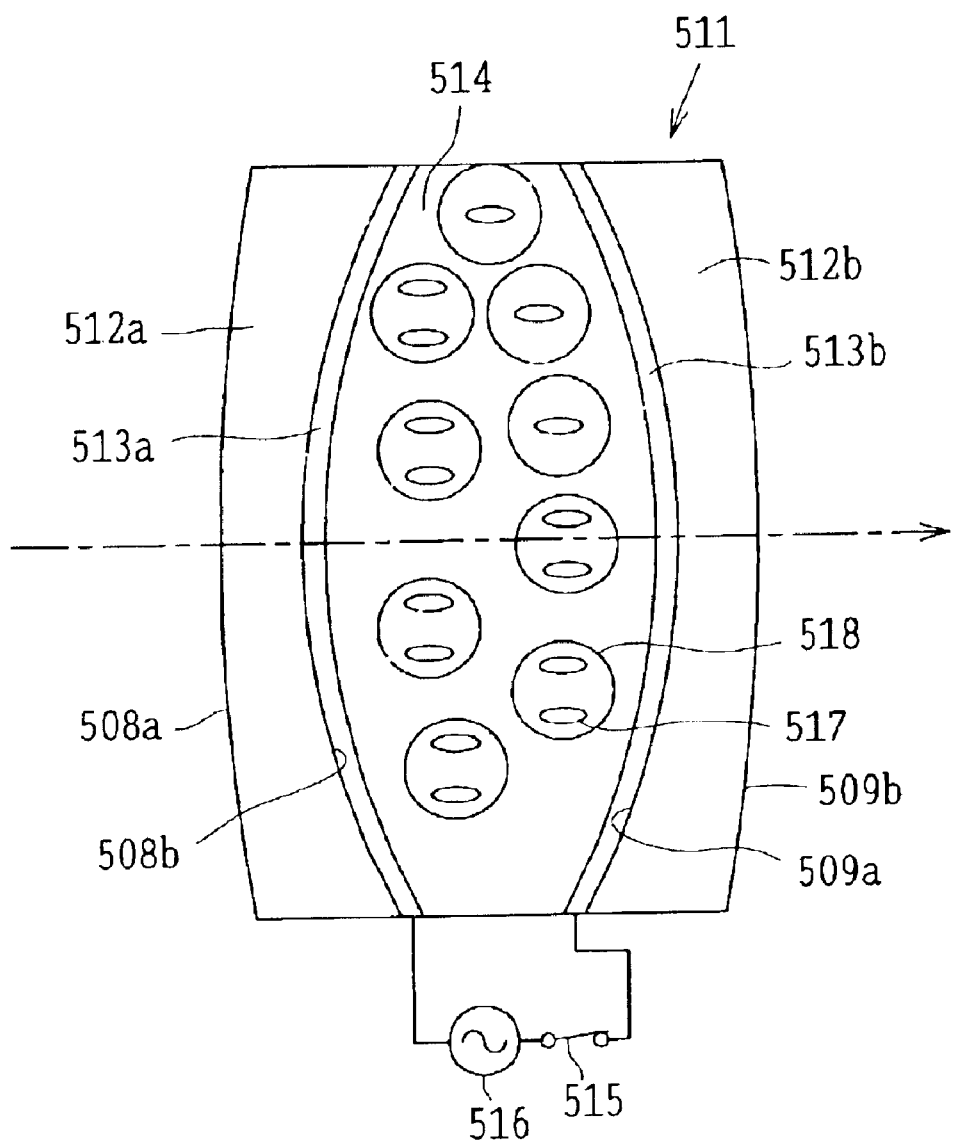
FIG. 49 is a view showing a state where an electric field is applied to the macro-molecular dispersed liquid crystal layer of the variable focal-length lens in FIG. 47.

Here, in the case where the switch 515, as shown in FIG. 47 is turned off, that is, the electric field is not applied to the liquid crystal layer 514, the liquid crystal molecules 517 are oriented in various directions, and thus the refractive index of the liquid crystal layer 514 relative to incident light becomes high to provide a lens with strong refracting power. In contrast to this, when the switch 515, as shown in FIG. 49, is turned on and the alternating-current electric field is applied to the liquid crystal layer 514, the liquid crystal molecules 517 are oriented so that the major axis of the index ellipsoid of each liquid crystal molecule 517 is parallel with the optical axis of the variable focal-length lens 511, and hence the refractive index becomes lower to provide a lens with weaker refracting power.

Figure 50:
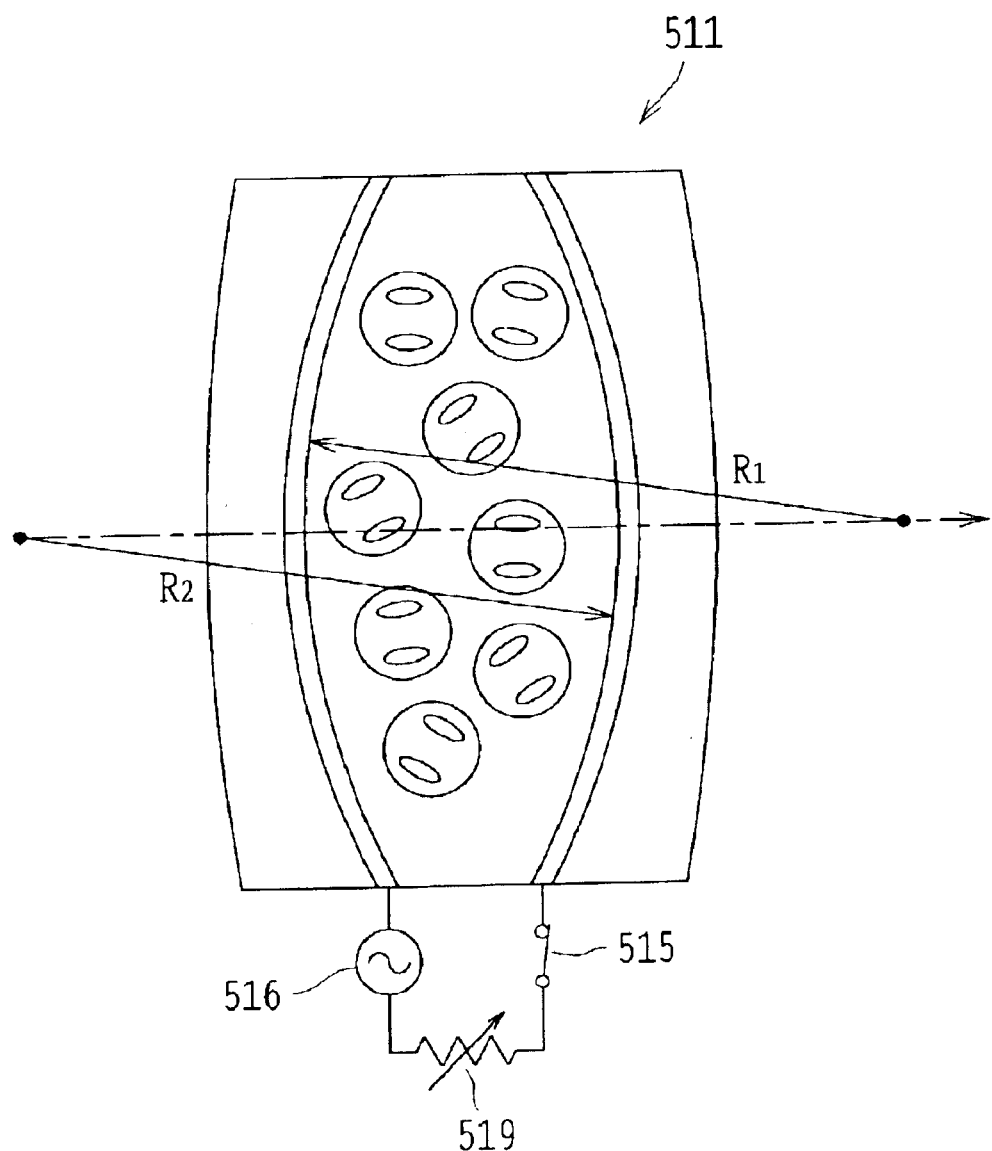
FIG. 50 is a view showing one example where a voltage applied to the macro-molecular dispersed liquid crystal layer in FIG. 47 can be changed.

The voltage applied to the macromolecular dispersed liquid crystal layer 514, for example, as shown in FIG. 50, can be changed stepwise or continuously by a variable resistor 519. By doing so, as the applied voltage becomes high, the liquid crystal molecules 517 are oriented so that the major axis of the index ellipsoid of each liquid crystal molecule 517 becomes progressively parallel with the optical axis of the variable focal-length lens 511, and thus the refractive index can be changed stepwise or continuously.

Here, in the case of FIG. 47, that is, in the case where the electric field is not applied to the macromolecular dispersed liquid crystal layer 514, when the refractive index in the direction of the major axis of the index ellipsoid, as shown in FIG. 48, is denoted by $n_z$, an average refractive index $n_{LC}'$ of the liquid crystal molecules 517 is roughly given by $$(n_{ox} + n_{oy} + n_z)/3 = n_{LC}' \tag{3}$$

Also, when the refractive index $n_z$ is expressed as a refractive index $n_e$ of an extraordinary ray, an average refractive index $n_{LC}$ where Equation (2) is established is given by $$(2n_o + n_e)/3 = n_{LC} \tag{4}$$

In this case, when the refractive index of each of the macromolecules constituting the macromolecular cells 518 is represented by $n_p$ and the ratio of volume between the liquid crystal layer 514 and the liquid crystal molecules 517 is represented by ff, a refractive index $n_A$ of the liquid crystal layer 514 is given from the Maxwell-Garnet's law as $$n_A = f\!f \cdot n_{LC}' + (1-f\!f)n_p \tag{5}$$

Thus, as shown in FIG. 50, when the radii of curvature of the inner surfaces of the lenses 512*a* and 512*b*, that is, the surfaces on the side of the liquid crystal layer 514, are represented by $R_1$ and $R_2$, a focal length $f_1$ of the variable focal-length lens 511 is given by $$1/f_1 = (n_A - 1)(1/R_1 - 1/R_2) \tag{6}$$

Also, when the center of curvature is located on the image side, it is assumed that the radius of curvature $R_1$ or $R_2$ is positive. Refraction caused by the outer surface of each of the lenses 512*a* and 512*b* is omitted. That is, the focal length of the lens of only the liquid crystal layer 514 is given by Equation (6).

When the average refractive index of ordinary rays is expressed as $$(n_{ox} + n_{oy})/2 = n_o' \tag{7}$$

a refractive index $n_B$ of the liquid crystal layer 514 in the case of FIG. 49, namely, in the case where the electric field is applied to the liquid crystal layer 514, is given by $$n_B = f f n_o' + (1-ff) n_p \tag{8}$$

and thus a focal length $f_2$ of the lens of only the liquid crystal layer 514 in this case is given by $$1/f_2 = (n_B - 1)(1/R_1 - 1/R_2) \tag{9}$$

Also, the focal length where a lower voltage than in FIG. 49 is applied to the liquid crystal layer 514 is a value between the focal length $f_1$ given by Equation (6) and the focal length $f_2$ by Equation (9).

From Equations (6) and (9), a change rate of the focal length by the liquid crystal layer 514 is given by $$|(f_2-f_1)/f_2| = |(n_B-n_A)/(n_B-1)| \tag{10}$$

Thus, in order to increase the change rate, it is only necessary to increase the value of $|(n_B-n_A)|$. Here, $$n_B - n_A = ff(n_o' - n_{LC}') \tag{11}$$

and hence if the value of $|n_o' - n_{LC}'|$ is increased, the change rate can be raised. Practically, since the refractive index $n_B$ is about 1.3–2, the value of $|n_o' - n_{LC}'|$ is chosen so as to satisfy the following condition:

$$0.01 \leq |n_o' - n_{LC}'| \leq 10 \tag{12}$$

In this way, when ff=0.5, the focal length obtained by the liquid crystal layer 514 can be changed by at least 0.5%, and thus an effective variable focal-length lens can be realized. Also, the value of $|n_o' - n_{LC}'|$ cannot exceed 10 because of restrictions on liquid crystal substances.

Subsequently, a description will be given of grounds for the upper limit of Condition (1). The variation of a transmittance τ where the size of each cell of a macromolecular dispersed liquid crystal is changed is described in "Transmission variation using scattering/transparent switching films" on pages 197–214 of "Solar Energy Materials and Solar Cells", Wilson and Eck, Vol. 31, Eleesvier Science Publishers B. v., 1993. In FIG. 6 on page 206 of this publication, it is shown that when the radius of each cell of the macromolecular dispersed liquid crystal is denoted by r, t=300 μm, ff=0.5, $n_p$=1.45, $n_{LC}$-1.585, and λ=500 nm, the theoretical value of the transmittance τ is about 90% if r=5 nm (D–λ/50 and D·t=λ·6 μm, where D and λ are expressed in nanometers), and is about 50% if r=25 nm (D=λ/10).

Here, it is assumed that t=150 μm and the transmittance τ varies as the exponential function of the thickness t. The transmittance τ in the case of t=150 μm is nearly 71% when r=25 nm (D=λ/10 and D·t=λ·15 μm). Similarly, in the case of t=75 μm, the transmittance τ is nearly 80% when r=25 nm (D=λ/10 and D·t=λ·7.5 μm).

From these results, the transmittance τ becomes at least 70–80% and the liquid crystal can be actually used as a lens, if the liquid crystal satisfies the following condition:

$$D \cdot t \leq \lambda \cdot 15 \; \mu m \tag{13}$$

Hence, for example, in the case of t=75 μm, if D≤λ/5, a satisfactory transmittance can be obtained.

The transmittance of the macromolecular dispersed liquid crystal layer 514 is raised as the value of the refractive index $n_p$ approaches the value of the refractive index $n_{LC}'$. On the other hand, if the values of the refractive indices $n_o'$ and $n_p$ are different from each other, the transmittance of the liquid crystal layer 514 will be degraded. In FIGS. 47 and 49, the transmittance of the liquid crystal layer 514 is improved on an average when the liquid crystal layer 514 satisfies the following equation:

$$n_p = (n_o' + n_{LC}')/2 \tag{14}$$

The variable focal-length lens 511 is used as a lens, and thus in both FIGS. 47 and 49, it is desirable that the transmittances are almost the same and high. For this, although there are limits to the substances of the macromolecules and the liquid crystal molecules 517 constituting the macromolecular cells 518, it is only necessary, in practical use, to satisfy the following condition:

$$n_o' \leq n_p \leq n_{LC}' \tag{15}$$

When Equation (14) is satisfied, Condition (13) is moderated and it is only necessary to satisfy the following condition:

$$D \cdot t \leq \lambda \cdot 60 \; \mu m \tag{16}$$

It is for this reason that, according to the Fresnel's law of reflection, the reflectance is proportional to the square of the difference of the refractive index, and thus the reflection of light at the interfaces between the macromolecules and the liquid crystal molecules 517 constituting the macromolecular cells 518, that is, a reduction in the transmittance of the liquid crystal layer 514, is roughly proportional to the square of the difference in refractive index between the macromolecules and the liquid crystal molecules 517.

In the above description, reference has been made to the case where $n_o' \approx 1.45$ and $n_{LC}' \approx 1.585$, but in a more general formulation, it is only necessary to satisfy the following condition:

$$D \cdot t \leq \lambda \cdot 15 \; \mu m \cdot (1.585 - 1.45)^2/(n_u - n_p)^2 \tag{17}$$

where $(n_u - n_p)^2$ is a value when one of $(n_{LC}' - n_p)^2$ and $(n_o' - n_p)^2$ is larger than the other.

In order to largely change the focal length of the variable focal-length lens 511, it is favorable that the ratio ff is as high as possible, but in the case of ff=1, the volume of the macromolecule becomes zero and the macromolecular cells 518 cease to be formable. Thus, it is necessary to satisfy the following condition:

$$0.1 \leq ff \leq 0.999 \tag{18}$$

On the other hand, the transmittance τ improves as the ratio ff becomes low, and hence Condition (17) may be moderated, preferably, as follows:

$$4 \times 10^{-6} \; [\mu m]^2 \leq D \cdot t \leq \lambda \cdot 45 \; \mu m \cdot (1.585 - 1.45)^2/(n_u - n_p)^2 \tag{19}$$

Also, the lower limit of the thickness t, as is obvious from FIG. 47, corresponds to the diameter D, which is at least 2 nm as described above, and therefore the lower limit of D·t becomes $(2 \times 10^{-3} \; \mu m)^2$, namely $4 \times 10^{-6} \; [\mu m]^2$.

An approximation where the optical property of substance is represented by the refractive index is established when the diameter D is 5–10 nm or larger, as set forth in "Iwanami Science Library 8, Asteroids are coming", T. Mukai, Iwanami Shoten, p. 58, 1994. If the value of the diameter D exceeds 500 λ, the scattering of light will be changed geometrically, and the scattering of light at the interfaces between the macromolecules and the liquid crystal molecules 517 constituting the macromolecular cells 518 is increased in accordance with the Fresnel's equation of reflection. As such, in practical use, the diameter D must be chosen so as to satisfy the following condition:

$$7 \text{ nm} \leq D \leq 500 \lambda \quad (20)$$

Figure 51:
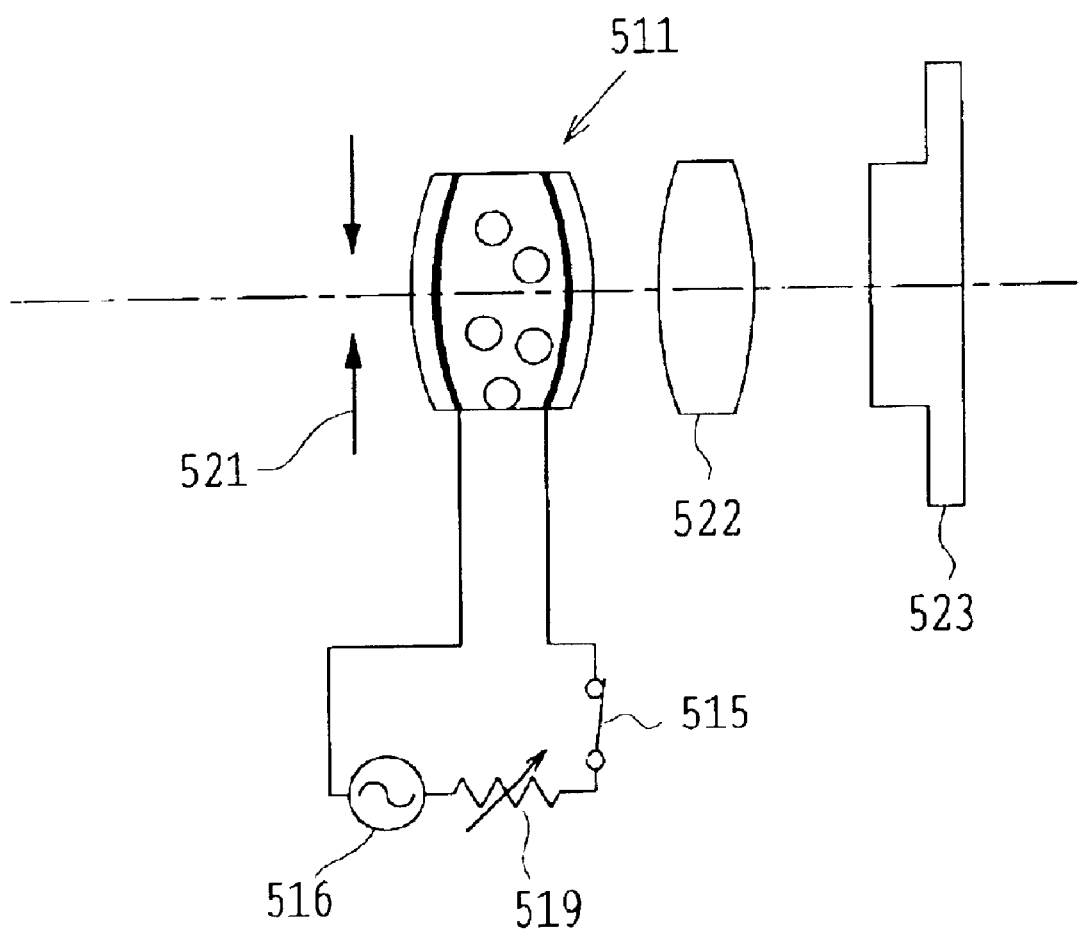
FIG. 51 is a view showing the construction of an imaging optical system for digital cameras which uses the variable focal-length lens of FIG. 50.

FIG. 51 shows an imaging optical system for digital cameras using the variable focal-length lens 511 of FIG. 50. In this imaging optical system, an image of an object (not shown) is formed on the solid-state image sensor 523, such as a CCD, through a stop 521, the variable focal-length lens 511, and a lens 522. Also, in FIG. 51, the liquid crystal molecules are not shown.

According to such an imaging optical system, the alternating voltage applied to the macromolecular dispersed liquid crystal layer 514 of the variable focal-length lens 511 is controlled by the variable resistor 519 to change the focal length of the variable focal-length lens 511. Whereby, without moving the variable focal-length lens 511 and the lens 522 along the optical axis, it becomes possible to perform continuous focusing with respect to the object distance, for example, from the infinity to 600 mm.

Figure 52:
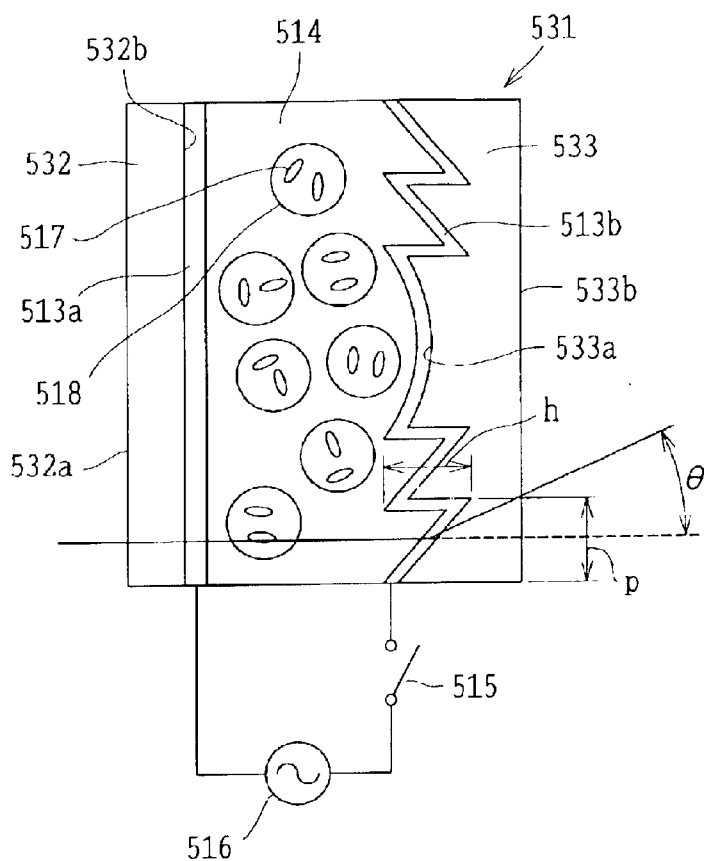
FIG. 52 is a view showing one example of a variable focal-length diffraction optical element applicable to the imaging device of the present invention.

FIG. 52 shows one example of a variable focal-length diffraction optical element applicable to the imaging device of the present invention. This variable focal-length diffraction optical element 531 includes a first transparent substrate 532 having a first surface 532a and a second surface 532b which are parallel with each other and a second transparent substrate 533 having a third surface 533a which is constructed with an annular diffraction grating of saw-like cross section having the depth of a groove corresponding to the wavelength of light and a fourth surface 533b which is flat. Incident light emerges through the first and second transparent substrates 532 and 533. Between the first and second transparent substrates 532 and 533, as in FIG. 47, the macromolecular dispersed liquid crystal layer 514 is sandwiched through the transparent electrodes 513a and 513b so that the transparent electrodes 513a and 513b are connected to the alternating-current power supply 516 through the switch 515 and the alternating-current electric field is applied to the macromolecular dispersed liquid crystal layer 514.

In such a structure, when the grating pitch of the third surface 533a is represented by p and an integer is represented by m, a ray of light incident on the variable focal-length diffraction optical element 531 is deflected by an angle θ satisfying the following equation:

$$p \sin \theta = m \lambda \quad (21)$$

and emerges therefrom. When the depth of the groove is denoted by h, the refractive index of the transparent substrate 533 is denoted by $n_{33}$, and an integer is denoted by k, a diffraction efficiency becomes 100% at the wavelength λ and the production of flare can be prevented by satisfying the following equations:

$$h(n_A - n_{33}) = m\lambda \quad (22)$$

$$h(n_B - n_{33}) = k\lambda \quad (23)$$

Here, the difference in both sides between Equations (22) and (23) is given by $$h(n_A - n_B) = (m-k)\lambda \quad (24)$$

Therefore, when it is assumed that λ=500 nm, $n_A$=1.55, and $n_B$=1.5, $$0.05 \ h = (m-k) \cdot 500 \text{ nm}$$

and when m=1 and k=0, $$h = 10000 \text{ nm} = 10 \ \mu m$$

In this case, the refractive index $n_{33}$ of the transparent substrate 533 is obtained as 1.5 from Equation (22). When the grating pitch p on the periphery of the variable focal-length diffraction optical element 531 is assumed to be 10 μm, θ≈2.87° and a lens with an F-number of 10 can be obtained.

The variable focal-length diffraction optical element 531, whose optical path length is changed by the on-off operation of the voltage applied to the liquid crystal layer 514, for example, can be used for focus adjustment in such a way that it is placed at a portion where the light beam of a lens system is not parallel, or can be used to change the focal length of the entire lens system.

In the embodiment, it is only necessary that Equations (22)–(24) are set in practical use to satisfy the following conditions:

$$0.7m\lambda \leq h(n_A - n_{33}) \leq 1.4m\lambda \quad (25)$$

$$0.7k\lambda \leq h(n_A - n_{33}) \leq 1.4k\lambda \quad (26)$$

$$0.7(m-k)\lambda \leq h(n_A - n_B) \leq 1.4(m-k)\lambda \quad (27)$$

Figure 53:
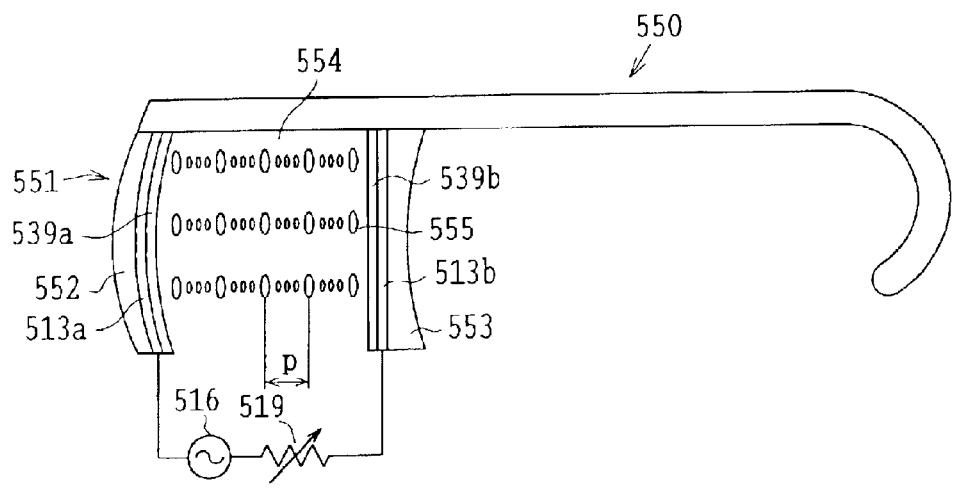
FIG. 53 is a view showing variable focal-length spectacles, each having a variable focal-length lens which uses a twisted nematic liquid crystal.
Figure 54:
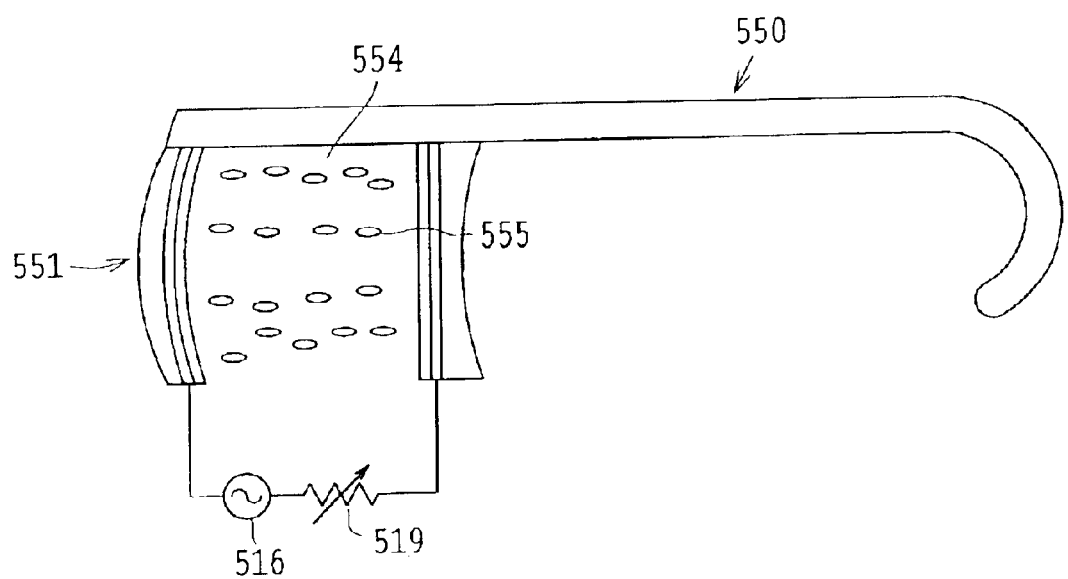
FIG. 54 is a view showing the orientation of liquid crystal molecules where a voltage applied to a twisted nematic liquid crystal layer of FIG. 53 is increased.

A variable focal-length lens using a twisted nematic liquid crystal also falls into the category of the present invention. FIGS. 53 and 54 show variable focal-length spectacles 550 in this case. The variable focal-length lens 551 has lenses 552 and 553, orientation films 539a and 539b provided through the transparent electrodes 513a and 513b, respectively, inside these lenses, and a twisted nematic liquid crystal layer 554 sandwiched between the orientation films. The transparent electrodes 513a and 513b are connected to the alternating-current power supply 516 through the variable resistor 519 so that the alternating-current electric field is applied to the twisted nematic liquid crystal layer 554.

In this structure, when the voltage applied to the twisted nematic liquid crystal layer 554 is increased, liquid crystal molecules 555, as illustrated in FIG. 54, exhibit a homeotropic orientation, in which the refractive index of the liquid crystal layer 554 is lower and the focal length is longer than in a twisted nematic condition of FIG. 53 in which the applied voltage is low.

A spiral pitch P of the liquid crystal molecules 555 in the twisted nematic condition of FIG. 53 must be made nearly equal to, or much smaller than, the wavelength λ of light, and thus is set to satisfy the following condition:

$$2 \text{ nm} \leq P \leq 2\lambda/3 \quad (28)$$

Also, the lower limit of this condition depends on the sizes of the liquid crystal molecules, while the upper limit is necessary for the behavior of the liquid crystal layer 554 as an isotropic medium under the condition of FIG. 53 when incident light is natural light. If the upper limit of the condition is overstepped, the variable focal-length lens 551 is changed to a lens in which the focal length varies with the direction of deflection. Hence, a double image is formed and only a blurred image is obtained.

Figure 55A:
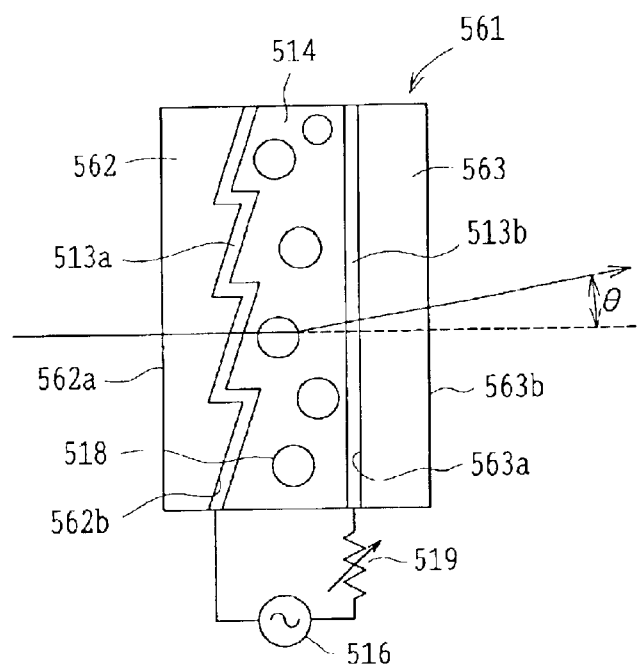
FIGS. 55A and 55B are views showing two examples of variable deflection-angle prisms, each of which is applicable to the imaging device of the present invention.
Figure 55B:
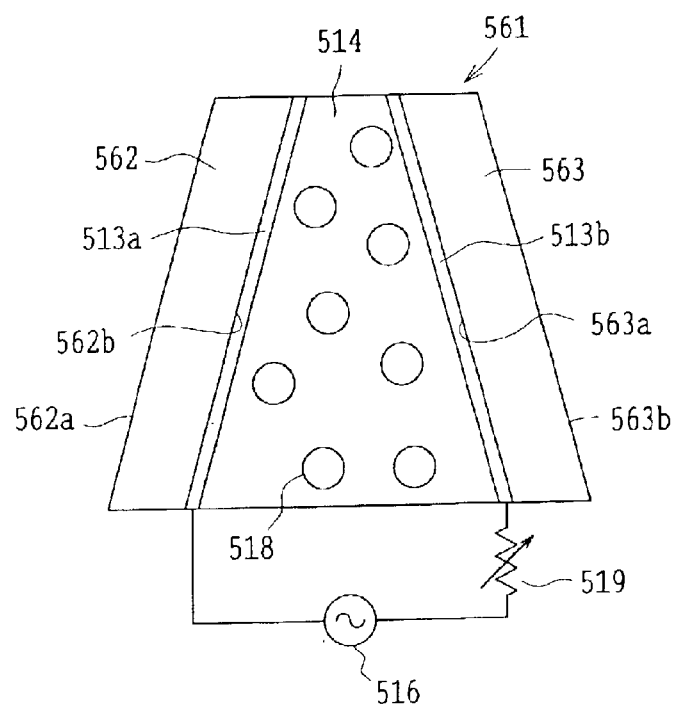

FIG. 55A shows a variable deflection-angle prism applicable to the imaging device of the present invention. A variable deflection-angle prism 561 includes a first transparent substrate 562 on the entrance side, having a first surface 562a and a second surface 562b; and a second transparent substrate 563 of a plane-parallel plate on the exit side, having a third surface 563a and a fourth surface 563b. The inner surface (the second surface) 562b of the transparent substrate 562 on the entrance side is configured into a Fresnel form, and the macromolecular dispersed liquid crystal layer 514, as in FIG. 47, is sandwiched, through the transparent electrodes 513a and 513b, between the transparent substrate 562 and the transparent substrate 563 on the exit side. The transparent electrodes 513a and 513b are connected to the alternating-current power supply 516 through the variable resistor 519. Whereby, the alternating-current electric field is applied to the liquid crystal layer 514 so that the deflection angle of light transmitted through the variable deflection-angle prism 561 is controlled. Also, in FIG. 55A, the inner surface 562b of the transparent substrate 562 is configured into the Fresnel form, but as shown in FIG. 55B, the inner surfaces of the transparent substrates 562 and 563 may be configured like an ordinary prism whose surfaces are relatively inclined, or may be configured like the diffraction grating shown in FIG. 52. In the case of the latter, when Equations (21)–(24) and Conditions (25)–(27) are satisfied, the same description as in the variable focal-length diffraction optical element 531 and the variable focal-length spectacles 550 is applied.

Figure 56:
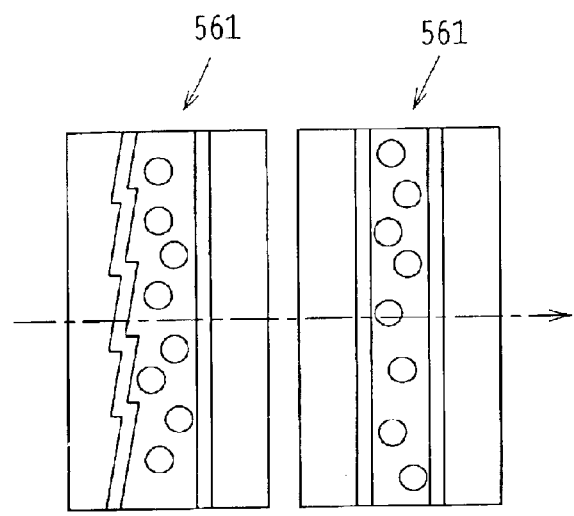
FIG. 56 is a view for explaining the applications of the variable deflection-angle prisms shown in FIGS. 55A and 55B.

The variable deflection-angle prism 561 constructed mentioned above can be effectively used for shake prevention for TV cameras, digital cameras, digital cameras, film cameras binoculars, etc. In this case, it is desirable that the direction of refraction (deflection) of the variable deflection-angle prism 561 is vertical, but in order to further improve its performance, it is desirable that two variable deflection-angle prisms 561 are arranged so that the directions of deflection are varied and as shown in FIG. 56, the refraction angles are changed in vertical and lateral directions. Also, in FIGS. 55A, 55B, and 56, the liquid crystal molecules are omitted.

Figure 57:
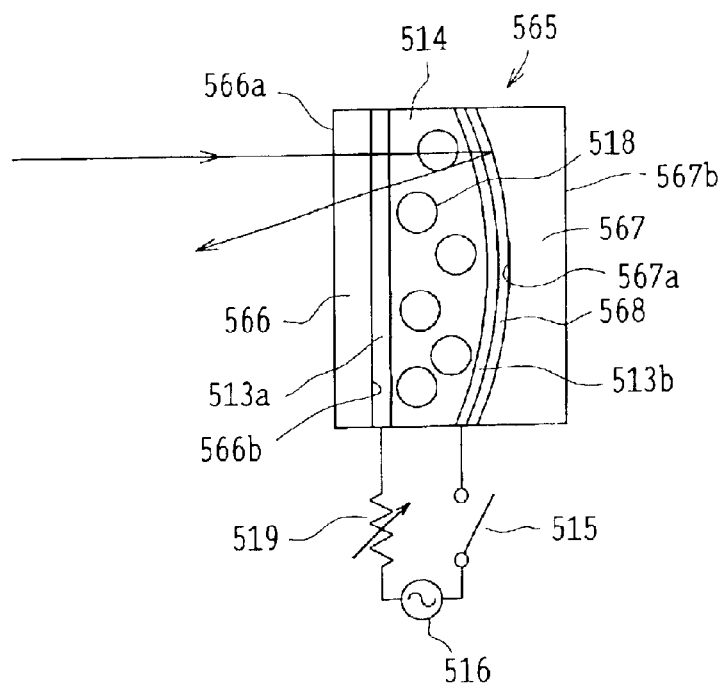
FIG. 57 is a view showing a variable focal-length mirror applying the variable focal-length lens used in the imaging device of the present invention.

FIG. 57 shows a variable focal-length mirror applying the variable focal-length lens used in the imaging device according to the present invention. A variable focal-length mirror 565 includes a first transparent substrate 566 having a first surface 566a and a second surface 566b, and a second transparent substrate 567 having a third surface 567a and a fourth surface 567b. The first transparent substrate 566 is configured into a flat plate or lens shape to provide the transparent electrode 513a on the inner surface (the second surface) 566b. The second transparent substrate 567 is such that the inner surface (the third surface) 567a is configured as concave surface, on which a reflecting film 568 is deposited, and the transparent electrode 513b is provided on the reflecting film 568. Between the transparent electrodes 513a and 513b, as in FIG. 47, the macromolecular dispersed liquid crystal layer 514 is sandwiched so that the transparent electrodes 513a and 513b are connected to the alternating-current power supply 516 through the switch 515 and the variable resistor 519, and the alternating-current electric field is applied to the macromolecular dispersed liquid crystal layer 514. Also, in FIG. 57, the liquid crystal molecules are omitted.

According to the above structure, since a ray of light incident on the transparent substrate 566 is passed again through the liquid crystal layer 514 by the reflecting film 568, the function of the liquid crystal layer 514 can be exercised twice, and the focal position of reflected light can be shifted by changing the voltage applied to the liquid crystal layer 514. In this case, the ray of light incident on the variable focal-length mirror 565 is transmitted twice through the liquid crystal layer 514, and therefore when a thickness twice that of the liquid crystal layer 514 is represented by t, Conditions mentioned above can be used. Moreover, the inner surface of the transparent substrate 566 or 567, as shown in FIG. 52, can also be configured into the diffraction grating shape to reduce the thickness of the liquid crystal layer 514. By doing so, the amount of scattered light can be decreased.

In the above description, in order to prevent the deterioration of the liquid crystal, the alternating-current power supply 516 is used as a voltage source to apply the alternating-current electric field to the liquid crystal. How a direct-current power supply is used and thereby a direct-current electric field can also be applied to the liquid crystal. Techniques of shifting the orientation of the liquid crystal molecules, in addition to changing the voltage, can be achieved by changing the frequency of the electric field applied to the liquid crystal, the strength and frequency of the magnetic field applied to the liquid crystal, or the temperature of the liquid crystal. In the above embodiments, since the macromolecular dispersed liquid crystal is close to a solid, rather than a liquid, one of the lenses 512a and 512b, the transparent substrate 532, the lens 522, one of the lenses 552 and 553, the transparent substrate 563 of FIG. 55A, or one of the transparent substrates 562 and 563 of FIG. 55B, may be eliminated. Also, in the present invention, it is assumed that the variable focal-length mirror whose profile is not changed, such as that in FIG. 57, falls under the class of the deformable mirror.

Figure 58:
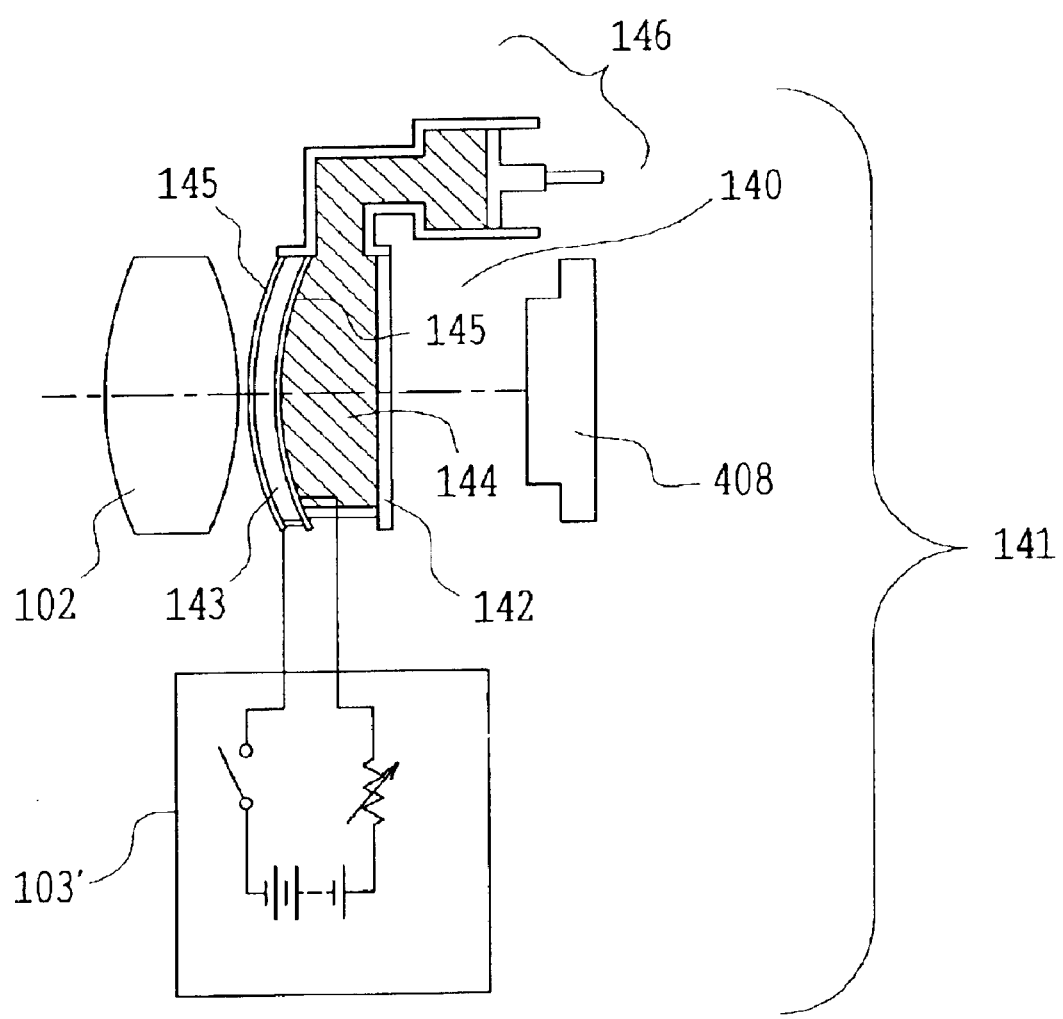
FIG. 58 is a view showing schematically an imaging unit using the variable focal-length lens in another embodiment of the variable focal-length lens used in the imaging device of the present invention.

FIG. 58 shows an imaging unit 141 using a variable focal-length lens 140 in another embodiment of the variable focal-length lens used in the imaging device of the present invention. The imaging unit 141 can be used as the imaging system of the present invention. In this embodiment, the lens 102 and the variable focal-length lens 140 constitute an imaging lens system, and the imaging lens system and the solid-state image sensor 408 constitute the imaging unit 141. The variable focal-length lens 140 is constructed with a light-transmitting fluid or jelly-like substance 144 sandwich between a transparent member 142 and a soft transparent substance 143 such as piezoelectric synthetic resin.

As the fluid or jelly-like substance 144, silicon oil, elastic rubber, jelly, or water can be used. Transparent electrodes 145 are provided on both surfaces of the transparent substance 143, and when the voltage is applied through a circuit 103', the transparent substance 143 is deformed by the piezoelectric effect of the transparent substance 143 so that the focal length of the variable focal-length lens 140 is changed.

Thus, according to the embodiment, even when the object distance is changed, focusing can be performed without moving the optical system with a motor, and as such the embodiment excels in compact and lightweight design and low power consumption.

In FIG. 58, reference numeral 146 denotes a cylinder for storing a fluid. For the transparent substance 143, high-polymer piezoelectrics such as polyurethane, silicon rubber, acrylic elastomer, PZT, PLZT, and PVDF; vinylidene cyanide copolymer; or copolymer of vinylidene fluoride and trifluoroethylene is used.

The use of an organic substance, synthetic resin, or elastomer, having a piezoelectric property, brings about a considerable deformation of the surface of the deformable mirror, which is favorable. It is good practice to use a transparent piezoelectric substance for the variable focal-length lens.

Figure 59:
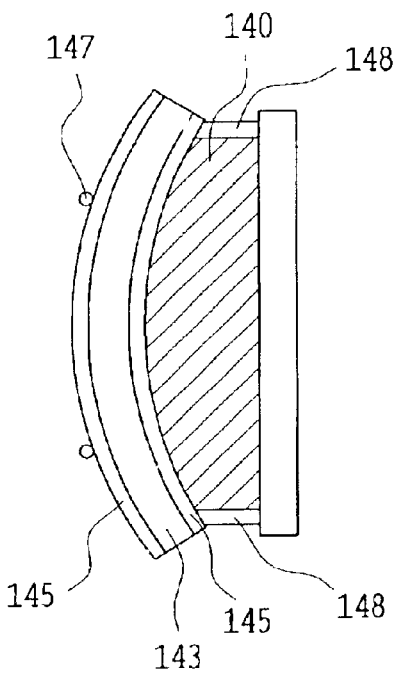
FIG. 59 is an explanatory view showing a modified example of the variable focal-length lens in the embodiment of FIG. 58.
Figure 60:
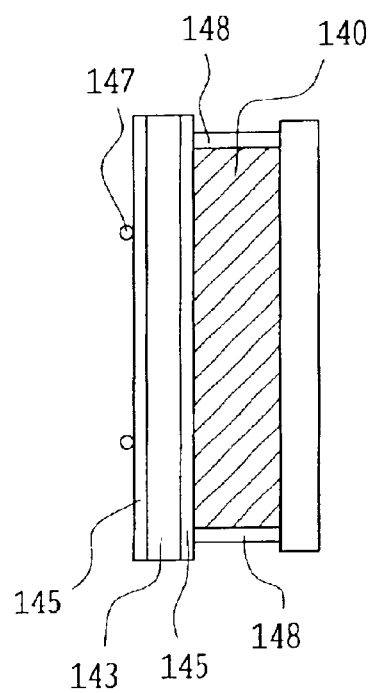
FIG. 60 is an explanatory view showing a state where the variable focal-length lens of FIG. 59 is deformed.

In FIG. 58, instead of using the cylinder 146, the variable focal-length lens 140, as shown in FIG. 59, may be designed to use supporting members 147. The supporting members 147 are designed to fix the periphery of a part of the transparent substance 143 sandwiched between the transparent electrodes 145. According to the embodiment, even when the voltage is applied to the transparent substance 143 and thereby the transparent substance 143 is deformed, as shown in FIG. 60, the volume of the entire variable focal-length lens 140 remains unchanged. As such, the cylinder 146 becomes unnecessary. Also, in FIGS. 59 and 60, reference numeral 148 designates a deformable member which is made with an elastic body, accordion-shaped synthetic resin, or metal.

In each of the examples shown in FIGS. 58 and 59, when a reverse voltage is applied, the transparent substance 143 is deformed in a reverse direction, and thus it is also possible to construct a concave lens.

Where an electrostrictive substance, for example, acrylic elastomer or silicon rubber, is used for the transparent substance 143, it is desirable that the transparent substance 143 is constructed so that the transparent substrate and the electrostrictive substance are cemented to each other.

Figure 61:
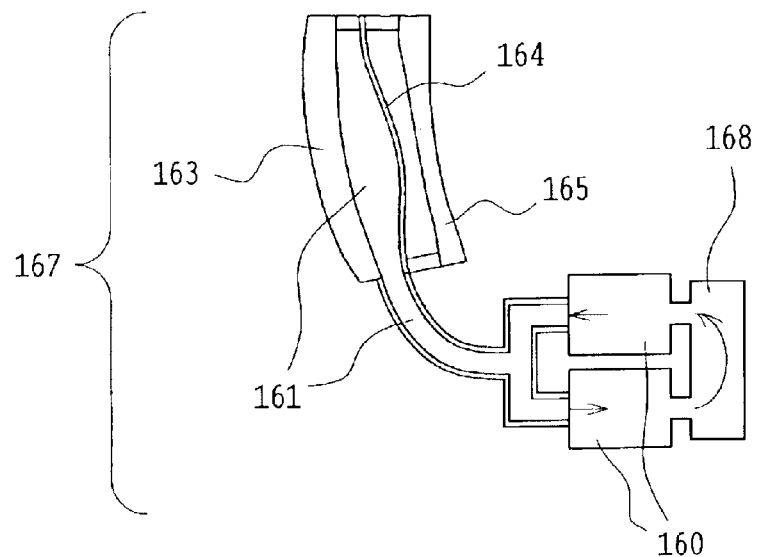
FIG. 61 is a view showing schematically another embodiment of the variable focal-length lens used in the imaging device of the present invention.

FIG. 61 shows a variable focal-length lens 167 in which the fluid 161 is taken in and out by a micropump 160 to deform the lens surface, in another embodiment of the variable focal-length lens used in the imaging device of the present invention.

The micropump 160 is a small-sized pump, for example, made by a micromachining technique and is constructed so that it is operated with an electric power. The fluid 161 is sandwiched between a transparent substrate 163 and an elastic body 164. In FIG. 61, reference numeral 165 represents a transparent substrate for protecting the elastic body 164 and this substrate is not necessarily required.

As examples of pumps made by the micromachining technique, there are those which use thermal deformations, piezoelectric substances, and electrostatic forces.

It is also possible to use the micropump 180 shown in FIG. 46 as two micropumps, for example, as in the micropump 160 used in the variable focal-length lens 167 of FIG. 61.

In the variable focal-length lens which uses the electrostatic force or the piezoelectric effect, a high voltage is sometimes required for drive. In this case, it is desirable that the boosting transformer or the piezoelectric transformer is used to constitute the control system. When a laminated piezoelectric transformer is particularly used, a compact design is achieved.

Figure 62:
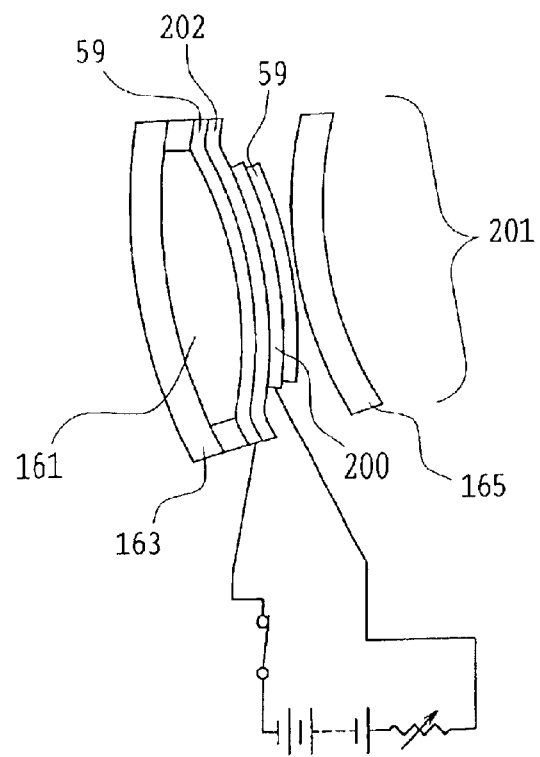
FIG. 62 is a view showing schematically the variable focal-length lens using a piezoelectric substance in another embodiment of the variable optical-property optical element applicable to the imaging device of the present invention.

FIG. 62 shows a variable focal-length lens 201 using a piezoelectric substance 200 in another embodiment of the variable optical-property optical element applicable to the imaging device of the present invention.

The same substance as the transparent substance 143 is used for the piezoelectric substance 200, which is provided on a soft transparent substrate 202. It is desirable that synthetic resin or an organic substance is used for the substrate 202.

In this embodiment, the voltage is applied to the piezoelectric substance 200 through the two transparent electrodes 59, and thereby the piezoelectric substance 200 is deformed so that the function of a convex lens is exercised in FIG. 62.

Figure 63:
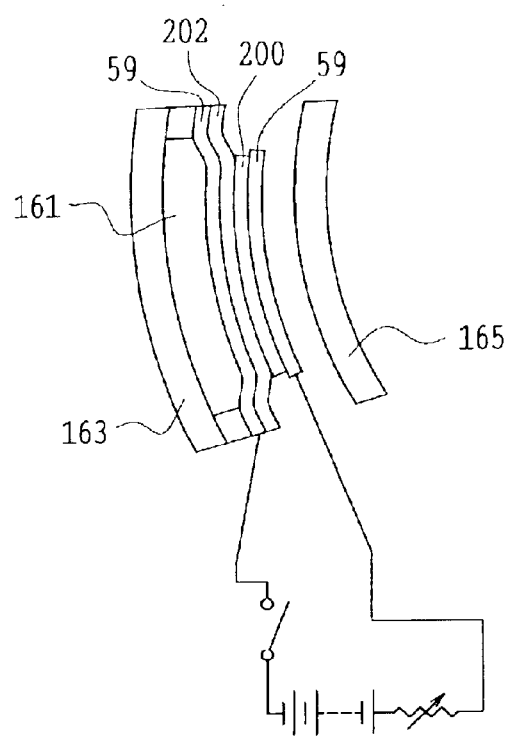
FIG. 63 is an explanatory view showing a state where the variable focal-length lens of FIG. 62 is deformed.

The substrate 202 is previously configured into a convex form, and at least one of the two transparent electrodes 59 is caused to differ in size from the substrate 202, for example, one of the electrodes 59 is made smaller than the substrate 202. In doing so, when the applied voltage is removed, the opposite, preset portions of the two transparent electrodes 59, as shown in FIG. 63, are deformed into concave shapes so as to have the function of a concave lens, acting as the variable focal-length lens.

In this case, since the substrate 202 is deformed so that the volume of the fluid 161 is not changed, there is the merit that the liquid tank 168 becomes unnecessary.

This embodiment has a great merit that a part of the substrate holding the fluid 161 is deformed by the piezoelectric substance and the liquid tank 168 is dispensed with. The transparent substrates 163 and 165 may be constructed with lenses or plane surfaces, and the same may be said of the embodiment of FIG. 61.

Figure 64:
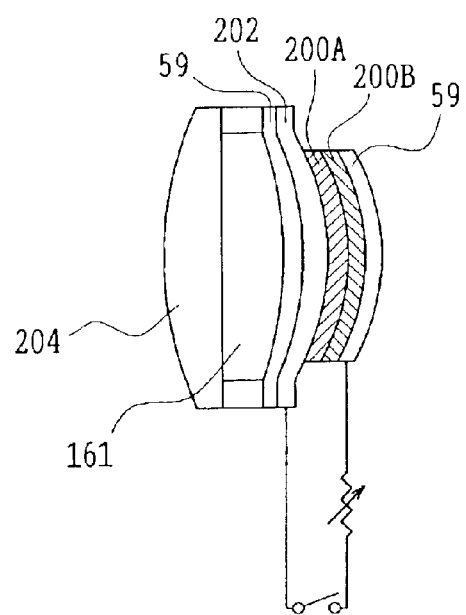
FIG. 64 is a view showing schematically the variable focal-length lens using two thin plates made with piezoelectric substances in still another embodiment of the variable optical-property optical element applicable to the imaging device of the present invention.

FIG. 64 shows a variable focal-length lens using two thin plates 200A and 200B constructed of piezoelectric substances in still another embodiment of the variable optical-property optical element applicable to the imaging device of the present invention.

The variable focal-length lens of this embodiment has the merit that the thin plate 200A is reversed in direction of the substance with respect to the thin plate 200B, and thereby the amount of deformation is increased so that a wide variable focal-length range can be obtained. Also, in FIG. 64, reference numeral 204 denotes a lens-shaped transparent substrate. Even in the embodiment, the transparent electrode 59 on the right side of the figure is configured to be smaller than the substrate 202.

In the embodiments of FIGS. 62–64, the thicknesses of the substrate 202, the piezoelectric substance 200, and the thin plates 200A and 200B may be rendered uneven so that a state of deformation caused by the application of the voltage is controlled. By doing so, lens aberration can be corrected, which is convenient.

Figure 65:
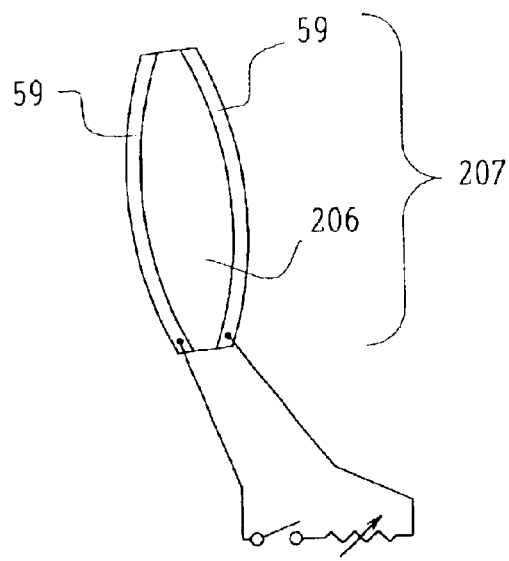
FIG. 65 is a view showing schematically still another embodiment of the variable focal-length lens used in the imaging device of the present invention.

FIG. 65 shows another embodiment of the variable focal-length lens used in the imaging device of the present invention. A variable focal-length lens 207 of this embodiment uses an electrostrictive substance 206 such as silicon rubber or acrylic elastomer.

Figure 66:
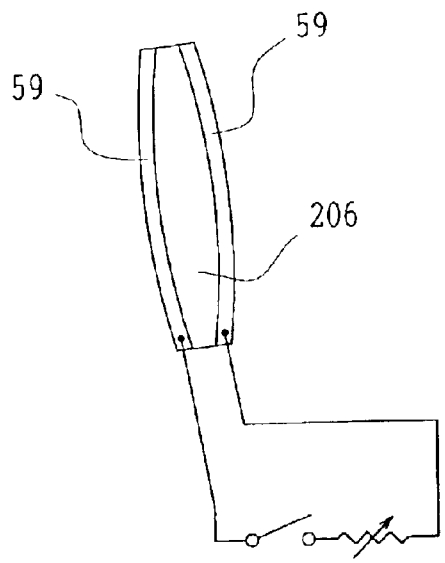
FIG. 66 is an explanatory view showing a state of the deformation of the variable focal-length lens in FIG. 65.

According to the embodiment, when the voltage is low, the electrostrictive substance 206, as depicted in FIG. 65, acts as a convex lens, while when the voltage is increased, the electrostrictive substance 206, as depicted in FIG. 66, expands in a vertical direction and contracts in a lateral direction, and thus the focal length is increased. In this way, the electrostrictive substance 206 operates as the variable focal-length lens. According to the variable focal-length lens of the embodiment, there is the merit that since a large power supply is not required, power consumption is minimized.

Figure 67:
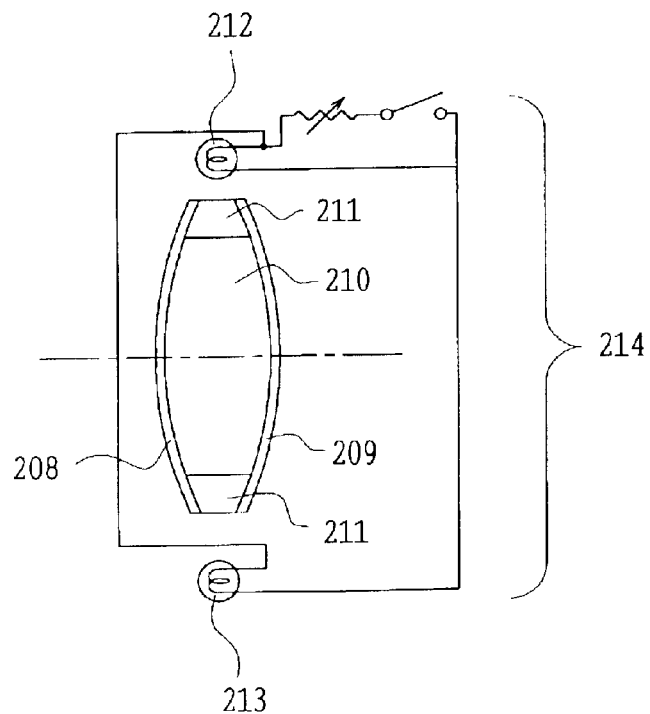
FIG. 67 is a view showing schematically the variable focal-length lens using a photomechanical effect in a further embodiment of the variable optical-property optical element applicable to the imaging device of the present invention.

FIG. 67 shows a variable focal-length lens using a photomechanical effect in a further embodiment of the variable optical-property optical element applicable to the imaging device of the present invention. A variable focal-length lens 214 of this embodiment is designed so that azobenzene 210 is sandwiched between transparent elastic bodies 208 and 209 and is irradiated with light through a transparent spacer 211. In FIG. 67, reference numerals 212 and 213 represent light sources, such as LEDs or semiconductor lasers, of central wavelengths $\lambda_1$ and $\lambda_2$, respectively.

Figures 68A, 68B:
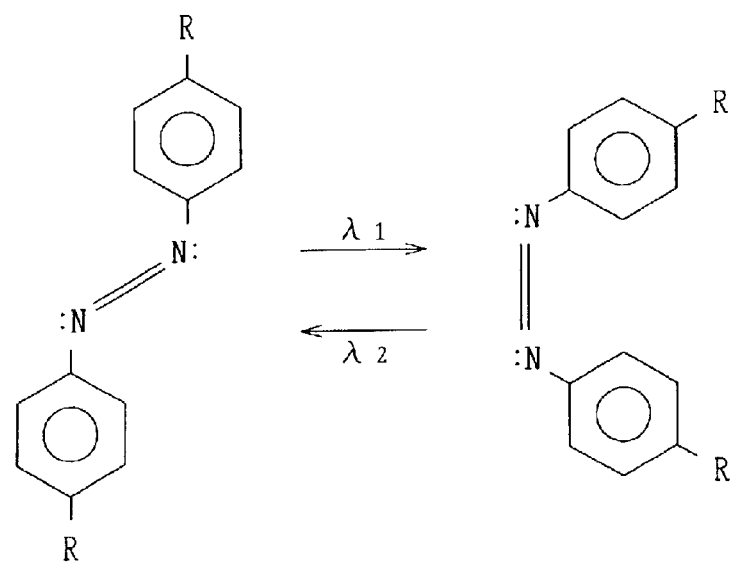
FIGS. 68A and 68B are explanatory views showing the structures of azobenzene of trans- and cis-type, respectively, used in the variable focal-length lens of FIG. 67.

In the embodiment, when trans-type azobenzene shown in FIG. 68A is irradiated with light of the central wavelength $\lambda_1$, the azobenzene 210 changes to cis-type azobenzene shown in FIG. 68B to reduce its volume. Consequently, the thickness of the variable focal-length lens 214 is decreased, and the function of the convex lens is impaired.

On the other hand, when the cis-type azobenzene is irradiated with light of the central wavelength $\lambda_2$, the azobenzene 210 changes to the trans-type azobenzene to increase the volume. Consequently, the thickness of the variable focal-length lens 214 is increased, and the function of the convex lens is improved.

In this way, the optical element of the embodiment acts as the variable focal-length lens. In the variable focal-length lens 214, since the light is totally reflected at the interface between each of the transparent elastic bodies 208 and 209 and air, the light does not leak through the exterior and high efficiency is obtained. Also, the wavelength of light utilized for the lens may be that of infrared light, not to speak of visible light. For the azobenzene 210, a mixture of azobenzene and another liquid may be used.

Figure 69:
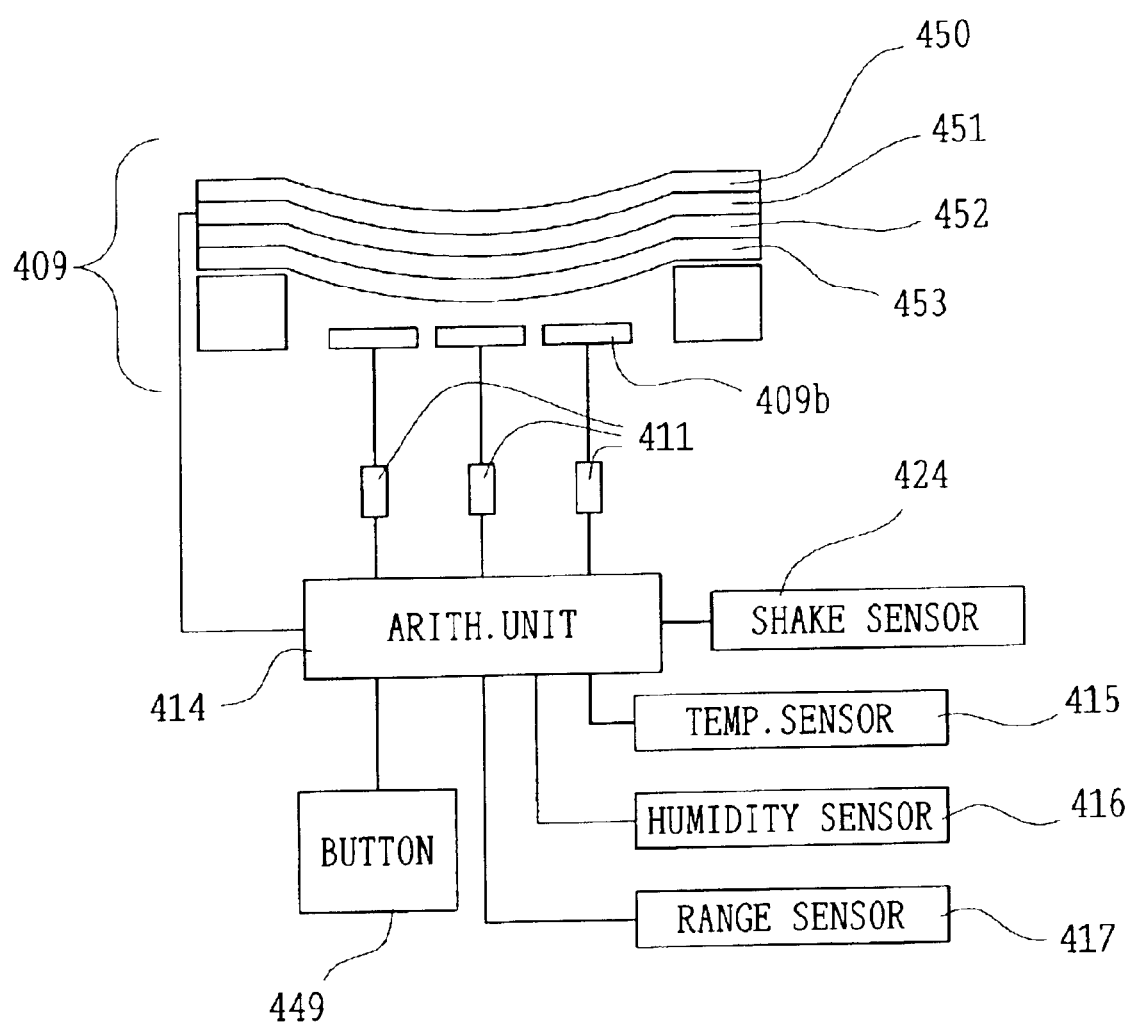
FIG. 69 is a view showing schematically still another embodiment of the deformable mirror used as the variable mirror in the imaging device of the present invention.

FIG. 69 shows another embodiment of the deformable mirror used as the variable mirror in the imaging device according to the present invention. In this embodiment, the deformable mirror is used in the digital camera. The deformable mirror 409 of the embodiment is such that the divided electrodes 409b are spaced away from the electrostrictive substance 453 including an organic substance such as acrylic elastomer, on which an electrode 452 and the deformable substrate 451 are placed in turn, and a reflecting film 450 including metal, such as aluminum, for reflecting incident light is provided on the substrate 451.

The deformable mirror, when constructed as mentioned above, has the merit that the surface of the reflecting film 450 becomes smooth and it is hard to optically produce aberration, in contrast to the case where the divided electrodes 409b and the electrostrictive substance 453 are integrally constructed. Also, the deformable substrate 451 and the electrode 452 may be arranged in reverse order.

In FIG. 69, reference numeral 449 stands for a button for changing the magnification of the optical system or zooming. The deformable mirror 409 is controlled through the arithmetical unit 414 so that a user pushes the button 449 and thereby the reflecting film 450 can be deformed to change the magnification or zoom. Also, instead of the electrostrictive substance including an organic substance such as acrylic elastomer, the piezoelectric substance such as barium titanate may be used.

In the above description, reference has been made to the control and drive of the variable optical-property optical element using the LUT. Most of the embodiments refer to the imaging devices, but the present invention is applied to the whole of the optical apparatus including a display device or an observation device which uses the variable optical-property optical element, not to speak of the imaging device. Also, although reference has been chiefly made to the control of the variable mirror, the present invention is not limited to this and is also applicable to the control of the variable optical-property optical element such as the variable focal-length lens.

In a projection device or display device such as a liquid crystal projector, "the distance to the object" in the present invention is thought of as a distance to projected image. That is, when an image and an object are conjugate, the present invention is applicable to the display device or the observation device.

Finally, the terms used in the present invention will be described.

An optical apparatus used in the present invention refers to an apparatus including an optical system or optical elements. The optical apparatus need not necessarily function by itself. That is, it may be thought of as a part of an apparatus the optical apparatus includes an imaging device, an observation device, a display device, an illumination device, and a signal processing device.

The imaging device refers to, for example, a film camera, a digital camera, a digital camera for cellular phones, a robot's eye, a lens-exchangeable digital single-lens reflex camera, a TV camera, a moving-picture recorder, an electronic moving-picture recorder, a camcorder, a VTR camera, or an electronic endoscope. Any of the digital camera, a card digital camera, the digital camera for cellular phones, the TV camera, the VTR camera, and a moving-picture recording camera is an example of an electronic imaging device.

The observation device refers to, for example, a microscope, a telescope, spectacles, binoculars, a magnifier, a fiber scope, a finder, or a viewfinder.

The display device includes, for example, a liquid crystal display, a viewfinder, a game machine (Play Station by Sony), a video projector, a liquid crystal projector, a head mounted display (HMD), a personal digital assistant (PDA), or a cellular phone.

The illumination device includes, for example, a stroboscopic lamp for cameras, a headlight for cars, a light source for endoscopes, or a light source for microscopes.

The signal processing device refers to, for example, a cellular phone, a personal computer, a game machine, a read/write device for optical disks, or an arithmetic unit for optical computers.

The image sensor refers to, for example, a CCD, a pickup tube, a solid-state image sensor, or a photographing film. The plane-parallel plate is included in one of prisms. A change of an observer includes a change in diopter. A change of an object includes a change in object distance, the displacement of the object, the movement of the object, vibration, or the shake of the object.

An extended surface is defined as follows:

Each of the surfaces of lenses, prisms, and mirrors need not necessarily be planar, and may have any shape such as a spherical or rotationally symmetrical aspherical surface; a spherical, planar, or rotationally symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In the present invention, it is assumed that such a surface is generally referred as to the extended surface.

The variable optical-property optical element includes a variable focal-length lens, a deformable mirror, a deflection prism whose surface profile is changed, a variable angle prism, a variable diffraction optical element in which the function of light deflection is changed, namely a variable HOE, or a variable DOE.

Also, in the present invention, information used for the control of the variable optical-property optical element relative to the current or the voltage is referred to as drive information.

The variable focal-length lens also includes a variable lens such that the focal length is not changed, but the amount of aberration is changed. The same holds for the case of the deformable mirror. In a word, an optical element in which the function of light deflection, such as reflection, refraction, or diffraction, can be changed is called the variable optical-property optical element.

An information transmitter refers to a device which is capable of inputting and transmitting any information from a cellular phone; a stationary phone; a remote control for game machines, TVs, radio-cassette tape recorders, or stereo sound systems; a personal computer; or a keyboard, mouse, or touch panel for personal computers. It also includes a TV monitor with the imaging device, or a monitor or display for personal computers. The information transmitter is included in the signal processing device.

What is claimed is:

1. An optical apparatus having a look-up table provided with control information for controlling an optimum variable optical-property optical element in accordance with one of a distance to an object, a zoom state, and a combination of said distance to the object with said zoom state, wherein a drive of a variable optical-property optical element is controlled on said control information obtained from said look-up table or a predetermined calculation process is executed on said control information obtained from said look-up table, and information obtained from said calculation process is used to control the drive of said variable optical-property optical element.

2. An optical apparatus according to claim 1, wherein a zoom system is one-lens-unit zoom.

3. An optical apparatus according to claim 1, wherein said variable optical-property optical element is provided and a contrast AF system is used for focusing.

4. An optical apparatus according to claim 1, wherein a long side of an image sensor is parallel with a plane of incidence of an axial ray on said variable optical-property optical element.

5. An optical apparatus according to claim 1, wherein a short side of an image sensor is parallel with a plane of incidence of an axial ray on said variable optical-property optical element.

6. An optical apparatus according to claim 1, wherein a moving lens unit is manually moved.

7. An optical apparatus according to claim 1, wherein a moving lens unit is electrically moved.

8. An optical apparatus according to claim 1, wherein a plurality of moving lens units are provided.

9. An optical apparatus according to claim 1, having a plurality of variable optical-property optical elements.

10. An optical apparatus according to claim 1, wherein said look-up table provided with control information for controlling said variable optical-property optical element is used so that objects are arranged at a plurality of places in an imaging area and images of said objects are properly formed.

11. An optical apparatus according to claim 1, wherein said look-up table provided with said control information for controlling said variable optical-property optical element is used so that objects are arranged at a plurality of places in an imaging area and images of said objects are properly formed to thereby compensate a manufacturing error of said optical apparatus.

12. An optical apparatus having a look-up table provided with control information for controlling an optimum variable optical-property optical element in accordance with a combination of a distance to an object with a zoom state, wherein said distance to the object and said zoom state are found, data of said look-up table are input, with said distance to the object and said zoom state obtained therefrom as a key, to find corresponding control information, and said control information obtained therefrom is used to control a drive of a variable optical-property optical element.

13. An optical apparatus having a look-up table provided with control information for controlling an optimum variable optical-property optical element in accordance with a combination of a distance to an object with a zoom state, wherein said distance to the object is found, said look-up table is retrieved, with said distance to the object obtained therefrom as a key, to one-dimensionally extract a corresponding zoom state, and a variable optical-property optical element is driven on control information where a sharpness of an image formed on control information corresponding to a one-dimensionally extracted zoom state is maximized within tolerances.

14. An optical apparatus having a look-up table provided with control information for controlling an optimum variable optical-property optical element in accordance with a combination of a distance to an object with a zoom state, wherein said zoom state is found, said look-up table is retrieved, with said zoom state obtained therefrom as a key, to one-dimensionally extract a corresponding distance to an object, and a variable optical-property optical element is driven on control information where a sharpness of an image formed on control information corresponding to a one-dimensionally extracted distance to an object is maximized within tolerances.

15. An optical apparatus having a look-up table provided with control information for controlling an optimum variable optical-property optical element in accordance with a combination of a distance to an object with a zoom state, wherein data of said look-up table are input in turn to find corresponding control information and a variable optical-property optical element is driven on control information where a sharpness of an image formed on control information obtained therefrom is maximized within tolerances.

16. An optical apparatus having a look-up table provided with control information for controlling a variable optical-property optical element fabricated, with an amount of shift of a focus position caused by a change of a distance to an object or zooming as a key, wherein said look-up table is scanned and said control information of said variable optical-property optical element is determined in a state where a sharpness of an image is maximized within tolerances so that said variable optical-property optical element is driven.

17. An optical apparatus having a look-up table provided with control information for controlling a variable optical-property optical element fabricated, with an amount of shift of a focus position caused by a change of a distance to an object or zooming as a key, wherein said amount of shift is found and said control information of said variable optical-property optical element is determined with a value of said look-up table corresponding to said amount of shift so that said variable optical-property optical element is driven.

18. An optical apparatus having a look-up table provided with control information for controlling an optimum variable optical-property optical element in accordance with one of a distance to an object and a zoom state, wherein a drive of a variable optical-property optical element is controlled on said control information obtained from said look-up table or a predetermined calculation process is executed on said control information obtained from said look-up table, and information obtained from said calculation process is used to control the drive of said variable optical-property optical element.

19. An optical apparatus having a look-up table provided with control information for controlling an optimum variable optical-property optical element in accordance with one of a distance to an object and a zoom state, wherein one of said distance to the object and said zoom state is found, data of said look-up table are input, with one of said distance to the object and said zoom state obtained therefrom as a key, to find corresponding control information, and said control information obtained therefrom is used to control a drive of a variable optical-property optical element.

20. An optical apparatus having a look-up table provided with control information for controlling an optimum variable optical-property optical element in accordance with one of a distance to an object and a zoom state, wherein data of said look-up table are input in turn to find corresponding control information and a variable optical-property optical element is driven on control information where a sharpness of an image formed on control information obtained therefrom is maximized within tolerances.

* * * * *